United States Patent
Jin et al.

(10) Patent No.: US 11,734,175 B2
(45) Date of Patent: Aug. 22, 2023

(54) STORAGE DEVICE AND METHOD OF OPERATING THE SAME

(71) Applicant: SK hynix Inc., Icheon (KR)

(72) Inventors: Yong Jin, Icheon (KR); Jung Ki Noh, Icheon (KR); Seung Won Jeon, Icheon (KR); Young Kyun Shin, Icheon (KR); Keun Hyung Kim, Icheon (KR)

(73) Assignee: SK hynix Inc., Icheon (KR)

( * ) Notice: Subject to any disclaimer, the term of this patent is extended or adjusted under 35 U.S.C. 154(b) by 117 days.

(21) Appl. No.: 17/000,082

(22) Filed: Aug. 21, 2020

(65) Prior Publication Data
US 2021/0056023 A1 Feb. 25, 2021

Related U.S. Application Data

(63) Continuation-in-part of application No. 16/882,076, filed on May 22, 2020, now Pat. No. 11,487,627, and
(Continued)

(30) Foreign Application Priority Data

Aug. 22, 2019 (KR) .................. 10-2019-0103087
Sep. 20, 2019 (KR) .................. 10-2019-0116261
(Continued)

(51) Int. Cl.
  *G06F 12/0806* (2016.01)
  *G06F 12/0891* (2016.01)
  *G06F 11/00* (2006.01)

(52) U.S. Cl.
  CPC ........ *G06F 12/0806* (2013.01); *G06F 11/008* (2013.01); *G06F 12/0891* (2013.01); *G06F 2212/1032* (2013.01); *G06F 2212/604* (2013.01)

(58) Field of Classification Search
  CPC ............ G06F 12/0806; G06F 12/0891; G06F 11/008; G06F 2212/1032; G06F 2212/0604
  See application file for complete search history.

(56) References Cited

U.S. PATENT DOCUMENTS

| 5,734,167 A | 3/1998 | Skelly |
| 9,141,177 B1 | 9/2015 | Nicholls et al. |
| (Continued) | | |

FOREIGN PATENT DOCUMENTS

| KR | 10-0825802 B1 | 4/2008 |
| KR | 1020110046243 A | 5/2011 |
| (Continued) | | |

OTHER PUBLICATIONS

Notice of Allowance for related U.S. Appl. No. 16/841,274, dated Oct. 1, 2021.
(Continued)

*Primary Examiner* — Prasith Thammavong

(57) ABSTRACT

The present technology includes a storage device including a memory device including a first storage region and a second storage region and a memory controller configured to, in response to a write request in the first storage region from an external host, acquire data stored the first region based on a fail prediction information provided from the memory device and to perform a write operation corresponding to the write request, wherein the first storage region and the second storage region are allocated according to logical addresses of data to be stored in by requests of the external host.

14 Claims, 44 Drawing Sheets

Related U.S. Application Data a continuation-in-part of application No. 16/877,239, filed on May 18, 2020, now abandoned, and a continuation-in-part of application No. 16/847,555, filed on Apr. 13, 2020, now Pat. No. 11,288,189, and a continuation-in-part of application No. 16/841,274, filed on Apr. 6, 2020, now Pat. No. 11,243,709.

(30) Foreign Application Priority Data

Sep. 24, 2019 (KR) .................. 10-2019-0117406
Dec. 16, 2019 (KR) .................. 10-2019-0167784

(56) References Cited

U.S. PATENT DOCUMENTS

| | | | |
|---|---|---|---|
| 9,418,699 | B1 | 8/2016 | Gibbons et al. |
| 9,424,864 | B2* | 8/2016 | Neppalli ............... G11B 5/09 |
| 9,772,782 | B2 | 9/2017 | Knowles et al. |
| 9,875,038 | B2 | 1/2018 | Jang et al. |
| 10,643,707 | B2 | 5/2020 | Rajamani et al. |
| 10,698,817 | B2 | 6/2020 | Gharpure et al. |
| 10,747,666 | B2 | 8/2020 | Ishiyama |
| 10,990,526 | B1* | 4/2021 | Lam .................. G06F 12/0246 |
| 2004/0243826 | A1 | 12/2004 | Wang |
| 2006/0015683 | A1* | 1/2006 | Ashmore ............. G06F 1/3268 |
| | | | 711/135 |
| 2007/0150645 | A1 | 6/2007 | Chandramouli et al. |
| 2007/0280002 | A1 | 12/2007 | Sudhindra Prasad |
| 2008/0282105 | A1 | 11/2008 | Deenadhayalan et al. |
| 2009/0319716 | A1 | 12/2009 | Nagadomi |
| 2010/0023682 | A1 | 1/2010 | Lee et al. |
| 2010/0146193 | A1* | 6/2010 | Jang .................. G06F 12/0868 |
| | | | 711/E12.001 |
| 2010/0174870 | A1 | 7/2010 | Banerjee |
| 2010/0180068 | A1 | 7/2010 | Matsumoto et al. |
| 2011/0099323 | A1 | 4/2011 | Syu |
| 2011/0133778 | A1 | 6/2011 | Kim et al. |
| 2011/0161563 | A1 | 6/2011 | Chang et al. |
| 2011/0302446 | A1 | 12/2011 | Becker-Szendy et al. |
| 2012/0072801 | A1 | 3/2012 | Takeuchi et al. |
| 2012/0084484 | A1 | 4/2012 | Post et al. |
| 2013/0080688 | A1 | 3/2013 | Park et al. |
| 2013/0097369 | A1 | 4/2013 | Talagala |
| 2013/0173857 | A1 | 7/2013 | Cheon et al. |
| 2014/0082265 | A1 | 3/2014 | Cheng |
| 2014/0095458 | A1* | 4/2014 | Kim ...................... G06F 16/10 |
| | | | 707/698 |
| 2014/0258588 | A1 | 9/2014 | Tomlin et al. |
| 2014/0289355 | A1 | 9/2014 | Imai |
| 2015/0046670 | A1 | 2/2015 | Kim et al. |
| 2015/0205539 | A1 | 7/2015 | Moon et al. |
| 2015/0347026 | A1 | 12/2015 | Thomas |
| 2016/0342509 | A1 | 11/2016 | Kotte et al. |
| 2017/0060668 | A1 | 3/2017 | Farhan et al. |
| 2017/0277438 | A1* | 9/2017 | Gole ..................... G06F 3/0689 |
| 2017/0371575 | A1 | 12/2017 | Park et al. |
| 2018/0032439 | A1 | 2/2018 | Jenne et al. |
| 2018/0129453 | A1 | 5/2018 | Kim |
| 2018/0239671 | A1* | 8/2018 | Wei ..................... G06F 3/0619 |
| 2018/0329818 | A1 | 11/2018 | Cheng et al. |
| 2018/0357170 | A1 | 12/2018 | Benisty |
| 2018/0364938 | A1 | 12/2018 | Habbinga et al. |
| 2019/0065387 | A1 | 2/2019 | Duzly et al. |
| 2019/0102250 | A1 | 4/2019 | O'Krafka et al. |
| 2019/0129841 | A1 | 5/2019 | Kanno |
| 2019/0187934 | A1 | 6/2019 | Sicola et al. |
| 2019/0220416 | A1 | 7/2019 | Jung et al. |
| 2019/0227735 | A1 | 7/2019 | Shaked et al. |
| 2019/0250847 | A1* | 8/2019 | Frolikov ............... G06F 3/0644 |
| 2019/0303292 | A1* | 10/2019 | Byun .................. G06F 12/0607 |
| 2019/0347204 | A1* | 11/2019 | Du ...................... G06F 13/1663 |
| 2020/0301780 | A1 | 9/2020 | Kim |
| 2020/0348742 | A1 | 11/2020 | Nayak |
| 2021/0055864 | A1* | 2/2021 | Noh ..................... G06F 3/0679 |
| 2021/0056023 | A1 | 2/2021 | Jin et al. |
| 2021/0165579 | A1 | 6/2021 | Bernat et al. |
| 2021/0240346 | A1 | 8/2021 | Bernat |
| 2021/0248842 | A1 | 8/2021 | Dittrich et al. |
| 2021/0303214 | A1 | 9/2021 | Nakano et al. |
| 2022/0318152 | A1 | 10/2022 | Fuller |

FOREIGN PATENT DOCUMENTS

| | | |
|---|---|---|
| KR | 101449524 B1 | 10/2014 |
| KR | 101506675 B1 | 3/2015 |
| KR | 10-1636248 B1 | 7/2016 |
| KR | 1020180024615 A | 3/2018 |
| KR | 1020190060328 A | 6/2019 |

OTHER PUBLICATIONS

Final Office Action for related U.S. Appl. No. 16/877,239, dated Oct. 14, 2021.
Non-final Office Action for related U.S. Appl. No. 16/841,274, dated Jun. 24, 2021.
Non-Final Office Action for related U.S. Appl. No. 16/877,239, dated Apr. 16, 2021.
Non-Final Office Action for related U.S. Appl. No. 16/882,076, dated Apr. 5, 2022.
Notice of Allowance for related U.S. Appl. No. 16/847,555, dated Dec. 1, 2021.
Final Office Action for related U.S. Appl. No. 16/877,239, dated May 12, 2022.
Non-final Office Action for related U.S. Appl. No. 16/877,239, dated Aug. 18, 2022.
Non-final Office Action for related U.S. Appl. No. 17/680,149, dated Feb. 10, 2023.
Notice of Allowance dated Jun. 6, 2023 for U.S. Appl. No. 17/680,149.

\* cited by examiner

BUFFER ALLOCATION REQUEST

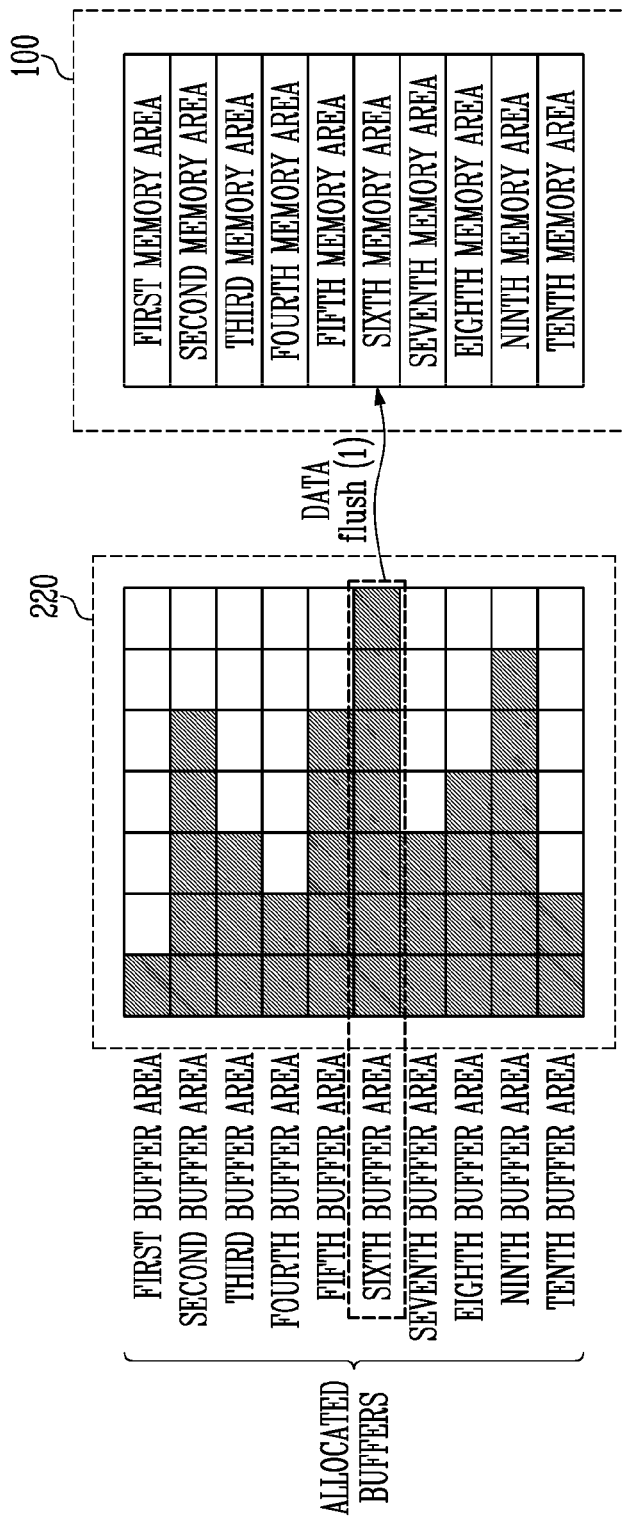

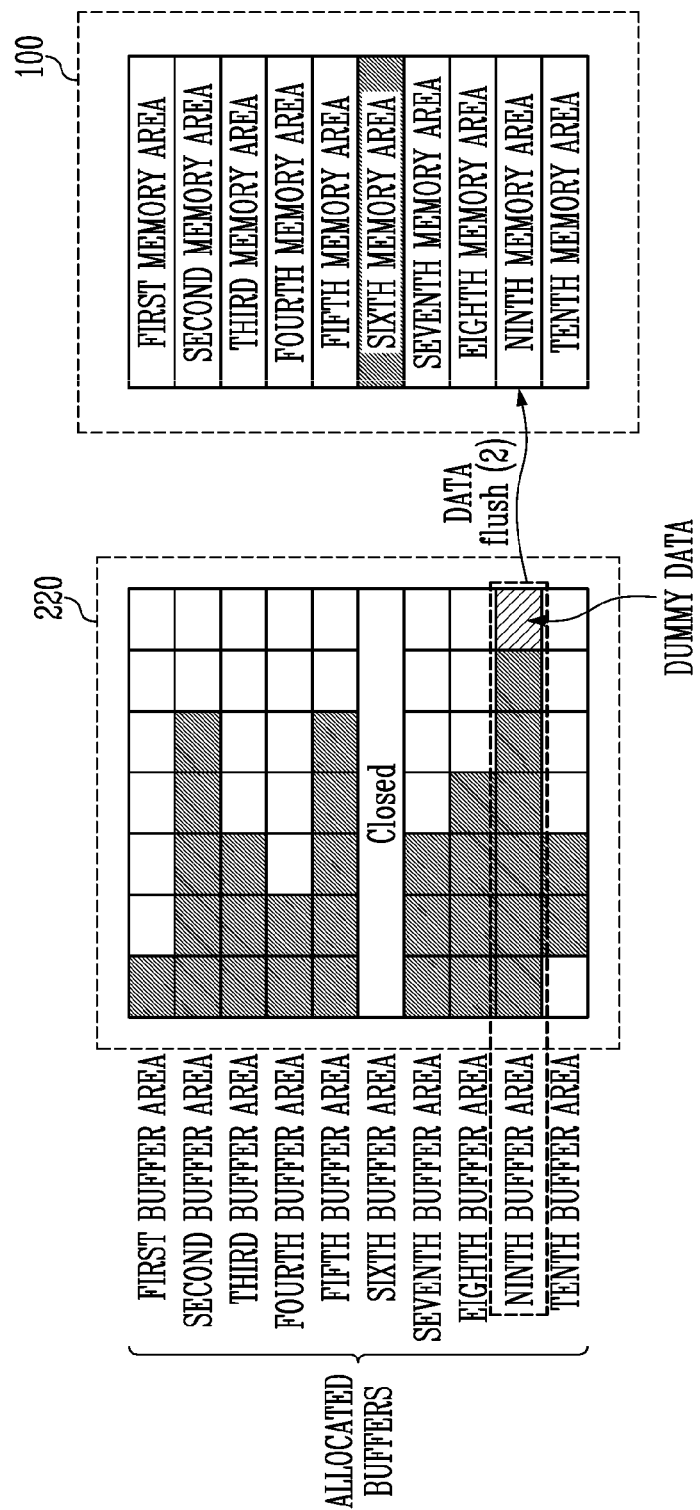

| BUFFER AREA ADDRESS | ZONE IDENTIFIER | STORED DATA SIZE |
|---|---|---|
| BFADD1 | 1 | 4K |
| BFADD2 | 2 | 2K |
| BFADD3 | 5 | 1K |
| BFADD4 | 6 | 2K |
| BFADD5 | 7 | 2K |
| BFADD6 | 8 | 4K |
| BFADD7 | 10 | 2K |
| BFADD8 | 11 | 1K |

FIG. 39

Zone mapping table

| LBA Group | Zone Index | Start PBA | Total Length | Final write location |
|---|---|---|---|---|
| LBAG 0 | Zone 0 | PBA 0 | M | PBA Number |
| LBAG 1 | Zone 1 | PBA 100 | M | PBA Number |
| ... | ... | ... | ... | ... |
| LBAG A | Zone N | PBA B | M | PBA Number |
| LBAG A+1 | Zone N+1 | PBA B+M | M | PBA Number |

STORAGE DEVICE AND METHOD OF OPERATING THE SAME

CROSS-REFERENCE TO RELATED APPLICATION

The present application is a continuation-in-part of U.S. patent application Ser. No. 16/847,555 filed on Apr. 13, 2020 which claims benefits of priority of Korean Patent Application No. 10-2019-0116261, filed on Sep. 20, 2019, U.S. patent application Ser. No. 16/882,076 filed on May 22, 2020 which claims benefits of priority of Korean Patent Application No. 10-2019-0167784, filed on Dec. 16, 2019, U.S. patent application Ser. No. 16/877,239 filed on May 18, 2020 which claims benefits of priority of Korean Patent Application No. 10-2019-0117406, filed on Sep. 24, 2019, and U.S. patent application Ser. No. 16/841,274 filed on Apr. 6, 2020 which claims benefits of priority of Korean Patent Application No. 10-2019-0103087, filed on Aug. 22, 2019. The disclosure of each of foregoing application is incorporated herein by reference in its entirety.

BACKGROUND

Field of Invention

The present disclosure relates to an electronic device including an auxiliary power device, and more particularly, to a memory controller and a method of operating the same.

Description of Related Art

A storage device is a device that stores data. The storage device includes a memory device in which data is stored and a memory controller controlling the memory device. A memory device may be implemented using a semiconductor such as silicon (Si), germanium (Ge), gallium arsenide (GaAs), or indium phosphide (InP). The memory device may be classified as a volatile memory device or a non-volatile memory device.

A volatile memory device is a memory device in which stored data is lost when its power supply is cut off. The volatile memory device may be any of a static RAM (SRAM), a dynamic RAM (DRAM), a synchronous DRAM (SDRAM), and the like. The non-volatile memory device is a memory device that maintains stored data even though its power supply is cut off. The non-volatile memory device may be any of a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. Flash memory is largely divided into a NOR type and a NAND type.

The storage device may include an auxiliary power device that may supply power for a time (such as after a main power supply is cut off or when the main power supply is delivering an incorrect voltage) in order to ensure the reliability of data stored in the storage device.

SUMMARY

An embodiment of the present disclosure provides a memory controller having improved reliability and a method of operating the same.

According to an embodiment of the present disclosure, a memory controller that is communicatively coupled to a host and that controls an operation of a memory device may include a buffer memory configured to store data for a plurality of allocated buffer areas, and a buffer memory controller configured to receive from the host a buffer allocation request corresponding to a first memory area in the memory device, the first memory area corresponding to a first plurality of physical addresses, in response to the buffer allocation request, determine whether to allocate a first buffer area in the buffer memory according to one or more of power information received from the host and power information of an auxiliary power device coupled to the memory controller and the memory device, and in response to determining to allocate the first buffer area, allocate the first buffer area in the buffer memory and generate an area map table in which a plurality of logical addresses provided from the host and associated with the first buffer area are mapped to the plurality of physical addresses corresponding to the first memory area.

According to an embodiment of the present disclosure, a memory controller that controls an operation of a memory device including a plurality of memory areas may include a buffer memory configured to store data for a plurality of allocated buffer areas, the plurality of allocated buffer areas temporarily storing data to be respectively stored in the plurality of memory areas, and a buffer memory controller configured to control the buffer memory and the memory device to store data stored in the plurality of allocated buffer areas into the memory device, based on information on power that may be provided from a host to the memory controller, when supply of main power provided to the memory controller is abnormally cut off.

According to an embodiment of the present disclosure, a method of operating a memory controller that controls an operation of a memory device including a plurality of memory areas may include receiving a buffer allocation request from a host, and providing a response to the buffer allocation request based on buffer state information on a state of a plurality of allocated buffer areas respectively corresponding to the plurality of memory areas, and power information indicating a state of power that may be provided from the host to the memory controller.

According to an embodiment of the present technology, a memory controller providing improved reliability and a method of operating the same are provided.

A memory controller according to an embodiment of the present disclosure may include a pre-data storage configured to temporarily store data read from a memory device; a target data write controller configured to control the memory device to perform a write operation by storing data received from a host in a target location corresponding to a first subregion included in a first storage region of the memory device; and a pre-data manager configured to back up pre-data stored in a pre-data location to the pre-data storage before the write operation is performed, the pre-data location corresponding to a second subregion included in the first storage region.

A storage device according to an embodiment of the present disclosure may include a memory device including a first storage region and a second storage region; and a memory controller configured to control the memory device to back up data stored in the first storage region according to a fail probability of an write operation to be performed on the first storage region, and to perform the write operation.

A method of operating a storage device according to an embodiment of the present disclosure may include storing pre-data in a pre-data location, the pre-data location corresponding to a first subregion of the first storage region; determining a fail probability of a write operation for a target location, the target location corresponding to a second subregion of the first storage region after storing the pre-data; and backing up the pre-data stored in the pre-data location based on the fail probability.

The storage device and the method of operating the same according to the present technology provide improved data recovery performance.

In accordance with an embodiment of the present disclosure, a memory system may include a storage medium and a controller. The storage medium may include a plurality of nonvolatile memory devices grouped into a plurality of groups. The controller may manage the storage medium by a unit of a zone block. The controller may select one nonvolatile memory device from each of the groups and configure the zone block over the selected nonvolatile memory devices.

In accordance with an embodiment of the present disclosure, a memory system may include a storage medium and a controller. The storage medium may include a plurality of nonvolatile memory devices. The plurality of nonvolatile memory device may include first and second nonvolatile memory devices respectively coupled to first and second input/output lines that are different from one another. The controller may manage the storage medium by a unit of a zone block. Each zone block of a plurality of zone blocks may be configured over each of the first and second nonvolatile memory devices. The controller may perform a plurality of write operations respectively corresponding to the plurality of zone blocks at the same time.

In accordance with an embodiment of the present disclosure, a data processing system may include a memory system and a host device. The memory system may include a storage medium and a controller. The host device may designate a zone block within the storage medium and provide a write request including information of the zone block to the controller. The controller may write data into the zone block according to the write request.

In accordance with an embodiment of the present disclosure, provided is the memory system having improved write performance and the data processing system including the same.

In an embodiment, a data storage apparatus includes a volatile memory, the volatile memory including a region in which a zone mapping table and system information are stored and a random access zone suitable for random writes; a non-volatile memory including a backup zone and a plurality of sequential zones suitable for sequential writes; and a controller configured to identify whether a logical address received with a command from a host apparatus belongs to the random access zone or to the sequential zone and to control an operation corresponding to the command of the identified zone, wherein the controller is configured to back up data stored in the random access zone onto the backup zone based on a criterion and to recover the data stored in the backup zone into the random access zone when a state of the controller switches to an on state after power is off.

In an embodiment, an operating method of a data storage apparatus includes receiving a logical address and a command from a host; identifying whether the logical address belongs to a random access zone within a volatile memory or to a sequential zone within a non-volatile memory, the volatile memory including a region in which a zone mapping table and system information are stored and the random access zone suitable for random writes, and the non-volatile memory including a backup zone and a plurality of sequential zones suitable for sequential writes; and performing an operation corresponding to the command based on the identified random access zone or sequential zone.

According to the embodiments, a data storage space for writing data may be secured in a volatile memory through a change in the structure of a mapping table, and performance of a write operation can thereby be improved because a write speed can be increased due to characteristic of the volatile memory.

Furthermore, it is possible to prevent a loss of data of the volatile memory because data stored in the data storage space secured in the volatile memory is backed up and recovered using a non-volatile memory.

In an embodiment, A storage device, may include a memory device including a first storage region and a second storage region and a memory controller configured to, in response to a write request in the first storage region from an external host, acquire data stored the first region based on a fail prediction information provided from the memory device and to perform a write operation corresponding to the write request, wherein the first storage region and the second storage region are allocated according to logical addresses of data to be stored in by requests of the external host.

In an embodiment, a storage device including sequential regions and a backup region, the storage device may include a volatile memory configured to temporally store data to be stored in the sequential regions in a plurality of allocated buffers respectively corresponding to the sequential regions and a random region, a non-volatile memory configured to include memory blocks allocated to the sequential regions and the backup region and a memory controller configured to control the volatile memory and the non-volatile memory to store data stored in the plurality of allocated buffers and the random region into the non-volatile memory, based on power information provided from a host, wherein the sequential regions are allocated according to logical addresses of data to be stored in by requests of the host.

BRIEF DESCRIPTION OF THE DRAWINGS

FIG. 6 illustrates a first flush operation according to an embodiment.

FIG. 7 illustrates a second flush operation following the first flush operation of FIG. 6 according to an embodiment.

FIG. 39 illustrates an example of a zone mapping table according to an embodiment.

DETAILED DESCRIPTION

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and the descriptions are not limited to the embodiments described in the present specification or application.

Hereinafter, an embodiment of the present disclosure will be described with reference to the accompanying drawings so that those skilled in the art may easily implement embodiments of the present disclosure.

The present disclosure describes four main embodiments, and each main embodiment includes a plurality of embodiments. The main embodiments may be described in detail through FIGS. 1 to 11, FIGS. 12 to 24, FIGS. 29 to 33, and FIGS. 34 to 50, respectively. As used herein, the terms "storage device", "memory system", "storage medium" and "data storage apparatus" are used interchangeably.

1. Adaptive Power Loss Protection for Zoned Storage

Figure 1:
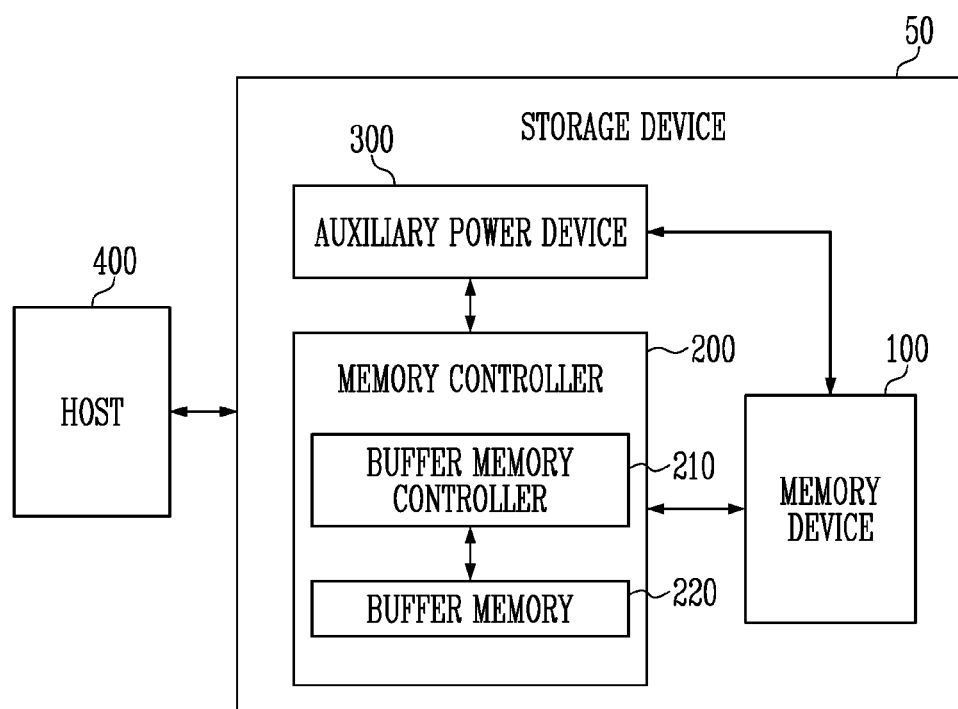
FIG. 1 illustrates a storage device including a memory controller according to an embodiment of the present disclosure.

FIG. 1 illustrates a storage device 50 including a memory controller 200 according to an embodiment of the present disclosure.

Referring to FIG. 1, the storage device 50 may include a memory device 100, the memory controller 200, and an auxiliary power device (or an auxiliary power supply) 300.

The storage device 50 may be a device that stores data under control of a host 400 such as a cellular phone, a smartphone, an MP3 player, a laptop computer, a desktop computer, a game player, a TV, a tablet PC, or an in-vehicle infotainment system.

The storage device 50 may be manufactured as one of various types of storage devices according to a host interface that is a communication method with the host 400. For example, the storage device 50 may be configured as any one of an SSD, a multimedia card in a form of an MMC, an eMMC, an RS-MMC or a micro-MMC, a secure digital card in a form of an SD, mini-SD or micro-SD card, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The storage device 50 may be manufactured as any one of various types of packages. For example, the storage device 50 may be manufactured as any one of a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 may be controlled by the memory controller 200. The memory device 100 may include a memory cell array (not shown) including a plurality of memory cells storing the data. The memory cell array may include a plurality of memory blocks. The memory block may include a plurality of memory cells. A memory block may be a unit for performing an erase operation of erasing data stored in the memory device 100. In an embodiment, each memory block may include a plurality of pages. The page may be a unit for performing a program operation of storing data in the memory device 100 or a read operation of reading data stored in the memory device 100. In an embodiment, the memory device 100 may be a non-volatile memory device.

In an embodiment, the memory device 100 may be a double data rate synchronous dynamic random access memory (DDR SDRAM), a low power double data rate 4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory device, a resistive random access memory (RRAM), a phase-change memory (PRAM), a magnetoresistive random access memory (MRAM), a ferroelectric random access memory (FRAM), a spin transfer torque random access memory (STT-RAM), or the like. In the present specification, for convenience of description, embodiments wherein the memory device 100 is a NAND flash memory are described, but embodiments are not limited thereto.

In an embodiment, the memory device 100 may be implemented in a three-dimensional array structure. The present disclosure may be applied not only to a flash memory device in which a charge storage layer is a conductive floating gate (FG), but also to a charge trap flash (CTF) in which the charge storage layer is an insulating film.

In an embodiment, each of the memory cells included in the memory device 100 may operate as a single level cell (SLC) that stores one data bit, a multi-level cell (MLC) that stores two data bits, a triple level cell (TLC) that stores three data bits, or a quad level cell (QLC) that stores four data bits.

The memory device 100 may receive a command and an address from the memory controller 200. The memory device 100 is configured to access an area selected by the received address of the memory cell array. Accessing the selected area means performing an operation corresponding to the received command on the selected area. For example, the memory device 100 may perform a write operation (program operation), a read operation, or an erase operation. During the program operation, the memory device 100 may program data to the area selected by the address. During the read operation, the memory device 100 may read data from the area selected by the address. During the erase operation, the memory device 100 may erase data stored in the area selected by the address.

The memory controller 200 may control an overall operation of the storage device 50.

When power is supplied to the storage device 50, the memory controller 200 may execute firmware. The firmware may include a host interface layer (HIL) that receives requests from the host 400 and outputs responses to the host 400, a flash translation layer (FTL) that manages operations between an interface of the host device and an interface of the memory device 100, and a flash interface layer (FIL) that provides commands to the memory device 100 and receives responses from the memory device 100.

The memory controller 200 may receive data and a logical address (LA) from the host 400, and may convert the LA into a physical address (PA) indicating an address of memory cells in which data included in the memory device 100 is to be stored. The LA may be a logical block address (LBA), and the PA may be a physical block address (PBA).

The memory controller 200 may control the memory device 100 to perform a program operation, a read operation, or an erase operation according to the request from the host 400. During the program operation, the memory controller 200 may provide a program command, a PA, and data to the memory device 100. During the read operation, the memory controller 200 may provide a read command and a PA to the memory device 100. During the erase operation, the memory controller 200 may provide an erase command and a PBA to the memory device 100.

The memory controller 200 may at times control the memory device 100 to perform program operations, read operations, or erase operations in the absence of a request from the host 400. For example, the memory controller 200 may control the memory device 100 to perform one or more program operations, read operations, and/or the erase operations in order to perform a background operation such as wear leveling, garbage collection, or read reclaim.

The auxiliary power device 300 may provide auxiliary power to the memory device 100 and the memory controller 200. The auxiliary power may be supplied to the memory device 100 and the memory controller 200 when main power (not shown) supplied to the storage device 50 is in an abnormal state. For example, the main power may be in an abnormal state when a voltage level of the main power is equal to or less than a specific voltage level. The main power may also be in an abnormal state when the supplying of the main power is abnormally cut off. For example, an abnormal state of the main power may be a sudden power off (SPO) state. The auxiliary power device 300 may include one or more auxiliary power cells (such as super capacitors, not shown). When the abnormal state of the main power is sensed, the auxiliary power stored in the auxiliary power cells may be provided to the memory device 100 and the memory controller 200. The memory device 100 and the memory controller 200 may perform various operations using the provided auxiliary power. The auxiliary power may correspond to an amount of power provided by the auxiliary power device 300 to the memory device and the memory controller.

A time required to store data in a volatile memory device may be substantially less than a time required to store that data in a non-volatile memory device. In order to provide a quick response to a write request of the host 400, the storage device 50 may temporarily store data in a buffer memory 220. The data stored in the buffer memory 220 may subsequently be stored in the memory device 100.

The buffer memory 220 may be a volatile memory device. Therefore, when the power is cut off, the data stored in the buffer memory 220 may not be maintained.

The buffer memory 220 may lose the temporarily stored data when the power is not provided. Therefore the storage device 50 may store the temporarily stored data, which is stored in the buffer memory 220, in the memory device 100 using the auxiliary power when the main power is the abnormal state. The auxiliary power device 300 may supply the auxiliary power for a time during which all or portions of the data stored in the volatile memory device of the buffer memory 220 may be stored in the memory device 100.

The data stored in the buffer memory 220 may be stored in the memory device 100 in response to an instruction to perform a flush operation received from the host 400. The flush operation stores data which is temporarily stored in the buffer memory 220 into the memory device 100. The instruction to perform the flush operation may be periodically provided to the memory controller 200 by the host 400. Also, the memory controller 200 may sense a state of the buffer memory 220 and perform the flush operation without receiving an instruction from the host 400.

The buffer memory controller 210 may allocate a buffer area in the buffer memory 220. Allocating the buffer area may include creating a mapping between a physical address of the memory device 100 and a logical address input from the host. Allocating the buffer area according to an embodiment will be described below with reference to FIG. 2.

The buffer memory controller 210 may receive a write request from the host 400 and in response allocate a buffer area in the buffer memory 220 according to a state of the buffer memory 220. Data received from the host 400 may be temporarily stored in the allocated buffer area of the buffer memory 220. Alternatively, depending on the state of the buffer memory 220, the buffer memory controller 210 may respond to the write request of the host 400 by sending the host 400 a delay response and performing a flush operation. The delay response may indicate to the host 400 that the requested allocation for a new buffer area was not performed.

Referring to FIG. 1, although the buffer memory controller 210 and the buffer memory 220 are included in the memory controller 200, in various embodiments, the buffer memory controller 210 and the buffer memory 220 may be included in the storage device 50 and may be positioned outside the memory controller 200.

Figure 2:
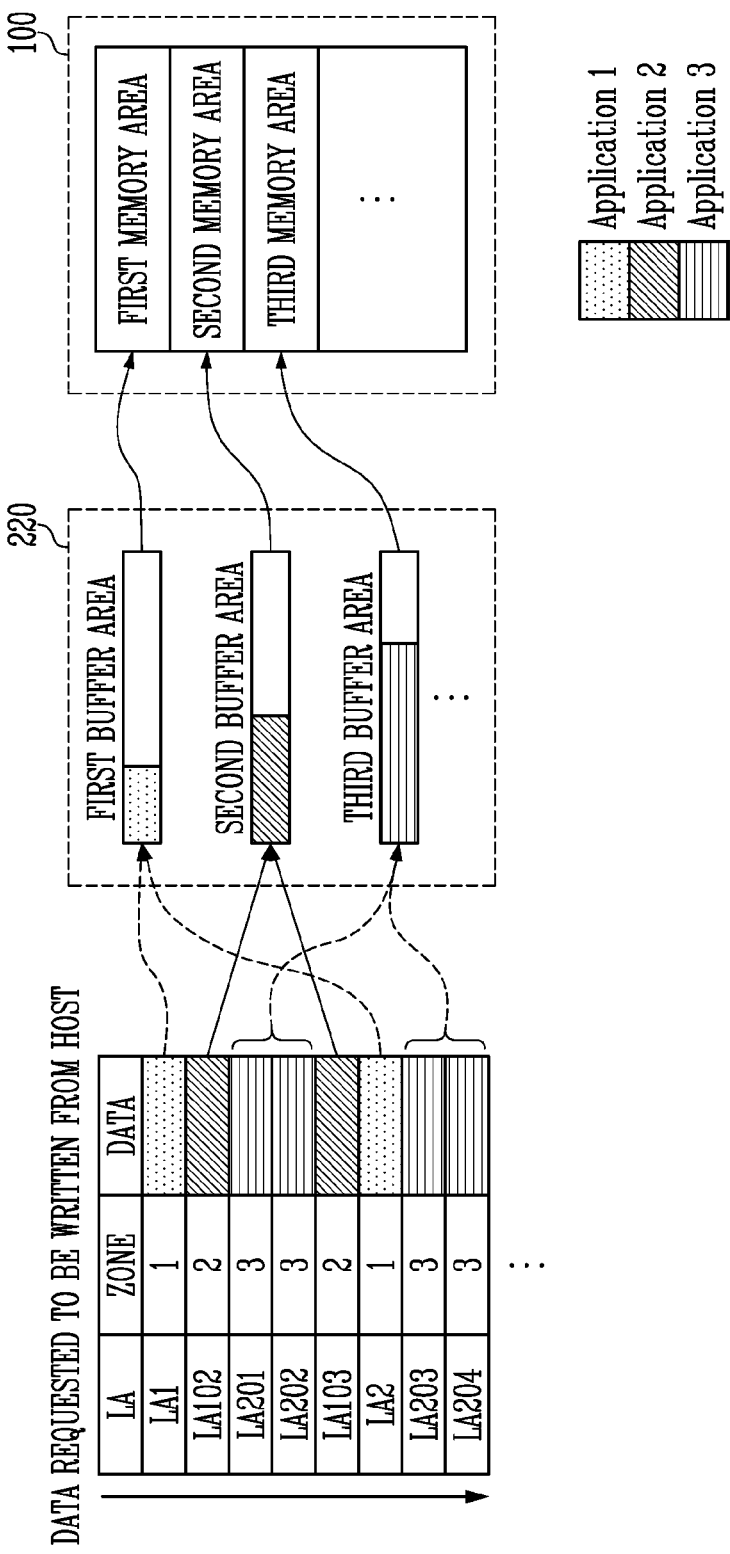
FIG. 2 illustrates effects of buffer allocation requests provided by a host according to an embodiment.

FIG. 2 is a diagram for describing processing of buffer allocation requests provided by a host.

The host may provide the write request to the storage device. The memory device 100 may include a plurality of memory areas. The memory areas may include a memory cell that stores data. The plurality of memory areas may respectively store data corresponding to logical addresses of a specific respective range. The logical addresses of the write requests input from the host may not be input in an order of each memory area and may be input randomly. The storage device according to an embodiment of the present disclosure includes a buffer memory 220 in which a plurality of buffer areas may be allocated so that data is organized according to ranges of the logical addresses to which the data is to be stored in the memory areas. The plurality of buffer areas may correspond to the plurality of memory areas included in the memory device 100, respectively.

Each application being performed on the host may use data having different respective logical address ranges. The application may indicate a type of the data. In another embodiment, the application may be an attribute of the data determined by the host.

Data related to a first application may be associated with a first zone (Zone 1) and have logical addresses ranging from a 0-th logical address LBA 0 to a 99-th logical address LBA 99. In addition, data related to a second application may be associated with a second zone (Zone 2) and have logical addresses ranging from a 100-th logical address LBA 100 to a 199-th logical address LBA 199. Data related to a third application may be associated with a third zone (Zone 3) and have logical addresses ranging from a 200-th logical address LBA 200 to a 299-th logical address LBA 299.

In the example shown in FIG. 2, the respective logical addresses of the write request received from the host are input in an order of a first logical address LA1, a 102nd logical address LA102, a 201st logical address LA201, a 202nd logical address LA202, a 103rd logical address LA103, a second logical address LA2, a 203rd logical address LA203, and a 204th logical address LA204. Because the logical addresses of data to be stored in each memory area are determined by the host, write request data may be temporarily stored in a buffer area according to the logical address, the buffer area corresponding to a corresponding memory area.

In an embodiment, the write request input from the host may implicitly or explicitly include a buffer open request. For example, as described above, the memory areas corresponding to respective logical address ranges may be determined in advance. Therefore, a write request for a specific logical address provided by the host may indicate that the write requested data is to be stored in a specific memory area. In addition, the write request may include a buffer open request requesting to open a specific buffer area for temporarily storing the data of the write request before the write request data is stored in the specific memory area. As the buffer open request is input to the memory controller, a buffer open operation in which the buffer area corresponding to the memory area in which data is to be temporarily stored is allocated may be performed. The opened buffer area may be in a state capable of temporarily storing data received from the host. Hereinafter, an open buffer area may refer or corresponding to an allocated buffer area. In addition, hereinafter, a buffer open request may have refer or corresponding to a buffer allocation request.

The allocated buffer area may be an area prepared for temporarily storing the data received from the host. A plurality of buffer areas may be opened according to the write requests from the host. For example, the host may not indicate that logical addresses of input data are stored in the same memory area. In this case, the plurality of buffer areas corresponding to the respective memory areas may be opened. Each of the buffer areas may temporarily store data corresponding to a logical address of a predetermined range. Therefore, amounts of the data temporarily stored in each of the buffer areas may be different. According to an embodiment, at some instant, the plurality of buffer areas may be opened, and the amounts of the data stored in the plurality of buffer areas may be different from each other. According to another embodiment, an opened buffer area and an unopened buffer area, that is, an unallocated buffer area may exist together in the buffer memory 220. When the amount of the data stored in one or more of the buffer areas reaches a predetermined size, the flush operation may be performed so that the data in the one or more buffer areas is respectively transferred to one or more corresponding memory areas. Since the flush operation may be independently performed for each buffer area, all the buffer areas do not have to be simultaneously flushed.

In another embodiment, respective sizes of the opened buffer areas may be different from each other. The respective sizes of the opened buffer areas may indicate a maximum amount of data that may be respectively stored in each of the buffer areas. The size of the opened buffer areas may determine whether to start a flush operation. For example, among the plurality of buffer areas included in the buffer memory 220, a maximum size of a first buffer area may be 4 Kbytes, and a maximum size of a second buffer area may be 8 Kbytes. A maximum size of a third buffer area may be one of 4 Kbytes and 8 Kbytes, or another size that does not correspond to any of 4 Kbytes and 8 Kbytes. When data is temporarily stored in the first buffer area and a total size of the stored data in that buffer area reaches 4 Kbytes, a flush operation in which the data in the first buffer area is stored into the first memory area may be performed. When the data is temporarily stored in the second buffer area and the total size of the stored data in that buffer area reaches 8 Kbytes, the flush operation may be performed to store the data in the second buffer area into the second memory area. The flush operation may be performed on other buffer areas in the same manner. Since the flush operation may be separately performed for each buffer area, the flush operation of all buffer areas does not have to be performed simultaneously.

The write request or the buffer open request provided by the host may further include information indicating a size of the opened buffer area. Referring to FIG. 2, the host may request to write the 102nd logical address LA102 and the 103rd logical address LA103. The write request may also include information on the size of the buffer area to allocate. For example, if the write request received from the host includes buffer area size information indicating a size of 4 Kbytes, the size of the second buffer area in which the data having the 102nd logical address LA102 and the 103rd logical address LA103 is to be temporarily stored may be determined as 4 Kbytes as indicated in the write request received. That is, the size of the opened buffer area may be determined according to the write request provided by the host.

Referring to FIG. 2, regardless of an input order, the data corresponding to the write requests may be temporarily stored in a respective buffer area. Data corresponding to the first logical address LA1 and the second logical address LA2 may be stored in the first buffer area. Data corresponding to the 102nd logical address LA102 and the 103rd logical address LA103 may be stored in the second buffer area. Data corresponding to the 201st logical address LA201 to the 204-th logical address LA204 may be stored in the third buffer area.

The data stored in the first buffer area may be data that will be stored in a first memory area of the memory device 100. The data stored in the second buffer area of the buffer memory 220 may be data that will be stored in a second memory area of the memory device 100. The data stored in the third buffer area of the buffer memory 220 may be data that will be stored in a third memory area of the memory device 100. According to the described process, the data may be stored in memory areas determined according to the respective logical addresses of the data.

The memory areas included in the memory device 100 may include memory cells. Each of the memory areas may be erased. That is, each of the memory areas may correspond to a memory block that is a unit of an erase operation of the memory device 100, or may correspond to a plurality of memory blocks. When a request to erase data related to the first application (corresponding to Zone 1 in FIG. 2) is received, the data stored in the first memory area may be erased. The data of the second application (corresponding to Zone 2) and the third application (corresponding to Zone 3) stored in the second memory area and the third memory area may not be affected by the erase operation of the first memory area. That is, even though the data stored in the first memory area is erased, the data stored in the second memory area and the third memory area, which are memory areas different from the first memory area, may be maintained.

According to an embodiment, the host may provide a buffer allocation request to the memory controller. The buffer allocation request may be a request to allocate an area of the buffer memory 220 so that data may be stored there. Allocating the area of the buffer memory may include an operation of mapping a physical address corresponding to a newly input logical address. That is, according to the buffer allocation request of the host, an area map table may be generated in which physical addresses of the memory area are mapped to logical addresses associated with the buffer allocation request. The area map table may include a mapping relationship between logical addresses of data to be stored in a corresponding memory area and physical addresses of the memory area where the data is to be stored. In an embodiment, the area map table may include information on a start logical address where data is to be stored in a corresponding area, an end logical address, or the last input logical address. The area map table may also include information on a position where data is to be next stored in a corresponding memory area.

For example, the host may request that data related to the first application be written to the memory device. Optionally, a first buffer area allocation request may be sent from the host to the memory controller. An area map table (or an entry in such a table) may be generated in which the first logical address LA1 (which is a logical address of data to be stored by the first application) is mapped to a physical address indicating a first memory area of the memory device 100 (where data is to be finally stored). In addition, the first buffer area of the buffer memory 220 may be opened. The opened buffer area may be in a state in which the data received from the host may be temporarily stored therein. Thereafter, the data related to the first application received from the host may be temporarily stored in the first buffer area. In an embodiment, a flush operation to store the data temporarily stored in the first buffer area into the first memory area may be performed after a preset period of time elapses. In another embodiment, a flush operation to store the data temporarily stored in the first buffer area into the first memory area may be performed when a preset amount of data has been written into the first buffer area.

Next, the host requests that data related to the second application be written. The data of the application 1 corresponding to LA1 may be temporarily stored in the first buffer area, and there may exist an area in which the data is not yet stored in the first buffer area. The host may request allocation of the second buffer area different from the first buffer area so that the data related to the first application and the data related to the second application are stored in different memory areas. Therefore, an area map table may be generated in which the 102nd logical address LA102 that is the logical address of data related to the second application is mapped to a physical address indicating the second memory area of the memory device 100 where the data is to be finally stored. In addition, the second buffer area of the buffer memory 220 may be opened. The data related to the second application received from the host may be temporarily stored in the second buffer area.

Next, the host requests that data related to the third application be written. In the buffer memory 220, the first buffer area and the second buffer area may be allocated, and an area in which data is empty may exist in each buffer area. The data related to the third application is to be finally stored in a memory area different from that in which the data related to the first application and the second application are stored. Therefore, the host may request allocation of the third buffer area that is not either of the first buffer area and the second buffer area. Thus, an area map table may be generated in which the 201st logical address LA201 and the 202nd logical address LA202 that are the logical addresses of data related to the third application is mapped to a physical address indicating the third memory area of the memory device 100 where the data is to be finally stored. In addition, the third buffer area of the buffer memory 220 may be opened. The data related to the third application received from the host may be temporarily stored in the third buffer area.

Thereafter, the host requests that data related to the second application having the 103rd logical address LA103 be written. In the buffer memory 220, the second buffer area that temporarily stores data related to the second application is already allocated. Accordingly, the data of the 103rd logical address LA103 may be stored in the second buffer area following the data of the 102nd logical address LA102. Therefore, the data having the 102nd logical address LA102 and the data having the 103rd logical address LA103 may be temporarily stored in the second buffer area sequentially.

Next, host requests that the data related to the first application having the second logical address LA2 be written. Since the first buffer area that temporarily stores the data related to the first application is already allocated in the buffer memory 220, the data related to the first application having the second logical address LA2 may be temporarily stored in the first buffer area following the data of the first logical address LA1. Similarly, the data of the first logical address LA1 and the data of the second logical address LA2 may be temporarily stored in the first buffer area sequentially.

Next, the host requests the data related to the third application corresponding to the 203rd logical address LA203 and the 204th logical address LA204 be written. Since the third buffer area that temporarily stores the data related to the third application is already allocated in the buffer memory 220, the data related to the application 3 corresponding to the 203rd logical address LA203 and the 204th logical address LA204 may be temporarily stored in the third buffer area following the data corresponding to the 201st and $202^{nd}$ logical addresses LA201 and LA202. Therefore, the data having the 201st to 204th logical addresses LA201 to LA204 may be temporarily stored in the third buffer area sequentially.

The flush operation in which the data temporarily stored in each buffer area is stored in the memory device 100 may be performed. Therefore, the data temporarily stored in the first buffer area may be stored in the first memory area of the memory device 100 by flushing the first buffer area. Similarly, the data temporarily stored in the second buffer area may be stored in the second memory area of the memory device 100 by flushing the second buffer area, and the data temporarily stored in the third buffer area may be stored in the third memory area of the memory device 100 by flushing the third buffer area.

According to an embodiment, although the data related to the first to third applications are received from the host in a mixed order, the data of each application may be separated and stored by allocating the buffer areas corresponding to the respective memory areas of the application. That is, according to an embodiment, the data requested to be written in a random order may be written to the memory device 100 in a sequential order. The data written in the sequential order may be read at high speed and provided to the host when a read request is input from the host.

Figure 3:
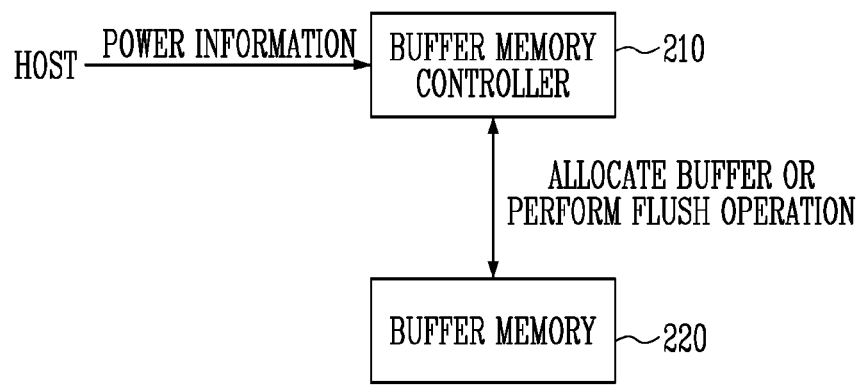
FIG. 3 illustrates allocating a buffer area of a buffer memory according to power information of the host or performing a flush operation of storing data into a memory device according to an embodiment.

FIG. 3 illustrates a buffer memory controller 210 that, depending on power information from the host, performs one or more of allocating the buffer area of the buffer memory 220 or performing the flush operation of storing data in the buffer memory 220 into a memory device.

As described with reference to FIG. 2, according to an embodiment, the plurality of buffer areas may be allocated. The sizes of the data temporarily stored in the allocated buffer areas may be different from each other. That is, a buffer area full of data may exist, and a buffer area including an area in which data is empty may exist together. This is because the size of data input for each application from the host is different, and the data is temporarily stored in distinct respective buffer areas for the plurality of applications.

As described above with reference to FIG. 1, in a situation where the input main power becomes unstable, the auxiliary power may be supplied to secure reliability of the storage device. The auxiliary power may be configured to have an energy storage capacity sufficient to ensure that an operation in which all data temporarily stored in each of the buffer areas are stored in a non-volatile memory device can be completed. The auxiliary power may be supplied during a time when all data temporarily stored in each of the buffer areas are being stored in the non-volatile memory device. In an embodiment, as the number of allocated buffer areas increases, a required amount of the auxiliary power may increase. In another embodiment, as the size of the data stored in the buffer areas increases, the required amount of the auxiliary power may increase. As the required amount of the auxiliary power increases, the auxiliary power device may require a larger number of auxiliary power cells or may require higher capacity auxiliary power cells. According to an embodiment, high reliability of data may be secured by using an auxiliary power device of the storage device (hereinafter, the storage auxiliary power device) including a limited number of auxiliary power cells of a predetermined capacity, and an auxiliary power device of a host coupled to the storage device (hereinafter, the host auxiliary power device).

Specifically, the buffer memory controller 210 may receive a buffer allocation request from the host. In addition, the buffer memory controller 210 may receive power information from the host. The power information may include information on an amount of power (for example, a number of ampere-seconds at a predetermined voltage) that may be provided from the host to the memory controller when the supply of the main power is abnormally cut off. The amount of power provided by the host may be provided by the auxiliary power cell of a host auxiliary power device included in the host.

For example, the power information may indicate that the amount of power that may be provided from the host to the memory controller is less than a predetermined threshold value. In another example, the power information may indicate that the amount of power that may be provided from the host to the memory controller is equal to or greater than the predetermined threshold value.

In an embodiment, the host may provide the power information indicating a state in which the host may provide the amount of power to the memory controller. Alternatively, the host may provide the power information indicating a state in which the amount of power that may be provided from the host to the memory controller is equal to or greater than the threshold value. The state may refer to a state in which the amount of power required while the flush operation is performed on the data temporarily stored in the buffer memory 220 may be supplied by the host. The buffer memory controller 210 may receive the power information and allocate a buffer area according to the request of the host and the power information.

In another embodiment, the size of the allocated buffer area may be changed according to the power information of the host. For example, the power information provided by the host may include power amount information that may guarantee that 4 Kbytes of data can be flushed from the buffer memory to the memory device. In this case, the size of the buffer area allocated according to the buffer allocation request of the host may be determined as 4 Kbytes. Alternatively, the power information provided by the host may include power amount information that may guarantee that 2 Kbytes of data can be flushed to the memory device. In this case, the size of the buffer area allocated according to the buffer allocation request of the host may be determined as 2 Kbytes. That is, the size of the allocated buffer area may be determined according to the power amount information provided by the host.

In an embodiment, the host may provide power information indicating a state in which the host may not provide the any auxiliary power to the memory controller. In another embodiment, power information may be provided indicating a state in which the amount of power that may be provided from the host to the memory controller is less than the predetermined threshold value. In response, the buffer memory controller 210 may perform the flush operation on some of the data temporarily stored in the buffer memory 220. After the flush operation, an additional buffer area may be allocated according to the request of the host, selectively.

Figure 4:
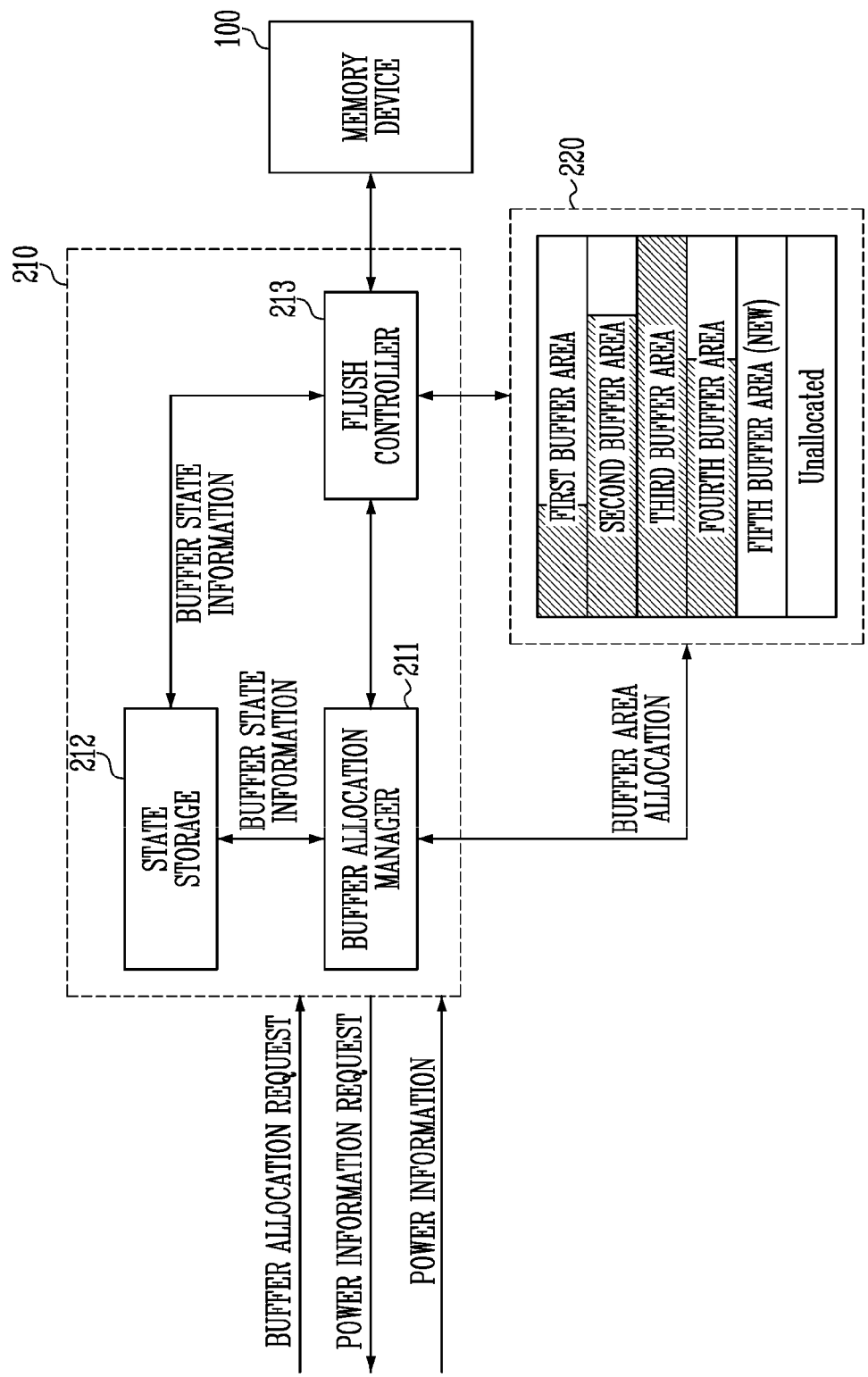
FIG. 4 illustrates an operation of a buffer memory controller according to an embodiment.

FIG. 4 is a diagram illustrating in detail operations of a buffer memory controller 210 according to an embodiment.

The buffer memory controller 210 may allocate the buffer area in response to the request received from the host. The buffer memory controller 210 may include a buffer allocation manager 211, a state storage 212, and a flush controller 213. The buffer memory 220 may include a plurality of buffer areas (first to fourth buffer areas and an unallocated area). A detailed description of the state storage 212 and the flush controller 213 will be described later with reference to FIGS. 6 to 9.

Specifically, the buffer memory controller 210 may receive the request for writing data from the host. Hereinafter, the request for writing data may be considered a buffer allocation request. Referring to FIG. 4, first to fourth buffer areas are allocated in the buffer memory 220. In this example, the buffer allocation request received from the host is a request for allocating a new buffer area different from the allocated first to fourth buffer areas.

In an embodiment, the buffer allocation manager 211 may manage a buffer allocation operation based on buffer state information included in the state storage 212 and a reference value related to auxiliary power. The buffer state information may include the number of a plurality of allocated buffer areas. Alternatively or additionally, the buffer state information may include information on size(s) of data temporarily stored in the plurality of allocated buffer areas. The reference value may include information on a state of the auxiliary power device of the storage device. For example, the buffer state information may include information corresponding to the amount of the auxiliary power that may be provided by the auxiliary power device of the storage device that includes the buffer memory controller 210.

In a first embodiment, the reference value may indicate a number of buffer areas which can be flushed using the auxiliary power provided by the storage auxiliary power device, and when the number of the plurality of allocated buffer areas is less than the reference value, the new buffer area may be allocated in response to the request from the host. In a second embodiment, the reference value may indicate an amount of data in the buffer areas which can be flushed using the auxiliary power provided by the storage auxiliary power device, and when the size of the data stored in the plurality of allocated buffer areas is less than the reference value, the new buffer area may be allocated in response to the request from the host. Referring to FIG. 4, a fifth buffer area NEW may be allocated as the new buffer area.

When, in the first embodiment, the number of allocated buffer areas is equal to greater than the number indicated by the reference value, or when, in the second embodiment, the size of the data stored in the plurality of buffer areas is equal to or greater than the amount of data indicated by reference value, a delay response may be provided with respect to the request of the host. In addition, power information may be requested and received from the host. The power information received from the host may indicate a state in which an amount of power may be provided to the memory controller even when the main power is abnormal, such as, for example, the amount of power that may be provided to the memory controller by the host auxiliary power device. For example, the power information may include information in which the amount of power that may be provided from the host is equal to or greater than a threshold value, in which case the buffer allocation manager 211 may allocate the new buffer area even though the buffer state information of the plurality of allocated buffer areas (e.g., the number of allocated buffer areas or total size of data stored therein) is equal to or greater than the reference value, because the host is in a state in which the host may provide a sufficient additional amount of auxiliary power to ensure that the additional new buffer area can also be flushed if the main power becomes abnormal. In another embodiment, the power information received from the host may indicate a state in which the sufficient amount of additional auxiliary power may not be provided to the memory controller. For example, the power information may include information in which the amount of power that may be provided from the host (and in particular, the amount that may be provided even when the main power is abnormal) is less than the threshold value, in which case the buffer allocation manager 211 may perform an operation of flushing data stored in one or more of the allocated buffer areas to the memory device 100 without allocating the new buffer area. Once the flush operation is performed, the new buffer area may be allocated. The new buffer area may be a buffer area on which the flush operation was performed. Alternatively, the new buffer area may be the new area (for example, the fifth buffer area shown in FIG. 4) other than a buffer area on which the flush operation was performed. When the flush operation is performed, the specific operation details of the flush controller 213 will be described with reference to FIGS. 6 to 7.

FIGS. 5A to 5D are diagrams illustrating respective examples of requests received from the host.

Referring to FIGS. 5A to 5D, the write request received from the host, that is, the buffer allocation request, may be implemented by various embodiments.

Figure 5A:
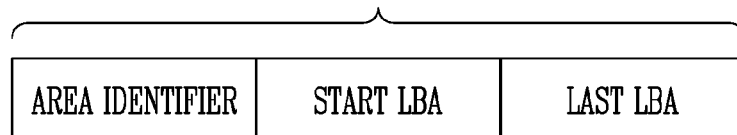
FIGS. 5A, 5B, 5C, and 5D illustrate respective examples of a request received from the host by a memory controller according to an embodiment.

Referring to FIG. 5A, the buffer allocation request may include an area identifier, a start LBA, and a last LBA. The area identifier may indicate an application type of the data requested to be written by the host. In another embodiment, the area identifier may indicate the memory area in which data is to be stored in the memory device. Alternatively, the area identifier may indicate the buffer area corresponding to the memory area in which data is to be stored in the memory device. The start LBA and the last LBA may indicate a start LBA and a last LBA of the data requested to be written, respectively. The size of the data may be calculated as a value corresponding to a difference between the start LBA and the last LBA.

Figure 5B:

Referring to FIG. 5B, the buffer allocation request may include the area identifier, the start LBA and data size information. The description repetitive to the description related to FIG. 5A is omitted. When the size information of DATA is known, the last LBA may be calculated from the start LBA.

Figure 5C:

Referring to FIG. 5C, the buffer allocation request may include the start LBA and the last LBA. The type of the application may be distinguished according to a range of LBA. For example. as described with reference to FIG. 2, the logical address of data related to a first application may include LA1 to LA99, the logical address of data related to a second application may include LA100 to LA199, and the logical address of the data related to a third application may include LA200 to LA299. Therefore, a relationship between the data and the application may be recognized according to the start LA provided by the host. In addition, since each application is stored in a different memory area, information on a memory area where the application is to be stored or a buffer area corresponding thereto may be obtained. The size of the data may be calculated as a value corresponding to the difference between the start LA and the last LA.

Figure 5D:

Referring to FIG. 5D, the buffer allocation request may include the start LBA and the data size information. Similarly, the type of the application may be distinguished according to the start LBA. In addition, when the size information of data is known, the last LBA may be calculated from the start LBA.

FIG. 6 illustrates an operation of the flush controller 213 according to an embodiment.

Referring to FIG. 6, the buffer memory 220 may include a plurality of allocated buffer areas (first to tenth buffer areas). Each of the plurality of buffer areas may include data on applications that are distinguished from each other. Sizes of data stored in each of the plurality of buffer areas may be different from each other. For example, the sixth buffer area may include data corresponding to a total size of the sixth buffer area. That is, the sixth buffer area may be full of data. In addition, the first buffer area may include data of the smallest size. That is, the first buffer area may not be full.

In an embodiment, it is assumed that a request is received from the host to allocate a new buffer area other than the first to tenth buffer areas, and the power information provided by the host indicates a state in which additional auxiliary power may not be provided by the host to the memory controller if the main power become abnormal. The flush controller 213 of FIG. 4 may sense the state of the buffer memory 220 or perform the flush operation on the temporarily stored data according to the buffer state information stored in the state storage 212. The flush controller 213 may select the sixth buffer area including the most temporarily stored data among the first to tenth buffer areas as a target to perform the flush operation. Then the flush controller 213 may control the memory device 100 to store the data stored the sixth buffer area into a sixth memory area corresponding to the sixth buffer area in the memory device 100. For convenience of description, the first to tenth memory areas are illustrated as being sequentially arranged, but an order of the respective memory areas is not limited thereto.

FIG. 7 illustrates the operation of the flush controller following the operation of FIG. 6.

Referring to FIG. 7, the sixth buffer area may indicate a state in which temporarily stored data is stored in the sixth memory area; that is, sixth buffer area has been flushed to the sixth memory area. In an embodiment, the sixth buffer area may therefore no longer be an allocated buffer area. Accordingly, when the buffer allocation request is newly input from the host, the sixth buffer area may be allocated to store data again. At this time, the buffer allocation request may correspond to a memory area other than the sixth memory area. For example, when a buffer allocation request for an eleventh memory area (not shown) included in the memory device 100 is input, the sixth buffer area may be designated to temporarily store data to be stored in the eleventh memory area (memory). That is, the buffer areas do not respectively correspond to physically fixed memory areas but may each be dynamically linked with a respective memory area. Thus, when a buffer area is re-used after being flushed, either or both of a LA range and a PA range associated with the buffer area may be changed.

After the flush controller 213 performs the flush operation on the sixth memory area, the flush controller 213 may select the ninth buffer area having the most temporarily stored data among the remaining buffer areas as a target for the next flush operation. Then the flush controller 213 may control the memory device 100 to store the data in the ninth buffer area into a corresponding ninth memory area in the memory device 100. In an embodiment, the flush controller 213 performing the flush operation may include adding dummy data to the data temporarily stored in the ninth buffer area when the size of the write data received from the host and stored into the ninth buffer area is less than a size of the ninth buffer area. As described above, the ninth memory area and the sixth memory area may be distinguished from each other, and the data stored in each of the ninth memory area and the sixth memory area may be data related to different applications.

Figures 8, 9:
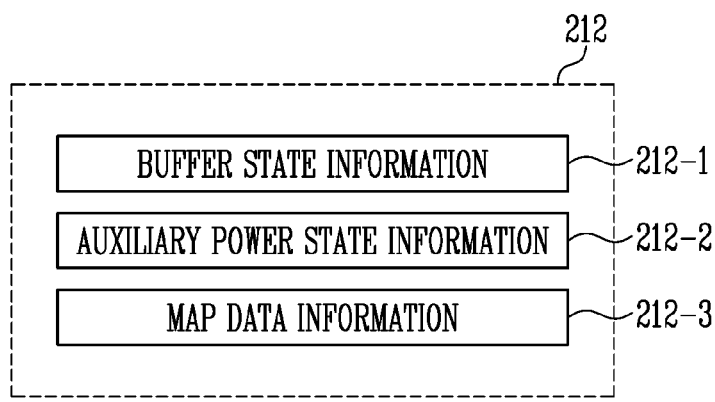
FIG. 8 illustrates a state storage of FIG. 4 according to an embodiment.
FIG. 9 illustrates buffer state information of FIG. 8 according to an embodiment.

FIG. 8 is a diagram illustrating the state storage of FIG. 4 according to an embodiment.

Referring to FIG. 8, the state storage 212 may include buffer state information 212-1, auxiliary power state information 212-2, and map data information 212-3.

The buffer state information 212-1 may include information on the state of the buffer memory. A more detailed description of the buffer state information 212-1 will be described later with reference to FIG. 9.

The auxiliary power state information 212-2 may include information on the state of the auxiliary power device 300 shown in FIG. 1. The auxiliary power state information 212-2 may correspond to the reference value described with reference to FIG. 4. Furthermore, the auxiliary power state information 212-2 may include information on the auxiliary power cells included in the auxiliary power device 300. The auxiliary power cells may include normal auxiliary power cells and defective auxiliary power cells. The normal auxiliary power cells may refer to cells capable of providing the auxiliary power when the supply of the main power is abnormally cut off. The defective auxiliary power cells may refer to cells that are not capable of providing the auxiliary power when the supply of the main power is abnormally cut off.

The auxiliary power state information 212-2 may include at least one of information on the number of normal auxiliary power cells and information on the number of defective auxiliary power cells. In another embodiment, the auxiliary power state information 212-2 may include information on the amount of power that may be provided to the memory controller and the memory device from the auxiliary power device 300.

As a result of repeating charging and discharging of the auxiliary power cells included in the auxiliary power device 300, some auxiliary power cells may deteriorate and thus one or more defective auxiliary power cells may occur. As the number of defective auxiliary power cells increases, the amount of auxiliary power that may be supplied from the auxiliary power device 300 may decrease. When a change in which the number of defective auxiliary power cells increases or the amount of the auxiliary power that may be supplied from the auxiliary power device 300 decreases, information on the changed state of the auxiliary power device 300 may be stored in the state storage 212. The information on the changed state of the auxiliary power device 300 may be the reference value. In addition, when the buffer allocation request is received from the host, the buffer allocation manager may determine a subsequent operation based on the reference value, which is the auxiliary power state information 212-2 stored in the state storage 212, and the buffer state information 212-1 on the plurality of allocated buffer areas. That is, it may be determined whether to respond to the request from the host by allocating an additional buffer area or by performing the flush operation of storing some or all of the data temporarily stored in the allocated buffer areas into the memory device. That is, when the amount of power that may be supplied from the auxiliary power device 300 decreases, the reference value may also decrease accordingly. The decreased reference value may be compared with information on the plurality of allocated buffer areas (such as the number of allocated buffer areas or the amount of data stored or capable of being stored in the allocated buffer areas). When a value corresponding to the information on the plurality of allocated buffer areas is less than the decreased reference value, the additional buffer area may be allocated in response to the request of the host. When the value corresponding to the information on the plurality of allocated buffer areas is equal to or greater than the decreased reference value, the power information may be requested to the host.

The map data information 212-3 may include the mapping relationship of the physical address indicating the memory area in the memory device corresponding to the logical address received from the host.

FIG. 9 illustrates the buffer state information of FIG. 8.

Referring to FIG. 9, the buffer state information 212-1 may include information on the allocated buffer areas. Specifically, the buffer state information 212-1 may include a buffer area address, a zone identifier, and a stored data size for each allocated buffer area. The buffer area address may be an address indicating a position allocated to a corresponding buffer area in the buffer memory. The zone identifier may indicate the memory areas corresponding to the respective buffer areas. The stored data size may indicate the size or amount of the data stored in each buffer area.

For example, referring to FIG. 9, the number of allocated buffer areas may be eight. In addition, the sizes or amounts of the data stored in each of the buffer areas may be different from each other. An address of the first buffer area may be BFADD1. The size of data temporarily stored in the first buffer area may be 4 Kbytes. An address of the second buffer area may be BFADD2. The size of data temporarily stored in the second buffer area may be 2 Kbytes. The size of data temporarily stored in the third, fourth, fifth, sixth, seventh, and eighth buffer areas may be 1 Kbyte, 2 Kbyte, 2 Kbyte, 4 Kbyte, 2 Kbyte, and 1 Kbyte, respectively.

When the allocation request of the additional buffer area is input, the buffer allocation manager 211 described with reference to FIG. 4 may determine whether to allocate the additional buffer area based on the number of allocated buffer areas included in the buffer state information. In another embodiment, determining whether to allocate the additional buffer area may be based on size information of the data stored in the buffer areas included in the buffer state information.

Specifically, in an embodiment, the buffer allocation manager 211 may compare the reference value included in the auxiliary power state information 212-2 with the number of the plurality of allocated buffer areas. In another embodiment, the buffer allocation manager 211 may compare a value obtained by adding the number of the plurality of allocated buffer areas and the number of buffer areas requested by the host with the reference value.

In an embodiment, when the request for additionally allocating the new buffer area is received, the state of the auxiliary power device may be a state capable of guaranteeing that the data temporarily stored in the allocated buffer areas can be stored in the memory device using the power from the auxiliary power device. That is, the auxiliary power device may have the amount of power that may need to be provided to the memory device and the memory controller during the time when the data which is temporarily stored in the allocated buffer areas is stored in the memory device. In another embodiment, the number of allocated buffer areas may be less than the reference value, which is the number of buffer areas in which the auxiliary power device may guarantee completion of the flush operation, and therefore the buffer allocation manager 211 further allocates the buffer area in response to the request from the host.

In another embodiment, it may be the case that the auxiliary power device may not have enough stored energy to guarantee that the data which is temporarily stored in the plurality of buffer areas can be stored in the memory device when the request for allocating the additional new buffer area is input. That is, the reference value, which indicates the number of buffer areas that the auxiliary power device may guarantee the completion of the flush operation of, may be less than or equal to the number of allocated buffer areas. When this is the case, the buffer allocation manager 211 may provide to the host the delay response for delaying the allocation of the new buffer area.

Referring to FIGS. 4 and 9, although the buffer state information 212-1 is shown as being outside of the buffer memory 220, in various embodiments, the buffer state information 212-1 may be included in the buffer memory 220. That is, the buffer memory 220 may include a meta area including information on the plurality of buffer areas. The meta area may be a space in which the buffer state information 212-1 that is the information on the plurality of buffer areas is stored.

Figure 10:
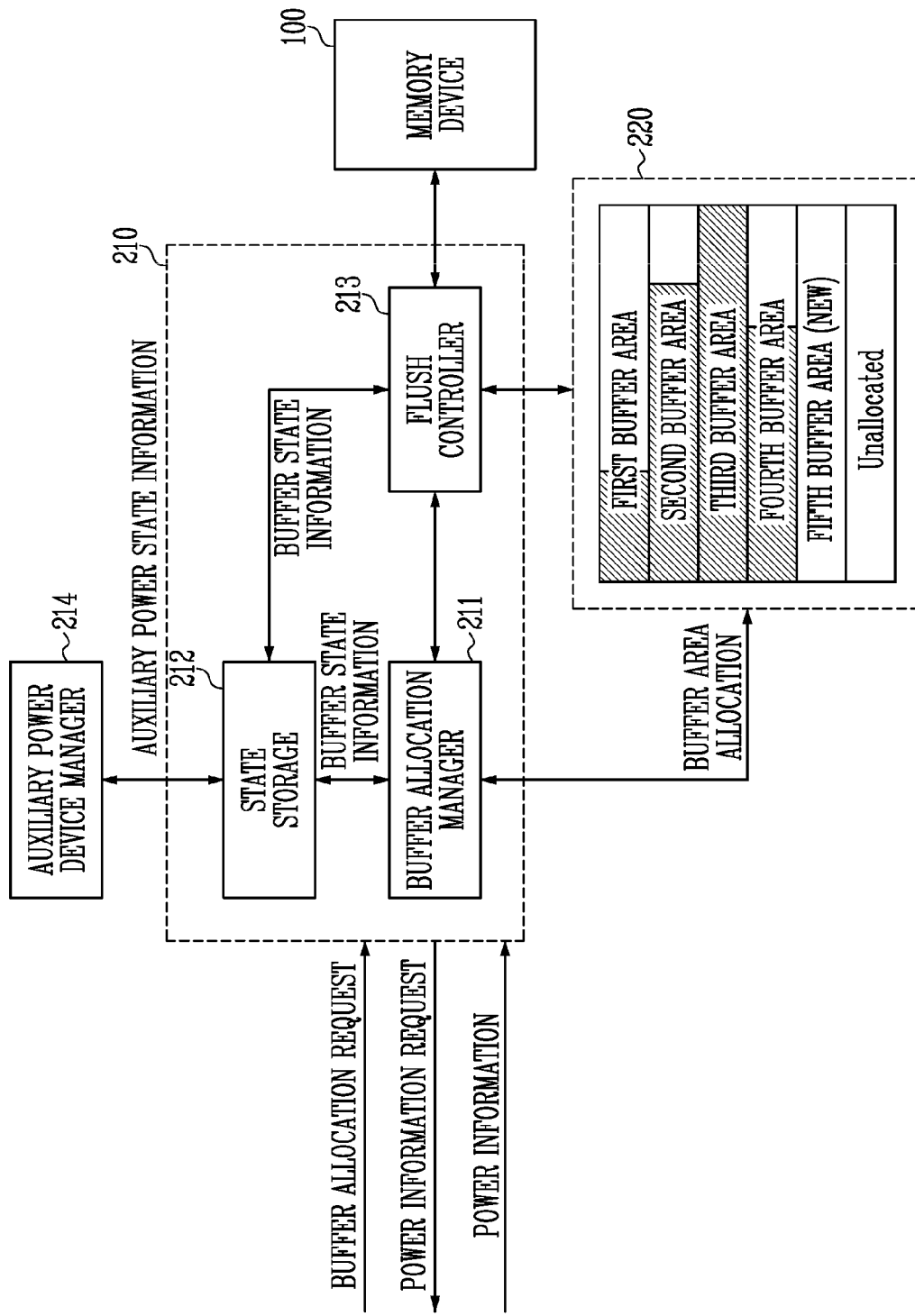
FIG. 10 illustrates an update of auxiliary power state information of FIG. 8 according to an embodiment.

FIG. 10 is a diagram for describing an update of the auxiliary power state information of FIG. 8.

Referring to FIG. 10, the memory controller may further include an auxiliary power device manager 214. The auxiliary power device manager 214 may sense the state of the auxiliary power device (such as the auxiliary power device 300 of FIG. 1) that supplies auxiliary power when the supply of the main power is abnormal. That is, the auxiliary power device manager 214 may monitor the state of the auxiliary power device. For example, when the size of the auxiliary power that may be provided from the auxiliary power device changes, the auxiliary power device manager 214 may monitor changed auxiliary power size or amount information and provide changed auxiliary power state information to the state storage 212. When some of the normal auxiliary power cells degrade into defective auxiliary power cells, the amount of the auxiliary power that may be supplied may be reduced. Information corresponding to the reduced auxiliary power amount may be stored in the state storage 212.

For example, the amount of auxiliary power that may be provided by the auxiliary power device may be reduced due to the increase of the number of defective auxiliary power cells. When the supply of the main power is abnormally cut off, the memory controller 200 needs the auxiliary power to control the memory device 100 so that the data which is temporarily stored in the plurality of buffer areas can be stored in the memory device 100. In an embodiment, when the size of the auxiliary power that may be provided is reduced due to the defective auxiliary power cell(s) in the auxiliary power device, the buffer allocation manager 211 may be required to allocate a smaller number of buffer areas than before. In another embodiment, the buffer allocation manager 211 may be required to manage the plurality of buffer areas so that the size of the data temporarily stored in the plurality of buffer areas is reduced. According to an embodiment, the auxiliary power state information stored in the state storage 212 may be updated by the auxiliary power device manager 214. In an embodiment, the updated auxiliary power state information may be compared with the number of allocated buffer areas by using the reference value described above. In another embodiment, the updated auxiliary power state information may be the reference value described with reference to FIG. 4 that is compared with the size of the data stored in the allocated buffer areas. Since components shown in FIG. 10 are substantially the same as the like-numbered components shown in FIG. 4 except for the auxiliary power device manager 214, repetitive descriptions are omitted.

Figure 11:
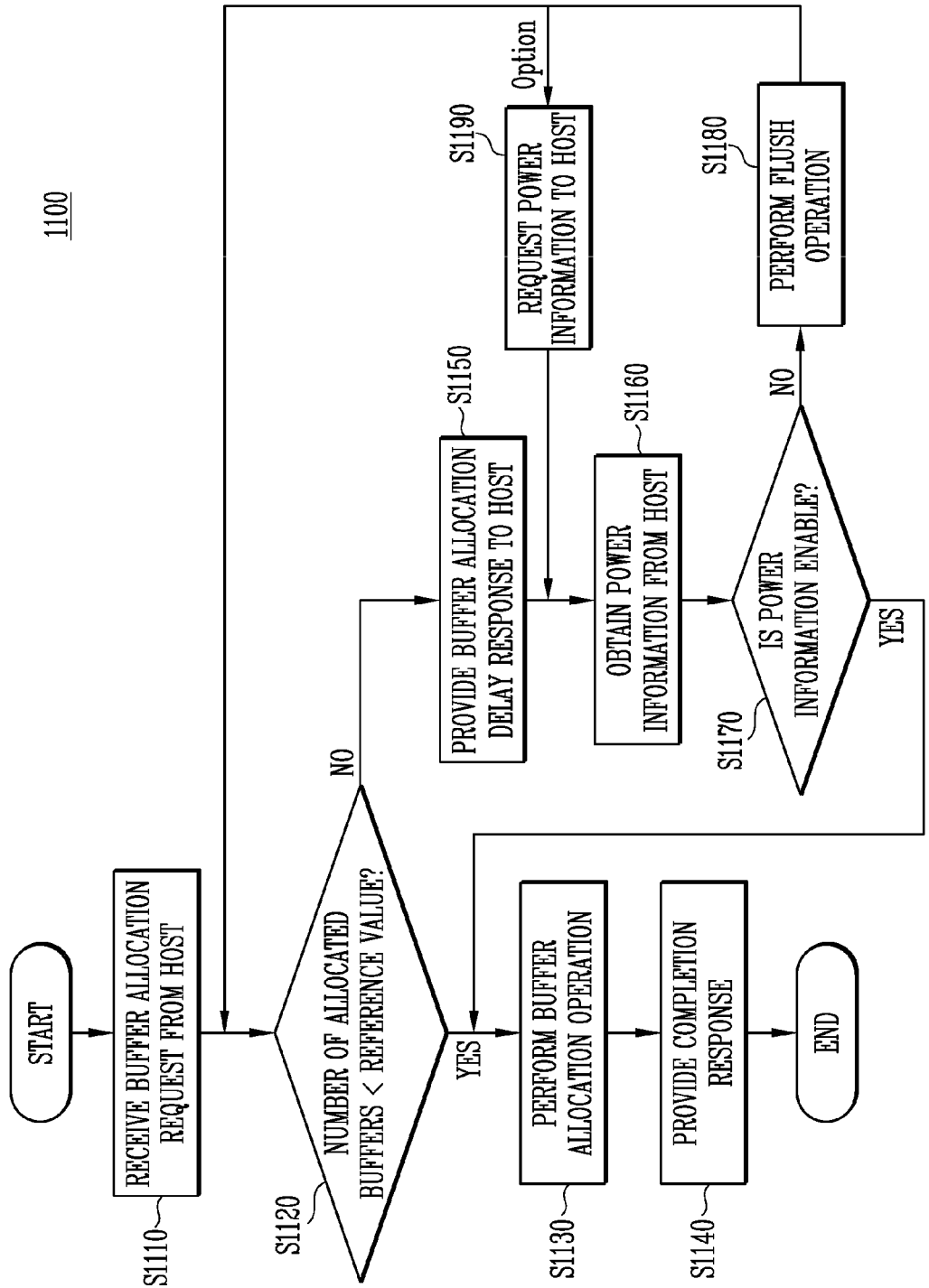
FIG. 11 illustrates a process of operating the buffer memory controller according to an embodiment.

FIG. 11 illustrates a process 1100 of operating the buffer memory controller according to an embodiment.

In step S1110, the buffer memory controller may receive a buffer allocation request from the host. The buffer allocation request may be the request for allocating the new buffer area different from the already-allocated buffer areas.

In step S1120, the buffer memory controller may compare the number of allocated buffers with the reference value. The buffer memory controller may include the state storage. The state storage may include information on the state of any allocated buffers and information indicating the state of the auxiliary power of an auxiliary power device included in the storage device. The information indicating the state of the auxiliary power may be a reference value related to guaranteeing that the data temporarily stored in the plurality of buffer areas can be stored in the memory device when the auxiliary power is supplied. The reference value may be determined according to the size (i.e., the energy storage capacity) of the auxiliary power device. When the size of the auxiliary power decreases or increases, the reference value may also decrease or increase in correspondence therewith. The changed reference value may be updated and stored in the state storage. In the embodiment of FIG. 11, when the number of currently allocated buffers is less than a number of buffers indicated by the reference value, the process 1100 may proceed to step S1130. When the number of currently allocated buffers is equal to or greater than the number of buffers indicated by the reference value, the process 1100 may proceed to step S1150.

In step S1130, a buffer allocation operation in which the new buffer area is allocated may be performed in response to the request of the host, and in step S1140 a completion response indicating that the buffer area has been allocated is sent to the host.

In step S1150, in response to the request from the host, the buffer memory controller may provide the delay response for delaying the new buffer allocation to the host. The delay response may indicate to the host 400 that the requested allocation a new buffer area was not performed.

In step S1160, the buffer memory controller may request the power information to the host. The power information may include the information on the amount of power that may be provided from the host to the memory controller when the main power is abnormally cut off. The host may provide the power information in response to the request.

In step S1170, the power information received from the host may include enable information indicating that the host is in a state in which the host may provide the amount of power to the memory controller, or disable information indicating that the host is in a state in which the host may not provide the amount of power to the memory controller. In another example, the power information may include information indicating that the amount of power that may be provided from the host is equal to or greater than a predetermined threshold value or information indicating that the amount of power that may be provided from the host is less than the predetermined threshold value. When the power information received from the host is the enable information or the information indicating that the amount of power that may be provided from the host is equal to or greater than the predetermined threshold value, the process 1100 may proceed to step S1130. When the power information received from the host is the disable information or the information indicating that the amount of power that may be provided from the host is less than the predetermined threshold value, the process 1100 may proceed to step S1180.

In step S1180, the buffer memory controller may perform the flush operation of storing data which is temporarily stored in at least one of the plurality of buffer areas into the memory device. In an embodiment, the buffer memory controller may perform the flush operation by preferentially selecting a buffer area of which the size of the stored data is large based on the respective sizes of the data stored in the plurality of buffer areas. After the flush operation is performed, the process 1100 may proceed to step S1120 where the number of buffer areas allocated is compared with the reference value again. In another embodiment, after the flush operation is performed, the process 1100 may proceed to step S1160 of requesting and receiving the power information from the host.

According to an embodiment, the number of buffers buffer areas allocated may be determined not only according to the auxiliary power of the storage device, but also according to a power of the host, or the flush operation in which the data temporarily stored in the buffer is stored into the memory device may be performed. In this manner, the reliability of the storage device may be improved. For example, when a storage device receives a request to allocate a new buffer area that would increase the number of allocated buffer areas (or the size of the data stored in the allocated buffer areas) beyond the capacity of an auxiliary power device to guarantee the safety of if an unexpected cut off of main power occurs, then when the host indicates it can provide additional power if the unexpected cut off of main power occurs, the new buffer area may be allocated; otherwise, one or more of the allocated buffer areas are flushed before the new buffer area is allocated.

Figure 12:
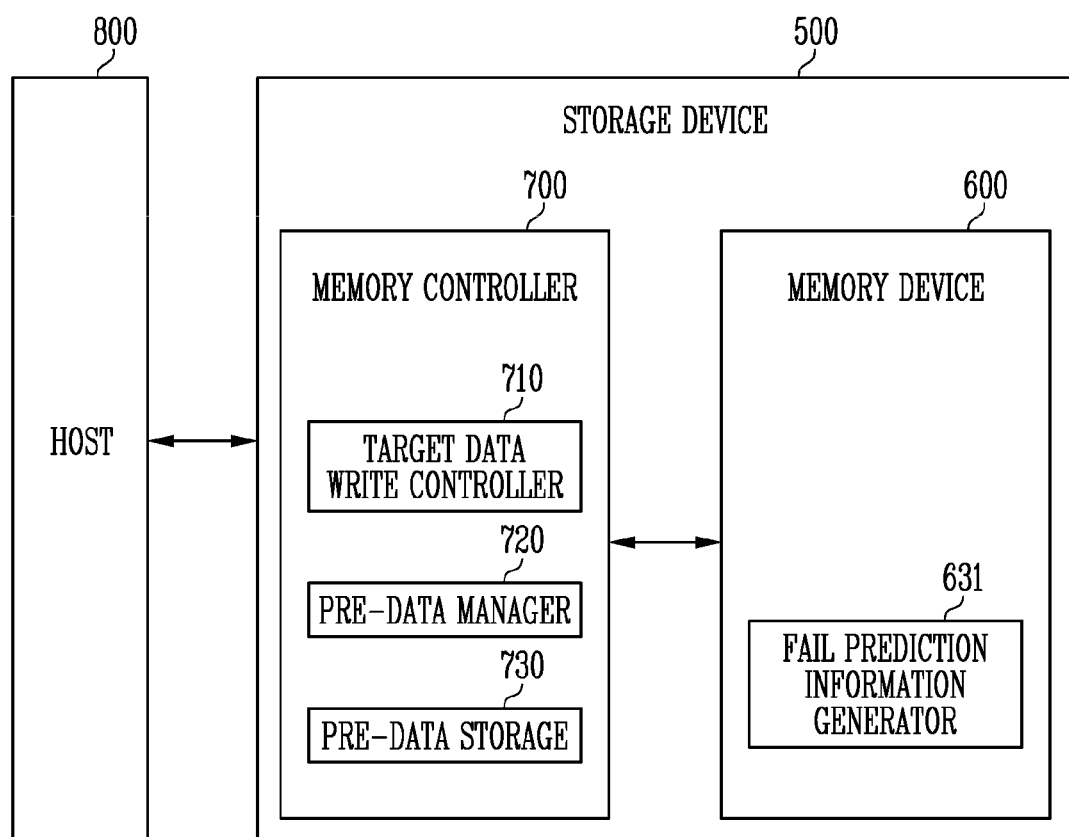
FIG. 12 illustrates a storage device according to an embodiment of the present disclosure.

2. Read Look-Ahead Technology to Minimize Data Loss Due to Program Operation Fail FIG. 12 illustrates a storage device 500 according to an embodiment of the present disclosure.

The storage device 500 may include a memory device 600 and a memory controller 700 that controls an operation of the memory device.

The storage device 500 may be a device that stores data under control of a host 800 such as a cellular phone, a smartphone, an MP3 player, a laptop computer, a desktop computer, a game player, a TV, a tablet PC, or an in-vehicle infotainment system.

The storage device 500 may be manufactured as one of various types of storage devices according to a host interface that is a communication method with the host 800. For example, the storage device 500 may be configured as any one of various types of storage devices such as an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The storage device 500 may be manufactured as any one of various types of packages. For example, the storage device 500 may be manufactured as any one of various types of package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 600 may store data. The memory device 600 operates under control of the memory controller 700. The memory device 600 may include a memory cell array including a plurality of memory cells that store data.

Each of the memory cells may be configured as a single level cell (SLC) storing one data bit, a multi-level cell (MLC) storing two data bits, a triple level cell (TLC) storing three data bits, or a quad level cell (QLC) storing four data bits.

The memory cell array may include a plurality of memory blocks. Each memory block may include a plurality of pages, and each page may include a plurality of memory cells. In an embodiment, the page may be a unit for storing data in the memory device 600 or reading data stored in the memory device 600. The memory block may be a unit for erasing data.

In an embodiment, the memory device 600 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory device, a resistive random access memory (RRAM), a phase-change memory (PRAM), a magnetoresistive random access memory (MRAM), a ferroelectric random access memory (FRAM), a spin transfer torque random access memory (STT-RAM), or the like. In the present specification, for convenience of description, it is assumed that the memory device 600 is a NAND flash memory, and in particular may be a 3D NAND flash memory where one physical word line may drive a plurality of pages.

The memory device 600 may receive a command and an address from the memory controller 700. The memory device 600 is configured to access a portion of the memory selected by the received address of the memory cell array.

Accessing the selected portion means performing an operation corresponding to the received command on the selected portion. For example, the memory device 600 may perform a write operation (program operation), a read operation, or an erase operation. During the program operation, the portion selected may be a page, and the memory device 600 may program data to the page selected by the address. During the read operation, the portion selected may be a page, and the memory device 600 may read data from the page selected by the address. During the erase operation, the portion selected may be a block, and the memory device 600 may erase data stored in the block selected by the address.

In an embodiment, the memory device 600 may include a fail prediction information generator 631.

The fail prediction information generator 631 may receive a fail prediction request for determining a program fail probability from the memory controller 700 and generate fail prediction information. The fail prediction information may be information indicating a program fail probability.

Specifically, the fail prediction information generator 131 may generate the fail prediction information based on a resistance component of a bit line or a word line connected to a storage region to be programmed. The fail prediction information generator 631 may measure the current flowing through bit lines and/or word lines connected to memory cells included in the storage region, and determine a value of the resistance component based on the measured current. For example, when the value of the measured current is less than a reference value, the fail prediction information generator 631 may determine that the resistance component is relatively large, and transmit fail prediction information indicating that the program fail probability is relatively high to the memory controller 700. When the value of the measured current is equal to or greater than the reference value, the fail prediction information generator 631 may determine that the resistance component is relatively small, and transmit fail prediction information indicating that the program fail probability is relatively low to the memory controller 700. As used herein, the terms "connected to" and "coupled to" are used interchangeably. The term "connected to" does not require a direct connection between two elements unless such meaning is required from the context.

When the resistance component of the word line is relatively large, a threshold voltage of the memory cell may be abnormally increased when an operation voltage, such as a program voltage, is applied to the word line. When the resistance component of the word line is relatively large, the threshold voltage of the memory cell may increase by an amount less than when the resistance component of the word line is relatively small. Therefore, when the resistance component of the word line is relatively large, the probability of program failure may be relatively high.

When the resistance component of the bit line is relatively large, a channel of a cell in a memory cell string may be abnormally pre-charged when the bit line is pre-charged. For example, the channel of a cell in an unselected string may be pre-charged to a program inhibit voltage. The program inhibit voltage may be a power voltage Vcc. When the resistance component of the bit line is relatively large, a channel potential of the unselected string may be inappropriately high, and as a result the threshold voltage of a cell in the unselected string may be altered when it should not be. Therefore, the probability of program failure may be relatively high.

When power is applied to the storage device 500, the memory controller 700 may execute firmware (FW). The firmware FW may include a host interface layer HIL that receives the request input from the host 800 or outputs a response to the host 800, a flash translation layer (FTL) that manages an operation between an interface of the host 300 and an interface of the memory device 600, and a flash interface layer (FIL) that provides a command to the memory device 600 or receive the response from the memory device 600.

The memory controller 700 may receive data and a logical address (LA) from the host 800, and may convert the logical address into a physical address (PA) indicating an address of memory cells in which data included in the memory device 600 is to be stored. The LA may be a logical block address (LBA), and the PA may be a physical block address (PBA).

The memory controller 700 may control the memory device 600 to perform the program operation, the read operation, or the erase operation according to the request of the host 800. During the program operation, the memory controller 700 may provide a program command, the PBA, and data to the memory device 600. During the read operation, the memory controller 700 may provide a read command and the PBA to the memory device 600. During the erase operation, the memory controller 700 may provide an erase command and the PBA to the memory device 600.

The memory controller 700 may control the memory device 600 to perform the program operation, the read operation, or the erase operation by itself regardless of the request from the host 800. For example, the memory controller 700 may control the memory device 600 to perform the program operation, the read operation, or the erase operation used to perform a background operation such as wear leveling, garbage collection, or read reclaim.

In an embodiment, the memory controller 700 may include a target data write controller 710, a pre-data manager 720, and a pre-data storage 730.

The target data write controller 710 may control the memory device 600 to store target data at a target location, which in embodiments may be a physical address. The target data write controller 710 may program the target data at another location when a write operation at the target location fails.

The pre-data manager 720 may control the memory device 600 to manage pre-data (that is, previously-stored data) stored at a pre-data location. The pre-data manager 720 may back up the pre-data stored at the pre-data location before the target data is stored in the target location. Specifically, the pre-data manager 720 may read the pre-data from the pre-data location in the memory device 600 and temporarily store the pre-data in the pre-data storage 730. When the program operation for the target location fails, the pre-data manager 720 may program the backed up pre-data at another location.

The pre-data storage 730 may temporarily store the data read in the pre-data location under control of the pre-data manager 720.

The pre-data may be data stored in the memory device 600 before the target data is stored in the memory device 600.

The host 800 may communicate with the storage device 500 using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

Figure 13:
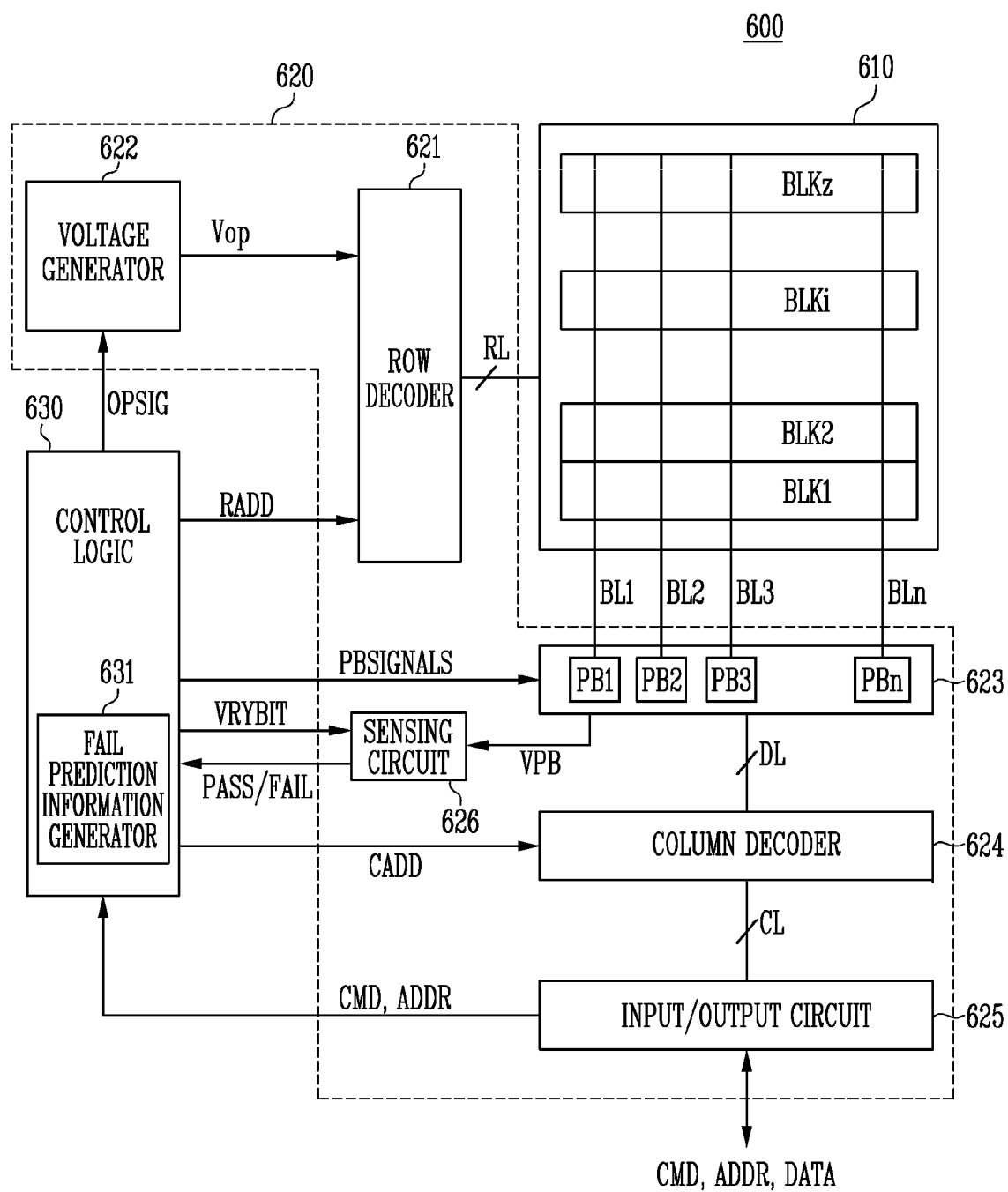
FIG. 13 illustrates a memory device.

FIG. 13 is a diagram for describing the memory device.

Referring to FIG. 13, the memory device 600 may include a memory cell array 610, a peripheral circuit 620, and a control logic 630.

The memory cell array 610 includes a plurality of memory blocks BLK1 to BLKz. The plurality of memory blocks BLK1 to BLKz are connected to a row decoder 621 through row lines RL. The memory blocks BLK1 to BLKz may be connected to a page buffer group 623 through bit lines BL1 to BLn. Each of the plurality of memory blocks BLK1 to BLKz includes a plurality of memory cells. In an embodiment, the plurality of memory cells are non-volatile memory cells. Memory cells connected to a word line may be referred to as a page, or as a plurality of pages depending on the design of the memory cell array. Thus, one memory block may include a plurality of pages.

The row lines RL may include at least one source select line (SSL), a plurality of word lines, and at least one drain select line (DSL).

Each of the memory cells included in the memory cell array 610 may be configured as a single level cell (SLC) storing one data bit, a multi-level cell (MLC) storing two data bits, a triple level cell (TLC) storing three data bits, or a quad level cell (QLC) storing four data bits.

The peripheral circuit 620 may be configured to perform the program operation, the read operation, or the erase operation on a selected region of the memory cell array 610 under control of the control logic 630. The peripheral circuit 620 may drive the memory cell array 610. For example, the peripheral circuit 620 may apply various operation voltages to the row lines RL and the bit lines BL1 to BLn or discharge the applied voltages under the control of the control logic 630.

The peripheral circuit 620 may include the row decoder 621, a voltage generator 622, the page buffer group 623, a column decoder 624, and an input/output circuit 625.

The row decoder 621 is connected to the memory cell array 610 through the row lines RL. The row lines RL may include at least one source select line, a plurality of word lines, and at least one drain select line. In an embodiment, the word lines may include normal word lines and dummy word lines. In an embodiment, the row lines RL may further include a pipe select line.

The row decoder 621 is configured to operate in response to the control of the control logic 630. The row decoder 621 receives a row address RADD from the control logic 630.

The row decoder 621 is configured to decode the row address RADD. The row decoder 621 selects at least one memory block among the memory blocks BLK1 to BLKz according to a decoded address. In addition, the row decoder 621 may select at least one word line of the memory block selected to apply voltages generated by the voltage generator 622 to at least one word line WL according to the decoded address.

For example, during the program operation, the row decoder 621 may apply a program voltage to a selected word line and apply a program pass voltage of a level lower than that of the program voltage to unselected word lines. During a program verification, the row decoder 621 may apply a verify voltage to the selected word line and apply a verify pass voltage higher than the verify voltage to the unselected word lines. During the read operation, the row decoder 621 may apply a read voltage to the selected word line and apply a read pass voltage higher than the read voltage to the unselected word lines.

In an embodiment, the erase operation of the memory cell array 610 is performed in a memory block unit. During the erase operation, the row decoder 621 may select one memory block according to the decoded address. During the erase operation, the row decoder 621 may apply a ground voltage to word lines connected to the selected memory block.

The voltage generator 622 operates in response to the control of the control logic 630. The voltage generator 622 is configured to generate a plurality of voltages using an external power voltage supplied to the memory device. Specifically, the voltage generator 622 may generate various operation voltages Vop used in the program, read, and erase operations in response to operation signal OPSIG. For example, the voltage generator 622 may generate a program voltage, a verify voltage, a pass voltage, a read voltage, an erase voltage, and the like in response to the control of the control logic 630.

In an embodiment, the voltage generator 622 may generate an internal power voltage by regulating an external power voltage. The internal power voltage generated by the voltage generator 622 is used as an operation voltage of the memory cell array 610.

In an embodiment, the voltage generator 622 may generate a plurality of voltages using an external power voltage or an internal power voltage.

For example, the voltage generator 622 may include a plurality of pumping capacitors that receive the internal power voltage, and selectively activate the plurality of pumping capacitors in response to the control of the control logic 630 to generate the plurality of voltages.

The generated plurality of voltages may be supplied to the memory cell array 610 by the row decoder 621.

The buffer group 623 includes first to n-th page buffers PB1 to PBn. The first to n-th page buffers PB1 to PBn are connected to the memory cell array 610 through the first to n-th bit lines BL1 to BLn, respectively. The first to n-th page buffers PB1 to PBn operate under the control of the control logic 130. Specifically, the first to n-th page buffers PB1 to PBn may operate in response to page buffer control signals PBSIGNALS. For example, the first to n-th page buffers PB1 to PBn may temporarily store data received through the first to n-th bit lines BL1 to BLn, or may sense a voltage generated by a current flowing in the bit lines BL1 to BLn during the read operation or the program verification.

Specifically, during the program operation, when a program pulse is applied to the selected word line, the first to n-th page buffers PB1 to PBn may transfer data DATA, which is received through the data input/output circuit 625, to selected memory cells through the first to n-th bit lines BL1 to BLn. The memory cells of the selected page are programmed according to the transferred data DATA. A memory cell connected to a bit line to which a program permission voltage (for example, the ground voltage) is applied may have its threshold voltage increased. A threshold voltage of a memory cell connected to a bit line to which a program inhibit voltage (for example, the power voltage) is applied may be maintained. During the program verification, the first to n-th page buffers PB1 to PBn read page data from the selected memory cells through the first to n-th bit lines BL1 to BLn.

During the read operation, the first to n-th page buffers PB1 to PBn read the data DATA from the memory cells of a selected page through the first to n-th bit lines BL1 to BLn, and outputs the read data DATA to the data input/output circuit 625 under control of the column decoder 624.

During the erase operation, the first to n-th page buffers PB1 to PBn may float the first to n-th bit lines BL1 to BLn.

The column decoder 624 may transfer data between the input/output circuit 625 and the page buffer group 623 in response to the column address CADD. For example, the column decoder 624 may exchange data with the first to n-th page buffers PB1 to PBn through data lines DL or may exchange data with the input/output circuit 625 through column lines CL.

The input/output circuit 625 may provide the command CMD and the address ADDR received from the memory controller 700 described with reference to FIG. 12 to the control logic 630, or may exchange the data DATA with the column decoder 624.

The sensing circuit 626 may generate a reference current in response to a permission bit signal VRYBIT during the read operation or the program verification, and may compare a sensing voltage VPB received from the page buffer group 623 with a reference voltage generated by the reference current to output a pass signal PASS or a fail signal FAIL.

The control logic 630 may output the operation signal OPSIG, the row address RADD, the page buffer control signals PBSIGNALS, and the permission bit signal VRYBIT in response to the command CMD and the address ADDR to control the peripheral circuit 620. In addition, the control logic 630 may determine whether the program verification has passed or failed in response to the pass or fail signal PASS or FAIL.

In an embodiment, the control logic 630 may include fail prediction information generator 631.

The fail prediction information generator 631 may generate fail prediction information in response to a fail prediction request received from the pre-data manager 720 of FIG. 12. The fail prediction information may be information indicating the fail probability of the program operation. The fail prediction request may be included in a status read command or a read command.

The fail prediction information generator 631 may provide fail prediction information to the memory controller 700 from a status register (not shown) included in the control logic 630. Alternatively, the fail prediction information generator 631 may provide the fail prediction information temporarily stored in the page buffer group 623 to the memory controller 700.

The fail prediction information may be generated based on data sensed through a bit line when the pass voltage is applied to all word lines. Data sensed through a bit line through which the current greater than the reference current flows may be different from data sensed through a bit line through which the current equal to or less than the reference current flows. Therefore, the fail probability of the target location may be determined through the data sensed through the bit lines connected to the target location.

The fail prediction information generator 631 may generate the fail prediction information based on the data sensed from the bit line and provide the fail prediction information to the memory controller 700. The fail prediction information may be generated based on the current flowing through the bit line, but an embodiment of the present disclosure is not limited thereto. For example, the fail prediction information generator 631 may generate the fail prediction information based on a comparison result between a current flowing through the word line and the reference current.

Figure 14:
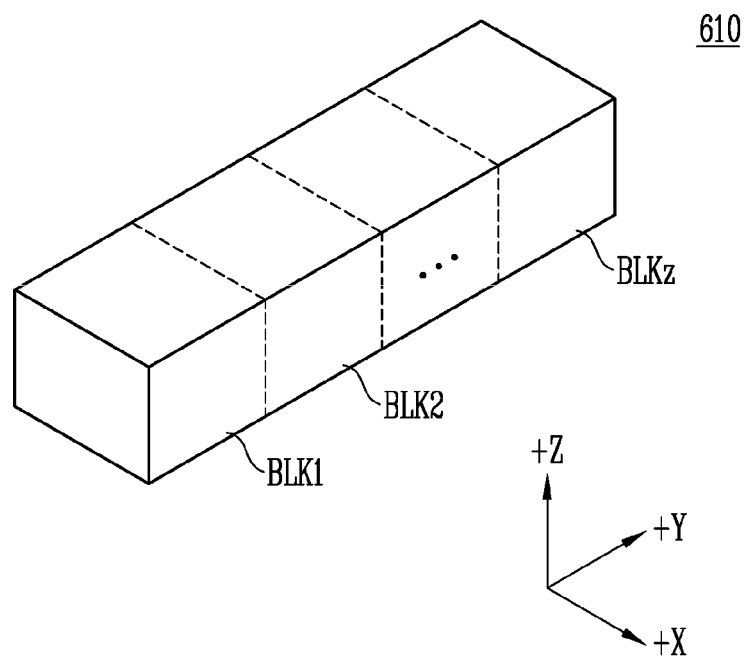
FIG. 14 illustrates an embodiment of a memory cell array of FIG. 13.

FIG. 14 is a diagram illustrating an embodiment of the memory cell array of FIG. 13.

Referring to FIG. 14, the memory cell array 610 includes a plurality of memory blocks BLK1 to BLKz. Each memory block has a three-dimensional structure. Each memory block includes a plurality of memory cells stacked on a substrate. The plurality of memory cells is arranged along a +X direction, a +Y direction, and a +Z direction. A structure of each memory block according to embodiments is described in more detail with reference to FIGS. 15 to 17.

Figure 15:
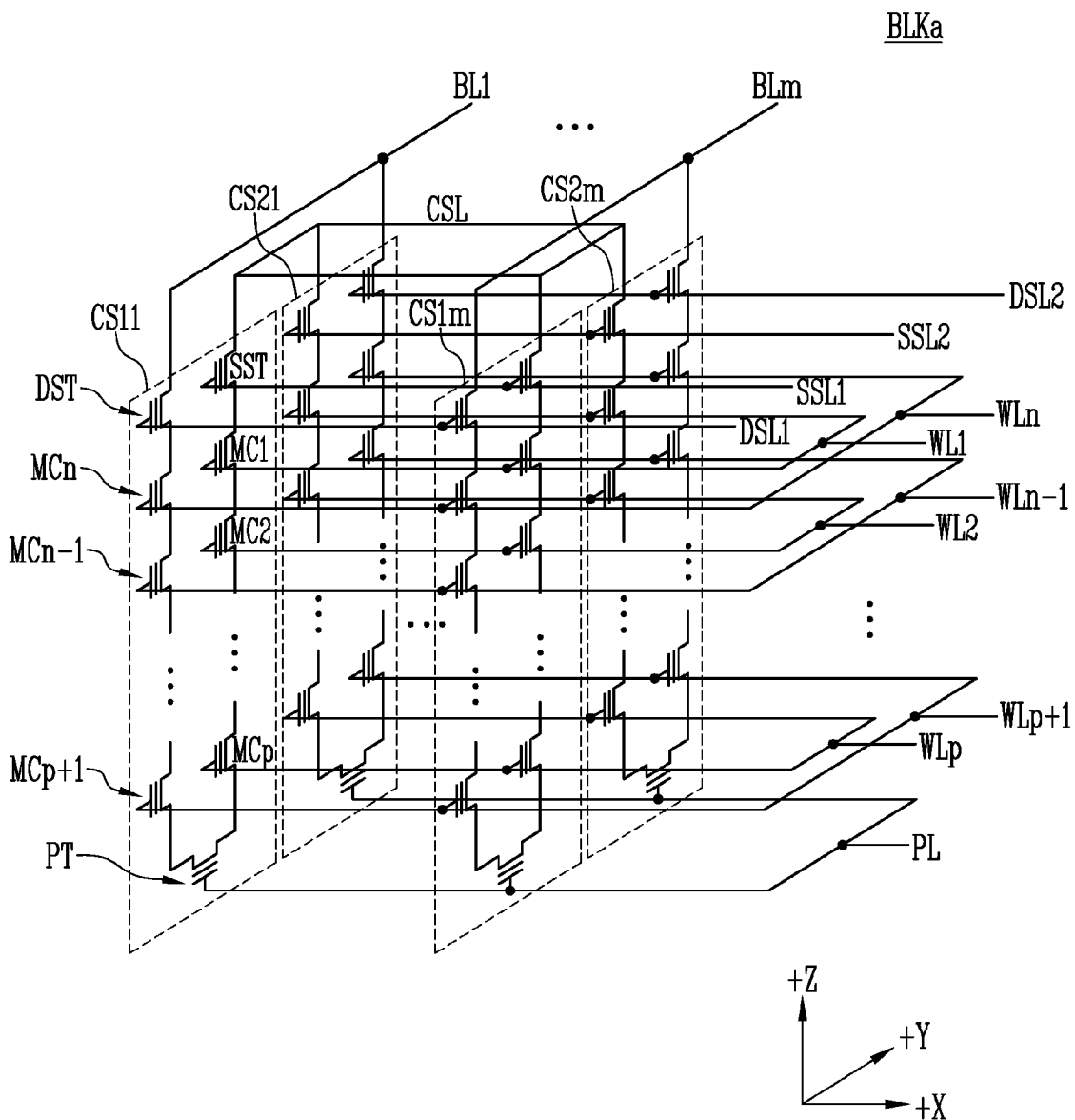
FIG. 15 illustrates a memory block BLKa among memory blocks BLK1 to BLKz of FIG. 14 according to an embodiment.

FIG. 15 is a circuit diagram illustrating any one memory block BLKa among the memory blocks BLK1 to BLKz of FIG. 14 according to an embodiment.

The memory block BLKa includes a plurality of cell strings CS11 to CS1$m$ and CS21 to CS2$m$. Each of the plurality of cell strings CS11 to CS1$m$ and CS21 to CS2$m$ may be formed in a 'U' shape. In the memory block BLKa, m cell strings are arranged in a row direction (that is, the +X direction), and two cell strings are arranged in a column direction (that is, the +Y direction). However, this is for convenience of description and it may be understood that three or more cell strings may be arranged in the column direction.

Each of the plurality of cell strings CS11 to CS1$m$ and CS21 to CS2$m$ includes at least one source select transistor SST, first to n-th memory cells MC1 to MCn, a pipe transistor PT, and at least one drain select transistor DST.

Each of the select transistors SST and DST and the memory cells MC1 to MCn may have a similar structure. In an embodiment, each of the select transistors SST and DST and the memory cells MC1 to MCn may include a channel layer, a tunneling insulating film, a charge storage film, and a blocking insulating film. In an embodiment, a pillar for providing the channel layer may be provided in each cell string. In an embodiment, a pillar for providing at least one of the channel layer, the tunneling insulating film, the charge storage film, and the blocking insulating film may be provided in each cell string. FIG. 15 shows the select transistors SST and DST and the pipe transistors PT each including the tunneling layer and the charge storage film, but embodiments are not limited thereto.

The source select transistor SST of each cell string is connected between a common source line CSL and the memory cells MC1 to MCp.

In an embodiment, the source select transistors of the cell strings arranged in the same row are connected to a source select line extending in the row direction, and the source select transistors of the cell strings arranged in different rows are connected to different source select lines. In FIG. 15, the source select transistors of the cell strings CS11 to CS1$m$ of a first row are connected to a first source select line SSL1. The source select transistors of the cell strings CS21 to CS2$m$ of a second row are connected to a second source select line SSL2.

In another embodiment, the source select transistors of the cell strings CS11 to CS1$m$ and CS21 to CS2$m$ may be commonly connected to one source select line.

The first to n-th memory cells MC1 to MCn of each cell string are connected between the source select transistor SST and the drain select transistor DST.

The first to n-th memory cells MC1 to MCn may be divided into first to p-th memory cells MC1 to MCp and (p+1)-th to n-th memory cells MCp+1 to MCn. The first to p-th memory cells MC1 to MCp are sequentially arranged in a direction opposite to the +Z direction, and are connected in series between the source select transistor SST and the pipe transistor PT. The (p+1)-th to n-th memory cells MCp+1 to MCn are sequentially arranged in the +Z direction, and are connected in series between the pipe transistor PT and the drain select transistor DST. The first to p-th memory cells MC1 to MCp and the (p+1)-th to n-th memory cells MCp+1 to MCn are connected to each other through the pipe transistor PT. Gates of the first to n-th memory cells MC1 to MCn of each cell string are connected to the first to n-th word lines WL1 to WLn, respectively.

A gate of the pipe transistor PT of each cell string is connected to a pipe select line PL.

The drain select transistor DST of each cell string is connected between a corresponding bit line and the memory cells MCp+1 to MCn. The cell strings arranged in the row direction are connected to the drain select line extending in the row direction. The drain select transistors of the cell strings CS11 to CS1$m$ of the first row are connected to a first drain select line DSL1. The drain select transistors of the cell strings CS21 to CS2$m$ of the second row are connected to a second drain select line DSL2.

The cell strings arranged in the column direction are connected to the bit lines extending in the column direction. In FIG. 15, the cell strings CS11 and CS21 of the first column are connected to the first bit line BL1. The cell strings CS1$m$ and CS2$m$ of the m-th column are connected to the m-th bit line BLm.

The memory cells connected to the same word line in the cell strings arranged in the row direction configure one page. For example, the memory cells connected to the first word line WL1 among the cell strings CS11 to CS1$m$ of the first row configure one page, and the memory cells connected to the first word line WL1 among the cell strings CS21 to CS2$m$ of the second row configure another page. That is, a plurality of pages may be connected to one word line.

The cell strings arranged in one row direction may be selected by selecting any one of the drain select lines DSL1 and DSL2. The control logic 630 may select one of the drain select lines by controlling the peripheral circuit to apply a select voltage to the drain select lines. That is, the select voltage may be applied to the selected drain select line, and a non-select voltage may be applied to the unselected drain select line. One page of the selected cell strings may be selected by selecting any one of the word lines WL1 to WLn. That is, as any one of the drain selection lines is selected, any one page among a plurality of pages connected to one word line may be selected.

A word line portion connected to each page may be a logical word line. For example, a word line connected to the gates of the n-th memory cells MCn included in the cell strings CS11 to CS1$m$ of the first row may be a first logical word line. For example, a word line connected to the gates of the first memory cells MC1 included in the cell strings CS21 to CS2$m$ of the second row may be a second logical word line.

The logical word lines may be connected to a physical word line. For example, the n-th word line WLn may be a common word line connected to the first logical word line and the second logical word line.

For convenience of description, any one of the plurality of pages may be selected by applying the select voltage to the drain select line, any one of the plurality of pages may be selected by applying the select voltage to the source select line.

In another embodiment, even bit lines and odd bit lines may be provided instead of the first to m-th bit lines BL1 to BLm. In addition, even-numbered cell strings among the cell strings CS11 to CS1$m$ or CS21 to CS2$m$ arranged in the row direction may be connected to the even bit lines, and odd-numbered cell strings among the cell strings CS11 to CS1$m$ or CS21 to CS2$m$ arranged in the row direction may be connected to odd bit lines, respectively.

The control logic 630 may sequentially perform program operations on the plurality of pages connected to one word line. For example, the control logic 630 may sequentially perform program operations on two pages connected to the first word line WL1, such as by first programming the page formed by the cells in cell strings CS11 to CS1m that are connected to the first word line WL1, and then programming the page formed by the cells in cell strings CS21 to CS2m that are connected to the first word line WL1.

In an embodiment, at least one of the first to n-th memory cells MC1 to MCn may be used as a dummy memory cell. For example, in an embodiment, at least one dummy memory cell is provided to reduce an electric field between the source select transistor SST and the memory cells MC1 to MCp. In another embodiment, at least one dummy memory cell is provided to reduce an electric field between the drain select transistor DST and the memory cells MCp+1 to MCn. When more dummy memory cells are provided, reliability of an operation for the memory block BLKa is improved, however, the size of the memory block BLKa capable of storing a given amount of data increases. When fewer dummy memory cells are provided, the size of the memory block BLKa capable of storing the given amount of data may be reduced, however, the reliability of the operation for the memory block BLKa may be reduced.

In order to efficiently control at least one dummy memory cell, each of the dummy memory cells may have a required threshold voltage. Before or after an erase operation for the memory block BLKa, program operations for all or a part of the dummy memory cells may be performed. When the erase operation is performed after the program operation is performed, the dummy memory cells may be configured to the required threshold voltage by controlling a voltage applied to dummy word lines connected to the respective dummy memory cells.

Figure 16:
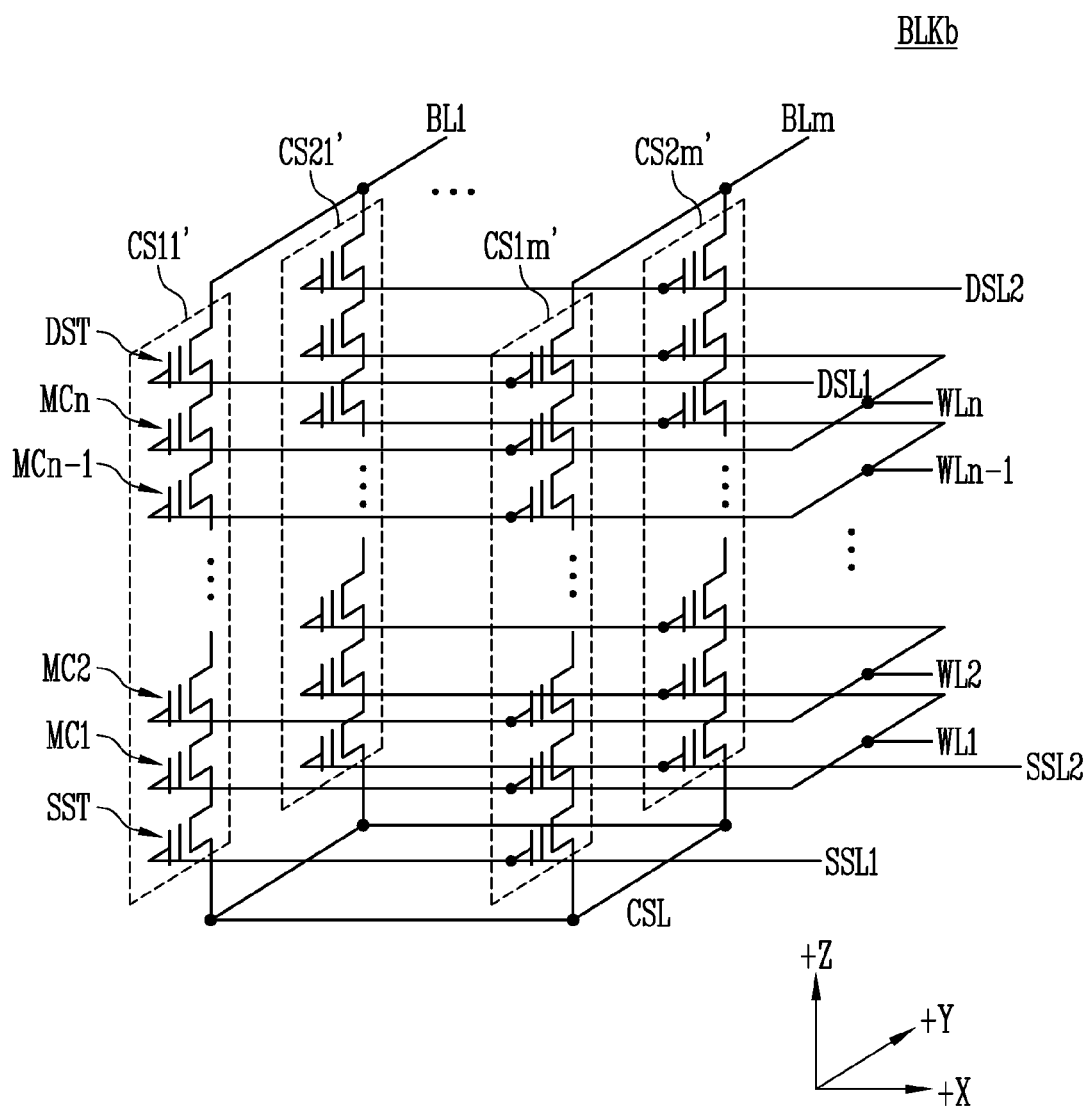
FIG. 16 a memory block BLKb among the memory blocks BLK1 to BLKz of FIG. 14 according to another embodiment.

FIG. 16 is a circuit diagram illustrating another embodiment of any one memory block BLKb among the memory blocks BLK1 to BLKz of FIG. 14.

The memory block BLKb includes a plurality of cell strings CS11' to CS1m' and CS21' to CS2m'. Each of the plurality of cell strings CS11' to CS1m' and CS21' to CS2m' extends along a +Z direction. Each of the plurality of cell strings CS11' to CS1m' and CS21' to CS2m' includes at least one source select transistor SST, first to n-th memory cells MC1 to MCn, and at least one drain select transistor DST stacked on a substrate (not shown) under the memory block BLKb.

The source select transistor SST of each cell string is connected between a common source line CSL and memory cells MC1 to MCn. The source select transistors of the cell strings arranged in the same row are connected to the same source select line. The source select transistors of the cell strings CS11' to CS1m' arranged in a first row are connected to a first source select line SSL1. The source select transistors of the cell strings CS21' to CS2m' arranged in a second row are connected to a second source select line SSL2. In another embodiment, the source select transistors of the cell strings CS11' to CS1m' and CS21' to CS2m' may be commonly connected to one source select line.

The first to n-th memory cells MC1 to MCn of each cell string are connected in series between the source select transistor SST and the drain select transistor DST. Gates of the first to n-th memory cells MC1 to MCn are connected to first to the n-th word lines WL1 to WLn, respectively.

The drain select transistor DST of each cell string is connected between a corresponding bit line and the memory cells MC1 to MCn. The drain select transistors DST of the cell strings arranged in the row direction are connected to a drain select line extending in the row direction. The drain select transistors of the cell strings CS11' to CS1m' of a first row are connected to a first drain select line DSL1. The drain select transistors of the cell strings CS21' to CS2m' of a second row are connected to a second drain select line DSL2.

As a result, the memory block BLKb of FIG. 16 has an equivalent circuit similar to the memory block BLKa of FIG. 15 except that the pipe transistors PT are not present in each cell string.

Therefore, the memory cells included in the memory block BLKb may be configured as the plurality of pages connected to one word line.

A word line portion connected to each page may be a logical word line. For example, a word line connected to the gates of the n-th memory cells MCn included in the cell strings CS11' to CS1m' of the first row may be a first logical word line, and a word line connected to the gates of the first memory cells MC1 included in the cell strings CS21' to CS2m' of the second row may be a second logical word line.

The logical word lines may be connected to a physical word line. For example, the n-th word line WLn may be a physical word line connected to the first logical word line and the second logical word line.

Program operations may be sequentially performed on the plurality of pages connected to one physical word line. For example, program operations may be sequentially performed on two pages connected to the first word line WL1, similarly to as described above with respect to FIG. 15.

In another embodiment, even bit lines and odd bit lines may be provided instead of the first to m-th bit lines BL1 to BLm. In addition, even-numbered cell strings among the cell strings CS11' to CS1m' or CS21' to CS2m' arranged in the row direction may be connected to even bit lines, and odd-numbered cell strings among the cell strings CS11' to CS1m' or CS21' to CS2m' arranged in the row direction may be connected to odd bit lines, respectively.

In an embodiment, at least one of the first to n-th memory cells MC1 to MCn may be used as a dummy memory cell. For example, at least one dummy memory cell is provided to reduce an electric field between the source select transistor SST and the memory cells MC1 to MCn. In another embodiment, at least one dummy memory cell is provided to reduce an electric field between the drain select transistor DST and the memory cells MC1 to MCn. When more dummy memory cells are provided, reliability of an operation for the memory block BLKb is improved, however, the size of the memory block BLKb capable of storing a given amount of data increases. When fewer dummy memory cells are provided, the size of the memory block BLKb capable of storing the given amount of data may be reduced, however, the reliability of the operation for the memory block BLKb may be reduced.

In order to efficiently control at least one dummy memory cell, each of the dummy memory cells may have a required threshold voltage. Before or after an erase operation for the memory block BLKb, program operations for all or a part of the dummy memory cells may be performed. When the erase operation is performed after the program operation is performed, the dummy memory cells may be configured to the required threshold voltage by controlling a voltage applied to the dummy word lines connected to the respective dummy memory cells.

Figure 17:
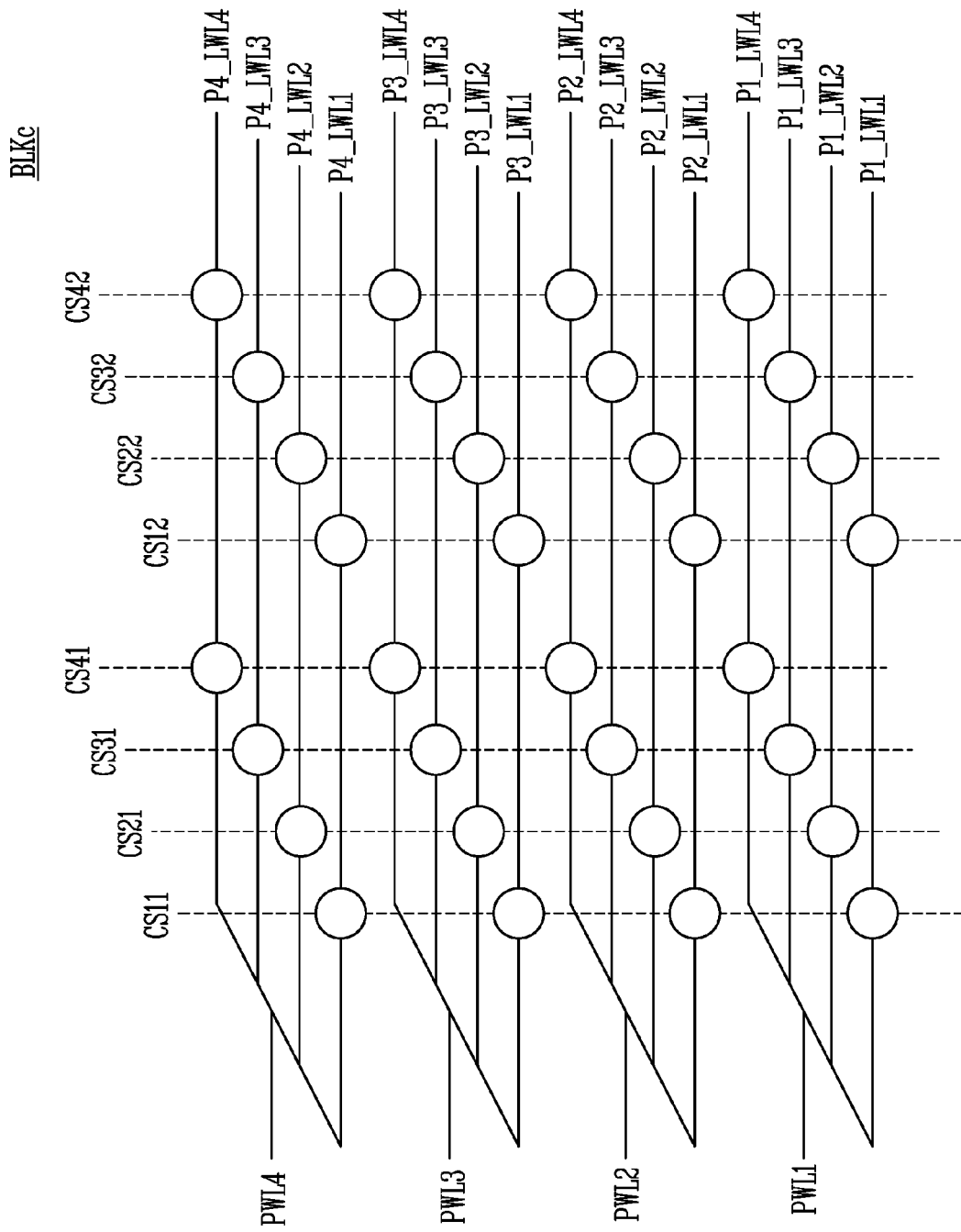
FIG. 17 illustrates a memory block BLKc among the memory blocks BLK1 to BLKz of FIG. 14 according to another embodiment.

FIG. 17 is a circuit diagram illustrating another embodiment of any one memory block BLKc among the memory blocks BLK1 to BLKz of FIG. 14.

Referring to FIG. 17, the memory block BLKc may be connected to a plurality of physical word lines. One physical word line may be commonly connected to four logical word lines. For example, a first physical word line PWL1 may be commonly connected to logical word lines P1_LWL1, P1_LWL2, P1_LWL3, and P1_LWL4. A second physical word line PWL2 may be commonly connected to logical word lines P2_LWL1, P2_LWL2, P2_LWL3, and P2_LWL4. A third physical word line PWL3 may be commonly connected to logical word lines P3_LWL1, P3_LWL2, P3_LWL3, and P3_LWL4. A fourth physical word line PWL4 may be commonly connected to logical word lines P4_LWL1, P4_LWL2, P4_LWL3, and P4_LWL4. Memory cells connected to any one of the logical word lines may configure one page. For example, memory cells connected to logical word line P1_LWL1 may configure one page.

Cell strings CS11, CS21, CS31, and CS41 of the first column may be commonly connected to the same bit line (not shown). The cell strings CS12, CS22, CS32, and CS42 of the second column may be commonly connected to the same bit line (not shown) different from the bit line connected to cell strings CS11 to CS41.

In FIG. 17, a structure in which four strings are connected to the same bit line is described as an example. However, this is for convenience of description, the number of strings commonly connected to the bit line may be less than or greater than four. Specifically, the number of logical word lines connected to one physical word line may be determined according to the number of strings commonly connected to one bit line. For example, when five strings are commonly connected to one bit line, one physical word line may be commonly connected to five logical word lines. In this case, one physical word line may be connected to five pages. A programmed page and a non-programmed page among the five pages may be determined according to a string select signal (for example, signals applied to the drain select line or the source select line of FIG. 15 or 16).

One page may be selected by one logical word line. First to fourth pages may be respectively selected by the logical word lines P1_LWL1 to P1_LWL4. Fifth to eighth pages may be respectively selected by the logical word lines P2_LWL1 to P2_LWL4. Ninth to twelfth pages may be respectively selected by the logical word lines P3_LWL1 to P3_LWL4. Thirteenth to sixteenth pages may be respectively selected by the logical word lines P4_LWL1 to P4_LWL4.

The plurality of pages included in the memory block BLKc may be programmed in a predetermined order. The plurality of pages connected to one physical word line may be sequentially programmed. For example, the first page to fourth page 14 connected to the first physical word line PWL1 may be sequentially programmed. The programmed page among four pages may be determined according to the string select signal (for example, signals applied to the drain select line or the source select line of FIG. 15 or 16).

A memory cells may be disturbed by an operation performed on a near-by memory cell. For example, when a near-by memory cell connected to the same physical word line of the memory cell is programmed, a threshold voltage of the memory cell may by disturbed, that is, abnormally changed. In a 3D memory cell array such as shown in FIGS. 15-17, the near-by memory cell connected to the same physical word line may be connected to a different logical word line, that is, may be in a different page. Accordingly, in the 3D memory cell array, an operation on a first memory cell in a first page may disturb a second memory cell in a second page. Since memory cells connected to the same physical word line are positioned at the same height, widths of the memory cells may be similar. That is, the memory cells connected to the physical word line may have similar cell characteristics. Therefore, when a threshold voltage distribution of the memory cells included in one page is changed, and especially if it is abnormally changed as may occur when a program operation fails, a threshold voltage distribution of the memory cells included in other pages connected to the same physical word line may also be abnormally changed. That is, when the program operation for one page fails, normal data programmed in other pages connected to the same physical word line may also be abnormally changed.

Figure 18:
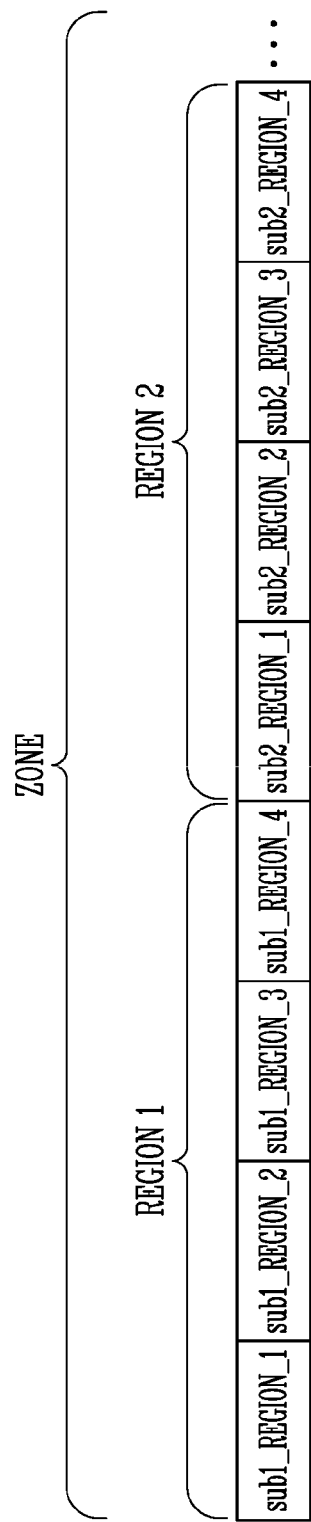
FIG. 18 illustrates a zone according to an embodiment.

FIG. 18 is a diagram for describing a zone ZONE.

The zone ZONE may include a plurality of storage regions. For example, the zone may include a first storage region REGION 1 and a second storage region REGION 2. Each storage region may include a plurality of subregions. For example, the first storage region REGION 1 may include first subregion sub1_REGION_1 to fourth subregion sub1_REGION_4. The second storage region REGION 2 may include first subregion sub2_REGION_1 to fourth subregion sub2_REGION_4. Each subregion may include at least one memory cell. The subregions in a region may comprise memory cells that are physically near to each other, that are at a same height, that share a physical word line, or combinations thereof. Accordingly, a region may be comprised of subregions that have a higher probability (compared to subregions outside that region) of disturbing cells in each other when an operation, such as a program operation, is performed therein.

Each subregion may be a unit of the program operation. For example, each subregion may be a page. The target location may be a subregion programmed in a current program operation. The data stored in the target location may be the target data. The pre-data location may be a subregion programmed in a previous program operation. The data stored in the pre-data location may be the pre-data. The pre-data location and the target location may be positioned in the same zone. The pre-data location and the target location may be consecutive subregions. For example, the pre-data location may be the first subregion sub1_REGION_1, and the target location may be the second subregion sub1_REGION_2.

The memory cell array 610 may be divided into a plurality of zones. A logical address range of data to be stored in each zone may be preset by a request of the host 800. The memory controller 700 may generate the zone according to the request of the host 800 and may preset the logical address range of the data to be stored in the zone.

The generated plurality of zones may be specified by a zone identifier. Specifically, when the host 800 provides the zone identifier to the memory controller 700, the memory controller 700 may control the memory device 600 to sequentially store data in the zone specified by the zone identifier. The memory controller 700 may sequentially correspond a logical address to data received from the host 800 within the logical address range allocated to the zone.

The logical address corresponding to the pre-data location and the logical address corresponding to the target location may be consecutive. For example, a logical address next to the logical address corresponding to the pre-data location may be a logical address corresponding to the target location. Therefore, the pre-data stored in the pre-data location and the target data stored in the target location may be sequential data.

For convenience of description, one memory cell array may be divided into the plurality of zones, but an embodiment is not limited thereto. For example, the zone may include storage regions across a plurality of memory cell arrays.

As described with reference to FIG. 18, when the threshold voltage distribution of the memory cells included in one subregion is abnormally changed, the threshold voltage distribution of the memory cells included in other subregions included in the same storage region may be also abnormally changed. That is, when a program operation for one subregion fails, normal data previously programmed in other subregions included in the same storage region may be abnormally changed (that is, corrupted). In an embodiment, when the program operation on the target location fails, the pre-data stored in the pre-data location may be corrupted.

The target data to be stored in the target location may be temporarily stored in a buffer memory (not shown) included in the memory controller 700. The buffer memory (not shown) may be a volatile memory or a non-volatile memory. Therefore, even when the program operation for the target location fails, the target data may not be lost. However, since the pre-data was programmed in the pre-data location during a previous program operation, the pre-data may not be stored in the buffer memory (not shown) during a current program operation. Therefore, in memories of the related arts, when the program operation for the target location fails, the pre-data may be corrupted or lost.

The storage device 500 according to an embodiment may recover the pre-data even though the pre-data stored in the pre-data location is abnormally changed by backing up the pre-data before performing the program operation on the target location.

Figure 19:
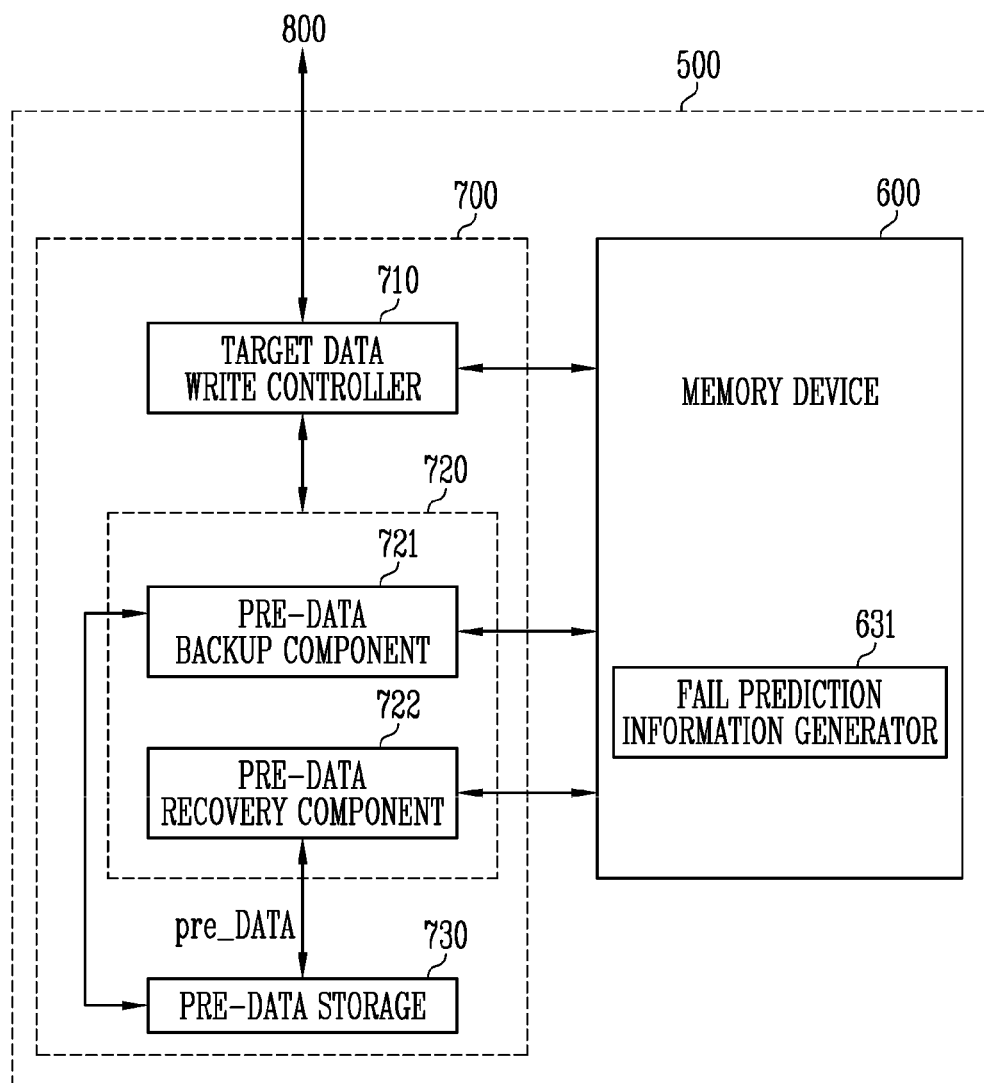
FIG. 19 illustrates a storage device according to an embodiment.

FIG. 19 is a block diagram for describing the storage device according to an embodiment.

Referring to FIG. 19, the memory controller 700 according to an embodiment may include the target data write controller 710, the pre-data manager 720, and the pre-data storage 730. The pre-data manager 720 may include a pre-data backup component 721 and a pre-data recovery component 722. The memory device 600 may include the plurality of zones described with reference to FIG. 18.

The memory controller 700 may receive the zone identifier from the host 800 and control the memory device 600 to sequentially program data in the zone designated by the zone identifier.

Hereinafter, it is assumed that the memory controller 700 controls the memory device 600 to program data in a specific zone.

The target data write controller 710 may receive the target data from the host 800 and control the memory device 100 to program the target data in the target location.

The target data write controller 710 may transmit a confirmation request regarding whether or not to perform the program operation for the target data, to the pre-data manager 720, before the target data is programmed. The target data write controller 710 may control the memory device 600 to program the target data in the target location in response to confirm information received from the pre-data manager 720.

The target location may be any one of the subregions included in the first storage region.

The pre-data backup component 721 may receive the confirmation request from the target data write controller 710 and back up the pre-data stored before the target data to the pre-data storage 730. The pre-data may be data that has been stored in the pre-data location. The pre-data location and the target location may be included in the same zone. The pre-data location and the target location may be included in the same storage region. That is, the pre-data location may be any one or more of the subregions included in the first storage region which includes the target location. The pre-data location and the target location may be different subregions. The pre-data location and the target location may be consecutive subregions. The pre-data backup component 721 may transmit the confirm information to the target data write controller 710 after the pre-data is backed up. The confirm information may be information for allowing the program operation for the target data.

In an embodiment, the pre-data backup component 721 may check whether the program operation for the target location is likely to fail, before backing up the pre-data. Specifically, the pre-data backup component 721 may transmit a fail check command to the memory device 600. The fail check command may be a status read command or a read command.

The memory device 600 may include the fail prediction information generator 631. The fail prediction information generator 631 may generate the fail prediction information in response to the fail check command received from the pre-data backup component 721. The fail prediction information generator 631 may transmit the generated fail prediction information to the pre-data backup component 721.

The fail prediction information may be information indicating a program fail probability.

The fail prediction information generator 631 may generate the fail prediction information based on a resistance component of a bit line or a resistance component of a word line connected to a storage region to be programmed. The fail prediction information generator 631 may measure the current flowing through bit lines and/or word lines connected to memory cells included in the storage region, and determine a value of the resistance component based on the measured current. For example, when the value of the measured current is less than a reference value, the fail prediction information generator 631 may determine that the resistance component is relatively large, and transmit information indicating that the program fail probability is relatively high to the memory controller 700. When the value of the measured current is equal to or greater than the reference value, the fail prediction information generator 631 may determine that the resistance component is relatively small, and transmit information indicating that the program fail probability is relatively low to the memory controller 700.

When the resistance component of the word line is relatively large, a threshold voltage of the memory cell may abnormally increase when an operation voltage is applied to the word line. When the resistance component of the word line is relatively large, the threshold voltage of the memory cell may increase at a rate lower than when the resistance component of the word line is relatively small. Therefore, the probability of program failure may be relatively high.

When the resistance component of the bit line is relatively large, a channel of the memory cell string may be abnormally pre-charged when the bit line is pre-charged. For example, the channel of an unselected string may be pre-charged to a program inhibit voltage. The program inhibit voltage may be a power voltage Vcc. When the resistance component of the bit line is relatively large, a channel potential of the unselected string may increase at a rate lower than when the resistance component of the bit line is relatively small. Therefore, the probability of program failure may be relatively high.

The pre-data backup component 721 may receive the fail prediction information and back up the pre-data accordingly. Specifically, when the pre-data backup component 721 receives the information indicating that the program operation for the target location is likely to fail, the pre-data backup component 721 may back up the pre-data. And then transmit the confirm information to the target data write controller 710. When the pre-data backup component 721 receives the information indicating that the program operation for the target location is likely to succeed, the pre-data backup component 721 may transmit the confirm information to the target data write controller 710 without backing up the pre-data.

The target data write controller 710 may receive the confirm information from the pre-data backup component 721 and control the memory device 600 to program the target data in the target location.

The pre-data recovery component 722 may recover the pre-data based on whether the program operation for the target location failed. Specifically, the pre-data recovery component 722 may transmit the status read command to the memory device 600 to check whether the program operation for the target location failed. The memory device 600 may transmit information regarding whether the program operation has failed (which may be stored in a status register) to the pre-data recovery component 722.

When the program operation for the target location has failed, the pre-data recovery component 722 may control the memory device 600 to store the pre-data, which is stored in the pre-data storage 730, in the second storage region of the memory device 600. The second storage region may be included in the same zone as the first storage region. When the program operation for the target location has failed, the target data write controller 710 may control the memory device to store the target data in the second storage region. The pre-data recovery component 722 and the target data write controller 710 may control the memory device 600 to sequentially store the pre-data and the target data in the second storage region. For example, the pre-data may be stored in the first subregion sub2_REGION_1 of the second storage region, and the target data may be stored in the second subregion sub2_REGION_2 of the second storage region.

The storage device 500 according to an embodiment may restore the pre-data even though the pre-data stored in the pre-data location is abnormally changed, by backing up the pre-data before performing the program operation on the target location.

When the program operation for the target location has completed successfully, the pre-data recovery component 722 may initialize the pre-data storage 730. That is, when the target data is normally programmed in the target location, the pre-data recovery component 722 may delete the backup pre-data, to secure a space where the pre-data may be backed up during a next program operation.

Figure 20:
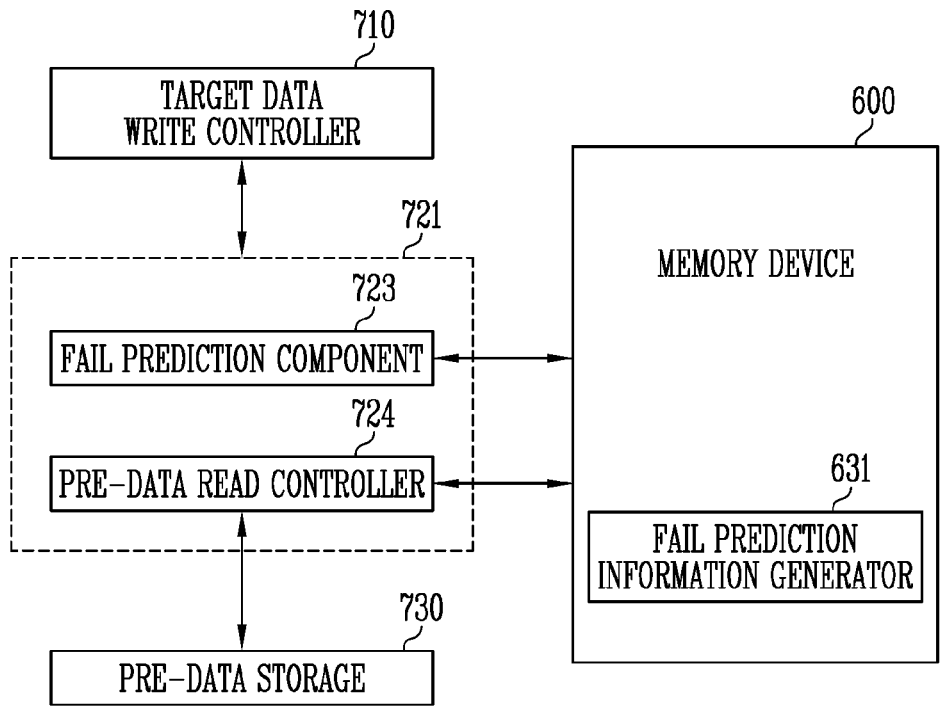
FIG. 20 illustrates a pre-data backup component according to an embodiment.

FIG. 20 is a block diagram for describing the pre-data backup component according to an embodiment.

Referring to FIG. 20, the pre-data backup component 721 may include a fail prediction component 723 and a pre-data read controller 724.

The fail prediction component 723 may receive the confirmation request from the target data write controller 710 and check whether the program operation for the target location is likely to fail. Specifically, the fail prediction component 723 may transmit the fail check command to the memory device 600. The fail check command may be a status read command or a read command. The fail prediction component 723 may receive the fail prediction information from the fail prediction information generator 731 included in the memory device 600, and may transmit a backup start signal for backing up the pre-data to the pre-data read controller 724. Specifically, when the fail prediction information includes information indicating that the program operation for the target location is likely to fail, the fail prediction component 723 may transmit the backup start signal to the pre-data read controller 724. Since the fail prediction information generator 631 has been described with reference to FIG. 18, description thereof will be omitted.

The pre-data read controller 724 may receive the backup start signal and back up the stored pre-data to the pre-data storage 730 before the target data. Specifically, the pre-data read controller 724 may transmit a read command and a physical address corresponding to the pre-data location to the memory device 600, and receive the pre-data in response. The pre-data read controller 724 may back up the read pre-data to the pre-data storage 730.

The pre-data may be data that was programmed in the pre-data location. The pre-data location and the target location may be included in the same zone. The pre-data location and the target location may be included in the same storage region. In an embodiment, the pre-data location may be a subregion included in the first storage region. The pre-data location and the target location may be different subregions. The pre-data read controller 724 may transmit the confirm information to the target data write controller 710 after backing up the pre-data. The confirm information may be information for allowing the program operation for the target data.

The pre-data backup component 721 according to an embodiment may efficiently manage a time required to back up the pre-data by backing up the pre-data when the fail probability of the program operation for the target location is high.

Figure 21:
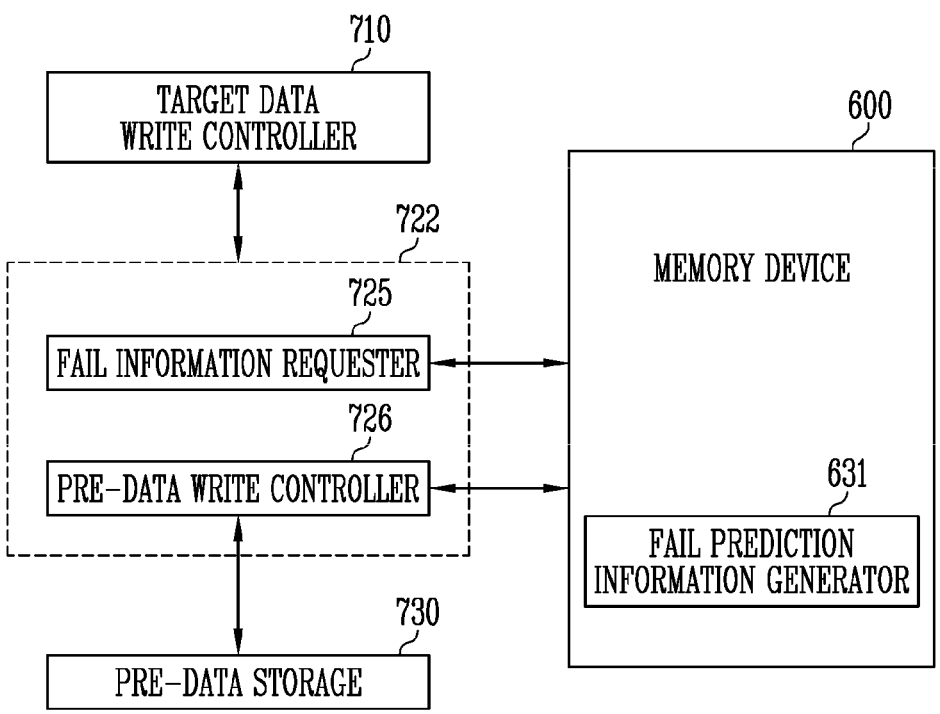
FIG. 21 illustrates a pre-data recovery component according to an embodiment.

FIG. 21 is a block diagram for describing the pre-data recovery component.

Referring to FIG. 21, the pre-data recovery component 722 may include a fail information requester 725 and a pre-data write controller 726.

The fail information requester 725 may check whether the program operation for the target location has failed. Specifically, the fail information requester 725 may provide a command for requesting fail information on whether a write operation for the target location has failed to the memory device 600, and obtain the fail information from the memory device 600. For example, the fail information requester 725 may transmit the status read command to the memory device 600 to check whether the program operation for the target location has failed. The memory device 600 may transmit the fail information on whether the write operation has failed (which may be stored in the status register) to the pre-data recovery component 722.

When the program operation for the target location has failed, the pre-data write controller 726 may control the memory device 600 to store the pre-data stored in the pre-data storage 730 in the second storage region of the memory device 600. The second storage region may be included in the same zone as the first storage region. When the program operation for the target location has failed, the target data write controller 710 may control the memory device to store the target data in the second storage region. The pre-data write controller 726 and the target data write controller 710 may control the memory device 600 to sequentially store the pre-data and the target data in the second storage region. For example, the pre-data may be stored in the first subregion sub2_REGION_1 of the second storage region, and the target data may be stored in the second subregion sub2_REGION_2 of the second storage region.

When the program operation for the target location has succeeded, the pre-data write controller 726 may initialize the pre-data storage 730. That is, when the target data is normally programmed in the target location, the pre-data write controller 726 may delete the backed up pre-data. A space where the pre-data may be backed up at a next program operation may be secured by initializing the pre-data storage 730.

Even when a program operation for the target area fails and causes the pre-data stored in the pre-data location to abnormally change (that is, to become corrupted), the storage device 500 according to an embodiment may perform recovery of the pre-data, even though the storage device 500 does not receive the pre-data from the host 800, by backing up the pre-data before attempting the program operation and then programming the backed-up pre-data to the memory device 600 again after the program operation has failed.

Figure 22:
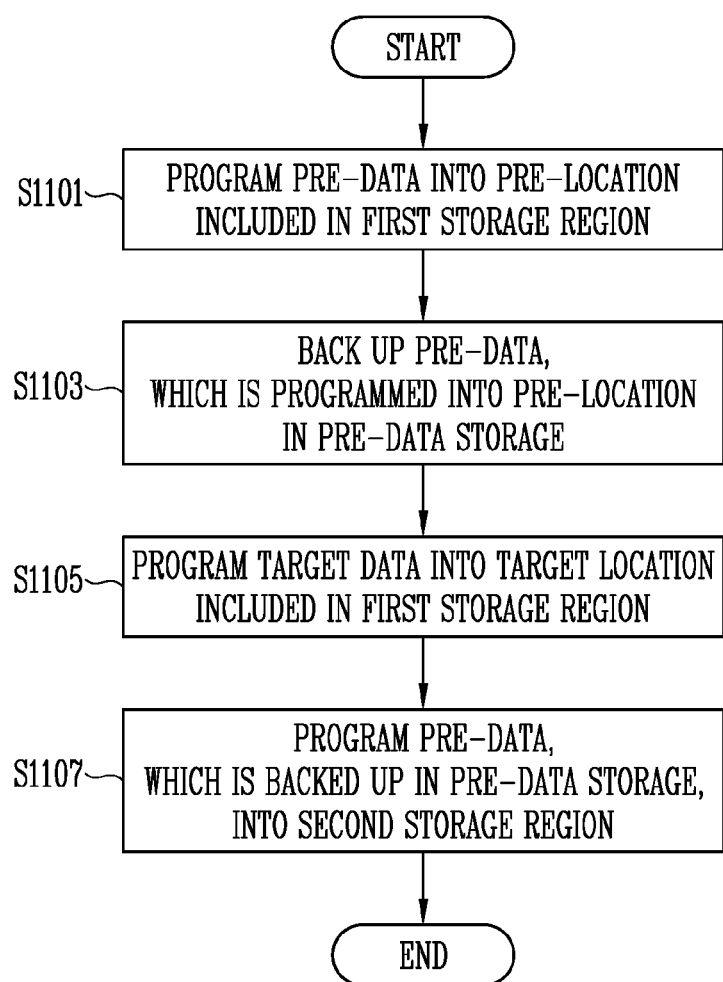
FIG. 22 a process for operating the storage device according to an embodiment.

FIG. 22 is a flowchart of a process of operating the storage device. The process of an embodiment described using FIG. 22 may be performed by the storage device 500.

Referring to FIG. 22, in step S1101, the storage device 50 may program the pre-data into the pre-data location ("pre-location" in FIG. 22) included in the first storage region. The pre-data location may be any one of the plurality of subregions included in a first storage region. The pre-data location may be in a region included in the zone specified by the zone identifier received from the host 800.

In step S1103, the storage device 500 may back up the pre-data programmed into the pre-data location to the pre-data backup component 721. Specifically, the memory controller 700 may transmit the read command and the address corresponding to the pre-data location to the memory device 600, and store the data read from the pre-data location in the pre-data backup component 721.

In step S1105, the storage device 500 may program the target data into the target location included in the first storage region. The logical address corresponding to the target data may be consecutive with the logical address corresponding to the pre-data. The target location may be included in the same zone as the pre-data location. The target location may be included in the same storage region as the pre-data location. The target location may be a subregion different from the pre-data location. A logical address range of data to be stored in the target location and the pre-data location may be preset by the request of the host 800.

In an embodiment, the first storage region may include the memory cells connected to a first physical word line. The first physical word line may be commonly connected to a plurality of logical word lines. The pre-data location and the target location may include respective pluralities of memory cells connected to any one of the plurality of logical word lines connected to the first physical word line.

In another embodiment, the first storage region may be a memory block. The pre-data location and the target location may be respective pages included in the memory block.

In step S1107, the storage device 500 may program the pre-data, which is backed up in the pre-data storage, into the second storage region. In an embodiment, the second storage region may include the memory cells connected to a second physical word line. In another embodiment, the second storage region may be a memory block different from that of the first storage region.

Figure 23:
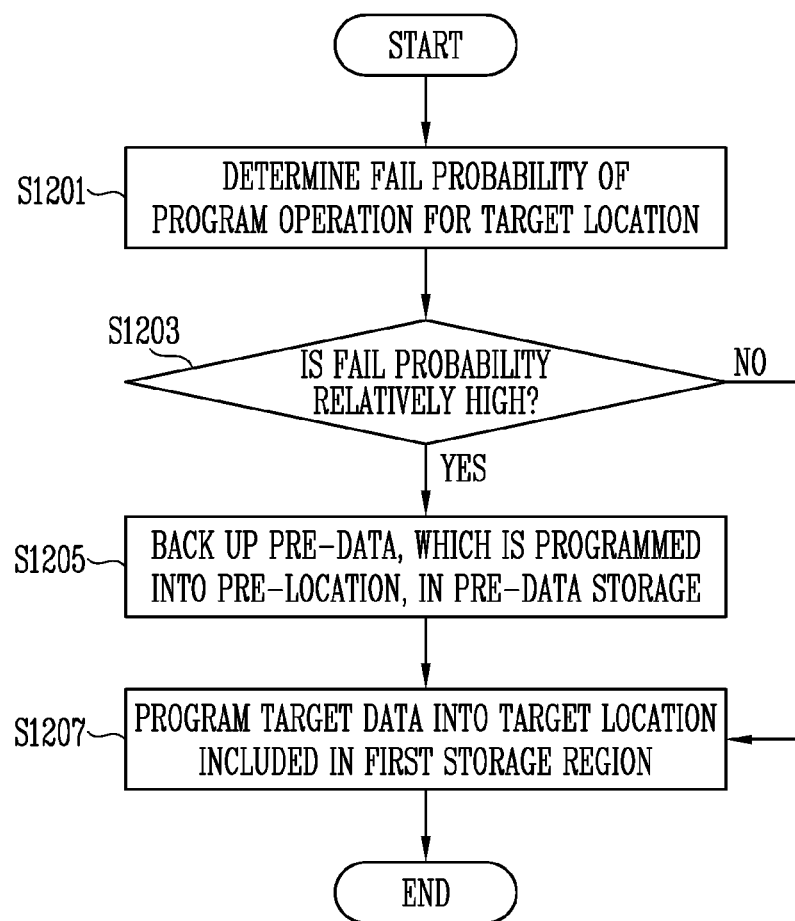
FIG. 23 illustrates a process for backup of pre-data according to an embodiment.

FIG. 23 is a flowchart of a backup process for backup of the pre-data. The backup process of an embodiment described using FIG. 23 may be performed by the storage device 500.

Referring to FIG. 23, in step S1201, the storage device 500 may determine the fail probability of the program operation for the target location. Specifically, the storage device 500 may sense the current flowing through the bit lines or the word lines connected to the memory cells included in the target location, and compare the sensed current with the reference current. The storage device 500 may determine the fail probability of the program operation for the target location based on the comparison result. For example, when the value of the sensed current is less than the reference value, the storage device 500 may determine that the fail probability of the program operation is relatively high. When the value of the sensed current is equal to or greater than the reference value, the storage device 500 may determine that the fail probability of the program operation is relatively low.

When the resistance component of the word line is relatively large, the threshold voltage of the memory cell may abnormally increase when the operation voltage is applied to the word line. When the resistance component of the word line is relatively large, the threshold voltage of the memory cell may increase at a rate lower than when the resistance component of the word line is relatively small. Therefore, the probability of program failure may be relatively high.

When the resistance component of the bit line is relatively large, the channel of the memory cell string may be abnormally pre-charged when the bit line is pre-charged. For example, the channel of the unselected string may be pre-charged to the program inhibit voltage. The program inhibit voltage may be the power voltage Vcc. When the resistance component of the bit line is relatively large, the channel potential of the unselected string may increase at a rate lower than when the resistance component of the bit line is relatively small. Therefore, the probability of program failure may be relatively high.

In step S1203, when the fail probability of the program operation for the target location is relatively high, the storage device 500 may proceed to step S1205, and when the fail probability of the program operation for the target location is relatively low, the storage device 500 may proceed to step S1207.

In step S1205, the storage device 500 may back up the pre-data, which is programmed in the pre-data location, in the pre-data storage. That is, when the program operation for the target location has a high probability of failure, the pre-data stored in the pre-data location has a high risk of being changed to abnormal data by the program operation of the target location. Therefore, the storage device 500 may back up the pre-data before the program operation for the target location is performed.

In step S1207, the storage device 500 may program target data into the target location included in the first storage region.

Figure 24:
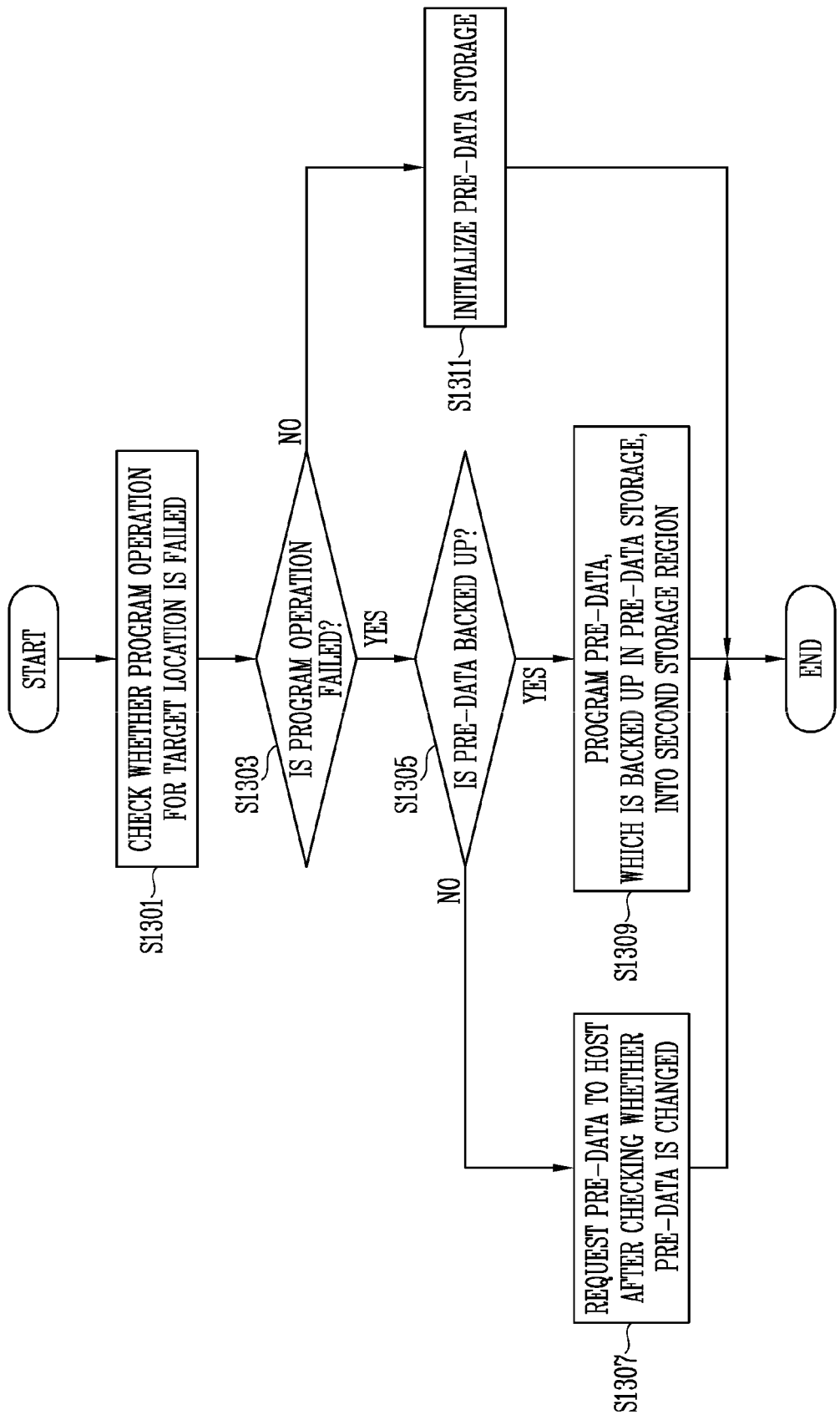
FIG. 24 illustrates a process for recovery of the pre-data according to an embodiment.

FIG. 24 is a flowchart for a recovery process for recovery of the pre-data. The recovery process an embodiment described using FIG. 24 may be performed by the storage device 500.

Referring to FIG. 24, in step S1301, the storage device 500 may check whether the program operation for the target location has failed. For example, the storage device 500 may check whether the program verification has failed in a last program loop. Whether the program operation has failed may be determined by the pass or fail signal output by the sensing circuit 626.

In step S1303, when the program operation has failed, the storage device 500 may proceed to step S1305, and when the program operation has passed, the storage device 500 may proceed to step S1311.

In step S1305, when the pre-data is backed up in the pre-data storage 730, the storage device 500 may proceed to step S1309, and when the pre-data is not backed up in the pre-data storage 730, the storage device 500 may proceed to step S1307.

In step S1309, the storage device 500 may program the pre-data, which is backed up in the pre-data storage 730, into the second storage region. In an embodiment, the second storage region may include the memory cells connected to the second physical word line. In another embodiment, the second storage region may be a memory block different from that of the first storage region.

In step S1307, the storage device 500 may check whether the pre-data stored in the pre-data location is changed. Specifically, the storage device 500 may check whether the number of 0 or the number of 1 included in the pre-data read from the pre-data location is different from a preset number.

When the pre-data stored in the pre-data location is changed, the storage device 500 may send a request for the pre-data to the host 800. Specifically, since the pre-data is not backed up in the storage device 500, the storage device 500 may request the pre-data from the host 800 in order to recover the pre-data.

In step S1311, the storage device 500 may initialize the pre-data storage 730. Specifically, the storage device 500 may delete the pre-data backed up in the pre-data storage 730. The storage device 500 secure a space where another pre-data may be backed up during the next program operation by initializing the pre-data storage 730.

Figure 25:
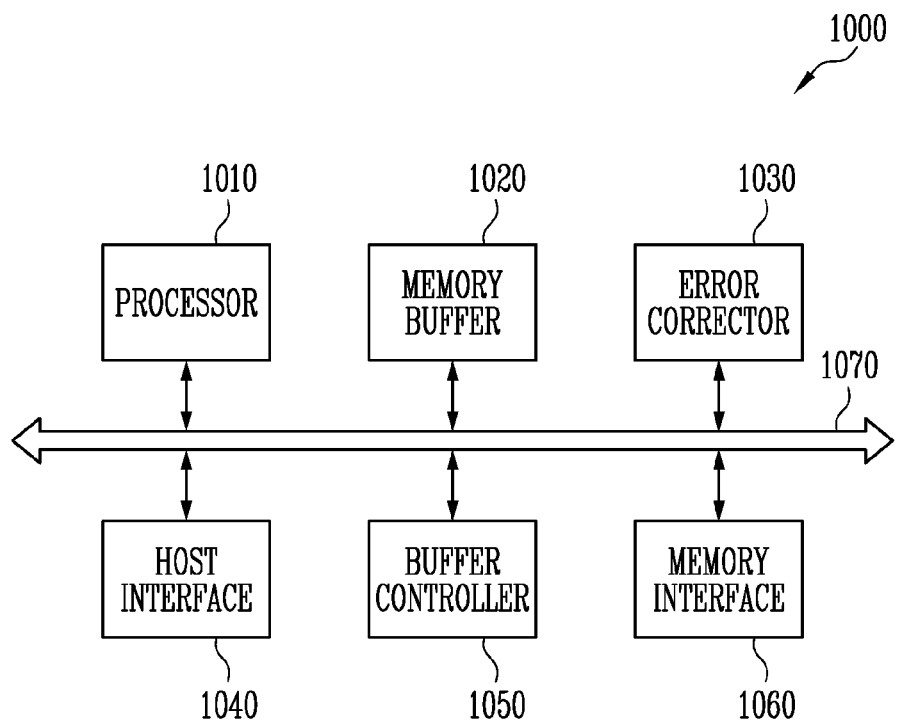
FIG. 25 illustrates another embodiment of the memory controller of FIGS. 1 and 12.

FIG. 25 is a diagram for describing another embodiment of a memory controller such as shown in FIGS. 1 and 12.

The memory controller 1000 is connected to a host and a memory device, as shown for the memory controller 200 or 700 of FIGS. 1 and 12. The memory controller 1000 is configured to access the memory device in response to requests from the host.

Referring to FIG. 25, the memory controller 1000 may include a processor 1010, a memory buffer 1020, an error corrector (ECC) 1030, a host interface 1040, a buffer control circuit 1050, a memory interface 1060, and a bus 1070.

The bus 1070 may be configured to provide a channel between components of the memory controller 1000.

The processor 1010 may control overall operations of the memory controller 1000 and may perform a logical operation. The processor 1010 may communicate with an external host through the host interface 1040 and communicate with the memory device through the memory interface 1060. In addition, the processor 1010 may communicate with the memory buffer 1020 through the buffer controller 1050. The processor 1010 may control an operation of the storage device using the memory buffer 1020 as an operation memory, a cache memory, or a buffer memory.

The processor 1010 may perform a function of a flash translation layer (FTL). The processor 1010 is configured to randomize data received from the host. For example, the processor 1010 may randomize the data received from the host using a random seed. The randomized data is provided to the memory device as data to be stored and is programmed to the memory cell array.

The processor 1010 is configured to de-randomize data received from the memory device during the read operation. For example, the processor 1010 may de-randomize the data received from the memory device using a random seed. The de-randomized data may be output to the host.

As an embodiment, the processor 1010 may perform the randomization and the de-randomization by executing software or firmware.

The memory buffer 1020 may be used as an operation memory, a cache memory, or a buffer memory of the processor 1010. The memory buffer 1020 may store codes and commands executed by the processor 1010. The memory buffer 1020 may store data processed by the processor 1010. The memory buffer 1020 may include a static RAM (SRAM) or a dynamic RAM (DRAM).

The error corrector 1030 may perform error correction. The error corrector 1030 may perform error correction encoding (ECC encoding) based on data to be written to the memory device through memory interface 1060. The error correction encoded data may be transferred to the memory device through the memory interface 1060. The error corrector 1030 may perform error correction decoding (ECC decoding) on the data received from the memory device through the memory interface 1060. For example, the error corrector 1030 may be included in the memory interface 1060 as a component of the memory interface 1060.

The host interface 1040 is configured to communicate with an external host under control of the processor 1010. The host interface 1040 may be configured to perform communication using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI express), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

The buffer controller 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

For example, the memory controller 1000 may not include the memory buffer 1020 and the buffer controller 1050.

For example, the processor 1010 may control the operation of the memory controller 1000 using codes. The processor 1010 may load the codes from a non-volatile memory device (for example, a read only memory) provided inside the memory controller 1000. As another example, the processor 1010 may load the codes from the memory device through the memory interface 1060.

For example, the bus 1070 of the memory controller 1000 may be divided into a control bus and a data bus. The data bus may be configured to transmit data within the memory controller 1000 and the control bus may be configured to transmit control information such as a command and an address within the memory controller 1000. The data bus and the control bus may be separated from each other and may not interfere with each other or affect each other. The data bus may be connected to the host interface 1040, the buffer controller 1050, the error corrector 1030, and the memory interface 1060. The control bus may be connected to the host interface 1040, the processor 1010, the buffer controller 1050, the memory buffer 1202, and the memory interface 1060.

In an embodiment, the memory buffer 1020 of FIG. 25 may include the buffer memory 220 described with reference to FIGS. 1 to 4, 6, 7, and 10. The memory buffer 1020 of FIG. 25 may include the state storage 212 described with reference to FIG. 8.

Figure 26:
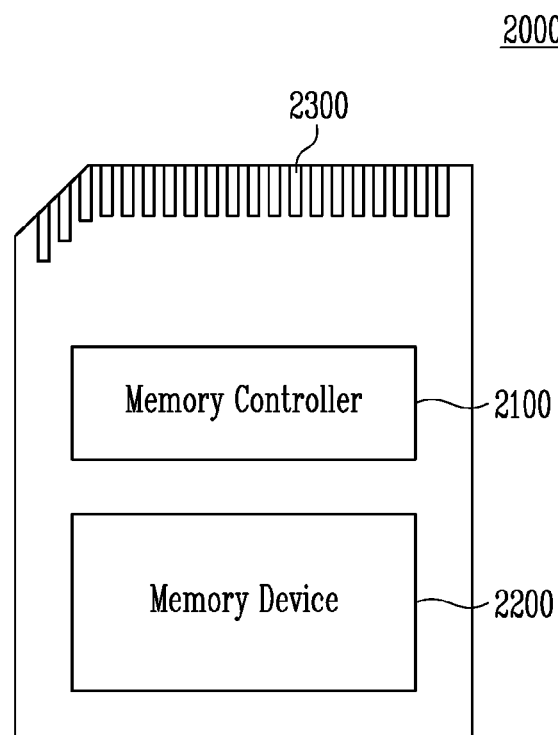
FIG. 26 illustrates a memory card system including a storage device according to an embodiment.

FIG. 26 is a block diagram illustrating a memory card system to which the storage device including the memory device according to an embodiment of the present disclosure is applied.

Referring to FIG. 26, the memory card system 2000 includes a memory controller 2100, a memory device 2200, and a connector 2300.

The memory controller 2100 is connected to the memory device 2200. The memory controller 2100 is configured to access the memory device 2200. The memory controller 2100 may be implemented as described for the memory controller 200 described with reference to FIGS. 1, 12 or as described for the memory controller 1000 of FIG. 25.

For example, the memory controller 2100 may include components such as a random access memory (RAM), a processor, a host interface, a memory interface, and an error corrector.

The memory controller 2100 may communicate with an external device through the connector 2300. The memory controller 2100 may communicate with an external device (for example, the host) according to a specific communication standard. For example, the memory controller 2100 is configured to communicate with an external device through at least one of various communication standards such as a universal serial bus (USB), a multimedia card (MMC), an embedded MMC (eMMC), a peripheral component interconnection (PCI), a PCI express (PCIE), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 2300 may be defined by at least one of the various communication standards described above.

For example, the memory device 2200 may be implemented as various non-volatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-torque magnetic RAM (STT-MRAM).

For example, the memory controller 2100 or the memory device 2200 may be packaged and provided as one semiconductor package using technology such as a package on package (PoP), ball grid arrays (BGAs), chip scale packages (CSPs), plastic leaded chip carriers (PLCC), a plastic dual in line package (PDIP), a die in waffle pack, die in wafer form, a chip on board (COB), a ceramic dual in line package (CERDIP), a plastic metric quad flat pack (MQFP), a thin quad flat pack (TQFP), a small outline (SOIC), a shrink small outline package (SSOP), a thin small outline (TSOP), a thin quad flat pack (TQFP), a system in package (SIP), a multi-chip package (MCP), a wafer-level fabricated package (WFP), or a wafer-level processed stack package (WSP). Alternatively, the memory device 2200 may include a plurality of non-volatile memory chips, and the plurality of non-volatile memory chips may be packaged and provided as one semiconductor package based on the above-described package technologies.

For example, the memory controller 2100 and the memory device 2200 may be integrated into one semiconductor device. For example, the memory controller 2100 and the memory device 2200 may be integrated into one semiconductor device to configure a solid state drive (SSD). The memory controller 2100 and the memory device 2200 may be integrated into one semiconductor device to configure a memory card. For example, the memory controller 2100 and the memory device 2200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMCmicro, or eMMC), an SD card (SD, miniSD, microSD, or SDHC), and a universal flash storage (UFS).

For example, the memory device 2200 may be the memory device 100 described with reference to FIG. 1 or the memory device 600 described with reference to FIG. 12.

Figure 27:
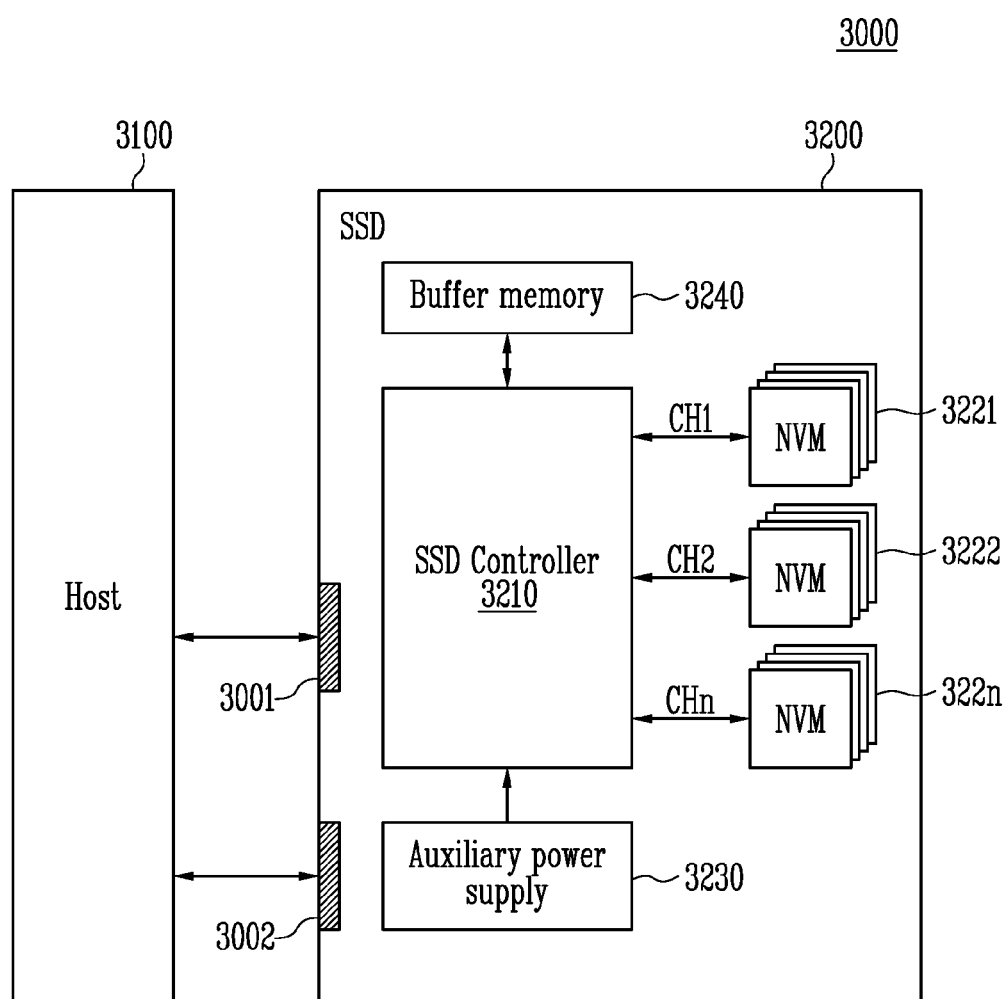
FIG. 27 illustrates a solid state drive (SSD) system including a storage device according to an embodiment.

FIG. 27 is a block diagram illustrating a solid state drive (SSD) system to which the storage device including the memory controller according to an embodiment of the present disclosure.

Referring to FIG. 27, the SSD system 3000 includes a host 3100 and an SSD 3200. The SSD 3200 exchanges a signal SIG with the host 3100 through a signal connector 3001 and receives power PWR through a power connector 3002. The SSD 3200 includes an SSD controller 3210, a plurality of flash memories 3221 to 322n, an auxiliary power device 3230, and a buffer memory 3240.

In an embodiment, the SSD controller 3210 may perform the function of the memory controller 200 described with reference to FIG. 1 or the memory controller 700 described with reference to FIG. 12.

The SSD controller 3210 may control the plurality of flash memories 3221 to 322n in response to the signal SIG received from the host 3100. For example, the signal SIG may be signals based on an interface between the host 3100 and the SSD 3200. For example, the signal SIG may be a signal defined by at least one of interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power device 3230 is connected to the host 3100 through the power connector 3002. The auxiliary power device 3230 may receive the power PWR from the host 3100 and may charge using that power. The auxiliary power device 3230 may operate as an auxiliary power device to provide power of the SSD 3200 when a power supply from the host 3100 is abnormal. For example, the auxiliary power device 3230 may be positioned in the SSD 3200 or may be positioned outside the SSD 3200. For example, the auxiliary power device 3230 may be positioned on a main board and may provide auxiliary power to the SSD 3200. For example, the auxiliary power device 3230 of FIG. 27 may be the auxiliary power device 300 described with reference to FIG. 1.

The buffer memory 3240 operates as a buffer memory of the SSD 3200. For example, the buffer memory 3240 may temporarily store data received from the host 3100 or data received from the plurality of flash memories 3221 to 322n, or may temporarily store metadata (for example, a mapping table) of the flash memories 3221 to 322n. The buffer memory 3240 may include a volatile memory such as a DRAM, an SDRAM, a DDR SDRAM, an LPDDR SDRAM, and a GRAM, or a non-volatile memory such as an FRAM, a ReRAM, an STT-MRAM, and a PRAM.

For example, the non-volatile memories 3321 to 322n may be the memory device 100 described with reference to FIG. 2 or the memory device 600 described with reference to FIG. 13. In an embodiment, the buffer memory 3240 of FIG. 14 may include the buffer memory 220 described with reference to FIGS. 1 to 4, 6, 7, and 10. The buffer memory 3240 of FIG. 14 may include the state storage 212 described with reference to FIG. 8.

Figure 28:
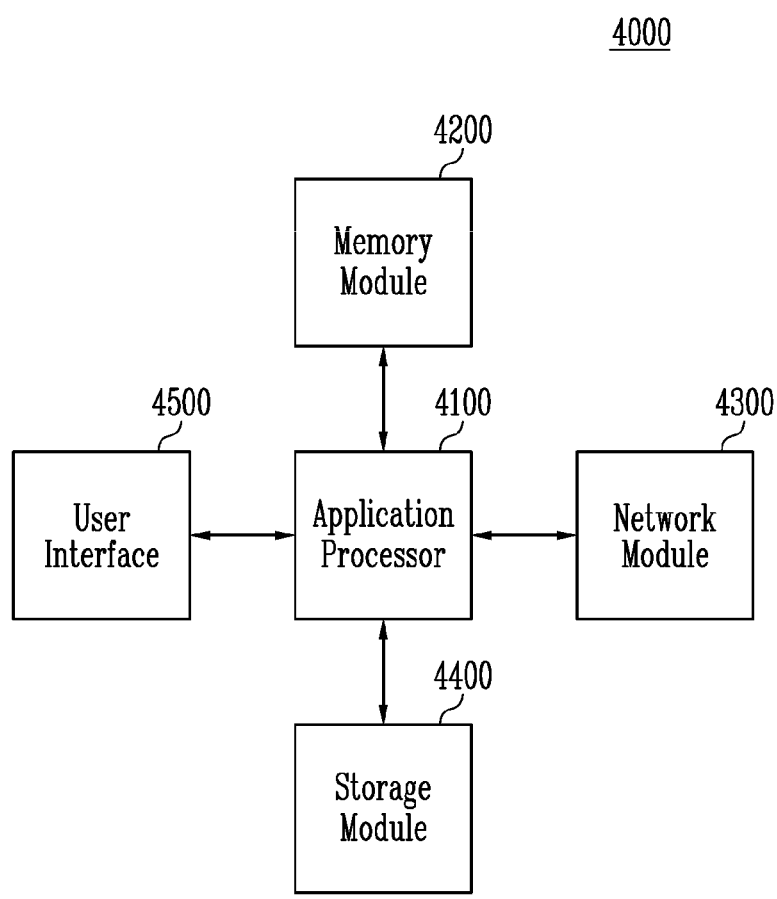
FIG. 28 illustrates a user system including a storage device according to an embodiment.

FIG. 28 is a block diagram illustrating a user system to which the storage device including the memory controller according to an embodiment of the present disclosure is applied.

Referring to FIG. 28, the user system 4000 includes an application processor 4100, a memory module 4200, a network module 4300, a storage module 4400, and a user interface 4500.

The application processor 4100 may drive components, an operating system (OS), a user program, or the like included in the user system 4000. For example, the application processor 4100 may include controllers, interfaces, graphics engines, and the like that control the components included in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a non-volatile random access memory, such as a PRAM, a ReRAM, an MRAM, and an FRAM. For example, the application processor 4100 and memory module 4200 may be packaged based on a package on package (POP) and provided as one semiconductor package.

The network module 4300 may communicate with external devices. For example, the network module 4300 may support wireless communication such as code division multiple access (CDMA), global system for mobile communications (GSM), wideband CDMA (WCDMA), CDMA-2000, time division multiple access (TDMA), long term evolution, Wimax, WLAN, UWB, Bluetooth, and WI-FI. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented as a non-volatile semiconductor memory element such as a phase-change RAM (PRAM), a magnetic RAM (MRAM), a resistive RAM (RRAM), a NAND flash, a NOR flash, and a three-dimensional NAND flash. For example, the storage module 4400 may be provided as a removable storage device (removable drive), such as a memory card, and an external drive of the user system 4000.

For example, the storage module 4400 may include a memory controller according to an embodiment and a plurality of non-volatile memory devices, the memory controller may be the memory controller 200 or 700 described above, and the plurality of non-volatile memory devices may be the memory device 100 described with reference to FIG. 1 or the memory device 600 described with reference to FIG. 12.

The user interface 4500 may include interfaces for inputting data or an instruction to the application processor 4100 or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a motor.

3. Dynamic Allocation for Zoned Storage

Figure 29:
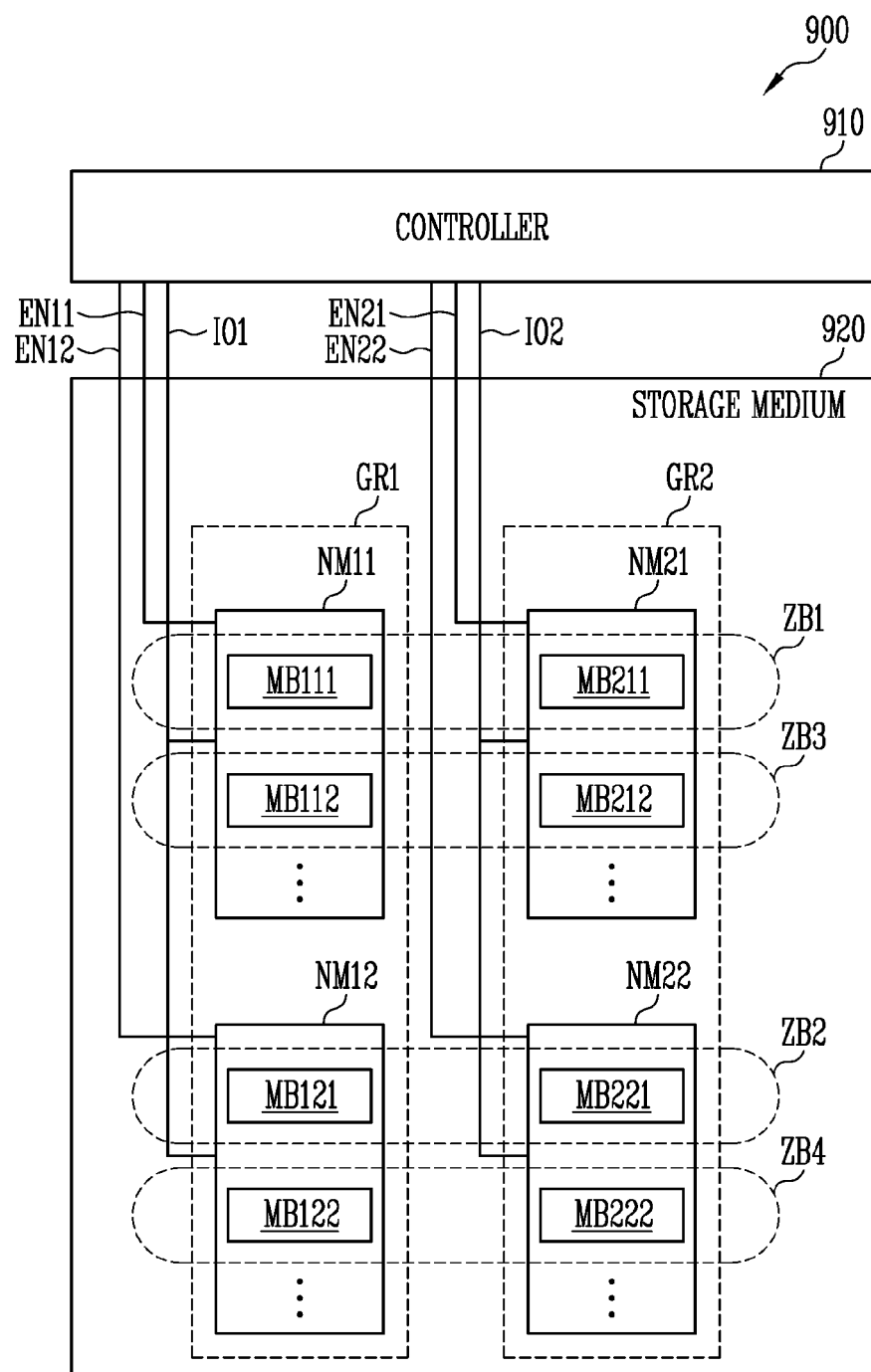
FIG. 29 illustrates a memory system in accordance with an embodiment.

FIG. 29 illustrates a memory system 900 in accordance with an embodiment.

The memory system 900 may be configured to store, in response to a write request from a host device (not illustrated), data provided from the host device. Also, the memory system 900 may be configured to provide, in response to a read request from the host device, data stored therein to the host device.

The memory system 900 may be configured as a Personal Computer Memory Card International Association (PCMCIA) card, a Compact Flash (CF) card, a smart media card, a memory stick, various multimedia cards (MMC, eMMC, RS-MMC, and MMC-Micro), various secure digital cards (SD, Mini-SD, and Micro-SD), a Universal Flash Storage (UFS), a Solid State Drive (SSD), or the like.

The memory system 900 may include a controller 910 and a storage medium 920.

The controller 910 may control a general operation of the memory system 900. The controller 910 may control the storage medium 920 in order to perform a foreground operation in response to a request from the host device. A foreground operation may include an operation of writing data in the storage medium 920 or of reading data from the storage medium 920 in response to a request (e.g., a write request or a read request) from the host device.

The controller 910 may control the storage medium 920 in order to perform a background operation internally necessary and independent of the host device. The background operation may include a wear leveling operation, a garbage collection operation, an erase operation, a read reclaim operation, a refresh operation and so forth on the storage medium 920. Like the foreground operation, the background operation may include an operation of writing data in the storage medium 920 and reading data from the storage medium 920.

The storage medium 920 may store therein data transferred from the controller 910 under the control of the controller 910. The storage medium 920 may read data therefrom and provide the read data to the controller 910 under the control of the controller 910.

The storage medium 920 may include nonvolatile memory devices NM11, NM12, NM21 and NM22.

Each of the nonvolatile memory devices NM11, NM12, NM21 and NM22 may include a flash memory such as a NAND flash or a NOR flash, a Ferroelectrics Random Access Memory (FeRAM), a Phase-Change Random Access Memory (PCRAM), a Magnetoresistive Random Access Memory (MRAM), a Resistive Random Access Memory (ReRAM), or the like.

Each of the nonvolatile memory devices NM11, NM12, NM21 and NM22 may include one or more planes, one or more memory chips, one or more memory dies or one or more memory packages.

The nonvolatile memory devices NM11, NM12, NM21 and NM22 may be grouped into first and second groups GR1 and GR2. Nonvolatile memory devices included in the same group may be coupled to the controller 910 through the same input/output lines. For example, the first group GR1 may include the nonvolatile memory devices NM11 and NM12 coupled to the controller 910 through a first input/output line IO1, and the second group GR2 may include the nonvolatile memory devices NM21 and NM22 coupled to the controller 910 through a second input/output line IO2. While the first input/output line IO1 and the second input/output line IO2 are described herein as single lines, embodiments are not limited thereto, and in embodiments nonvolatile memory devices in the first group GR1 are coupled to the controller 910 through a first plurality of input/output lines and nonvolatile memory devices in the second group GR2 are coupled to the controller 910 through a second plurality of input/output lines different from the first plurality of input/output lines.

The first input/output line IO1 may transfer a first command, a first address and/or first data between the controller 910 and the nonvolatile memory devices NM11 and NM12 within the first group GR1 at the same time as the second input/output line IO2 may transfer a second command, a second address and/or second data between the controller 910 and the nonvolatile memory devices NM21 and NM22 within the second group GR2.

The nonvolatile memory devices NM11, NM12, NM21 and NM22 may be coupled to the controller 910 through enable lines EN11, EN12, EN21 and EN22, respectively. Therefore, even when the nonvolatile memory devices NM11 and NM12 or the nonvolatile memory devices NM21 and NM22 within the same group shares an input/output line of the input/output line IO1 and the input/output line IO2, the controller 910 may selectively access, by selecting or enabling an enable line among the enable lines EN11, EN12, EN21 and EN22, a corresponding nonvolatile memory device among the nonvolatile memory devices NM11 and NM12 or the nonvolatile memory devices NM21 and NM22.

Each of the nonvolatile memory devices NM11, NM12, NM21 and NM22 may include a plurality of memory blocks. A memory block may be a unit of memory on which a nonvolatile memory device performs an erase operation at a time. However, the memory block will not be limited thereto and the nonvolatile memory device may perform an erase operation on a different unit at a time.

A number of nonvolatile memory devices included in the storage medium 920, a number of the groups, and a number of nonvolatile memory device included in each group are not limited to the numbers described with reference to FIG. 29.

In accordance with an embodiment, the controller 910 may manage the storage medium 920 by units of zone blocks. The controller 910 may configure one or more zone blocks within the storage medium 920 and may manage the zone blocks. The controller 910 may manage the zone blocks by assigning a number or an address to each of the zone blocks. In response to a request of a host device, the controller 910 may store data into a zone block designated by the host device or may read data from a zone block to provide the read data to the host device.

In accordance with an embodiment, the controller 910 may select one nonvolatile memory device from each group to provide the physical storage for each zone block. Since the controller 910 selects one nonvolatile memory device from each group within the storage medium 920 when configuring the zone blocks, independency of each group may be provided within the respective zone blocks. For example, the controller 910 may configure zone blocks ZB1 to ZB4 within the storage medium 920. The zone blocks ZB1 and ZB3 may each be configured to use the nonvolatile memory device NM11 from the first group GR1 and the nonvolatile memory device NM21 from the second group GR2. The zone blocks ZB2 and ZB4 may each be configured to use the nonvolatile memory device NM12 from the first group GR1 and the nonvolatile memory device NM22 from the second group GR2.

In accordance with an embodiment, the controller 910 may select, in order to configure the zone blocks ZB1 to ZB4, the nonvolatile memory devices coupled to the enable lines of the same ordering within the respective groups GR1 and GR2 of the storage medium 920. For example, the enable lines EN11 and EN21 may be of the same ordering within the respective groups GR1 and GR2, and the enable lines EN12 and EN22 may be of the same ordering within the respective groups GR1 and GR2. In this case, the controller 910 may select, in order to configure the zone blocks ZB1 and ZB3, the nonvolatile memory devices NM11 and NM21 coupled to the enable lines EN11 and EN21 of the same ordering within the respective groups GR1 and GR2. Also, the controller 910 may select, in order to configure the zone blocks ZB2 and ZB4, the nonvolatile memory devices NM12 and NM22 coupled to the enable lines EN12 and EN22 of the same ordering within the respective groups GR1 and GR2.

In accordance with an embodiment, each of the zone blocks ZB1 to ZB4 may be configured to include memory blocks having the same block address within the nonvolatile memory devices the zone blocks are configured to use. For example, the zone block ZB1 may include the memory block MB111 having a block address 'B' within the nonvolatile memory device NM11 and the memory block MB211 having the same block address 'B' within the nonvolatile memory device NM21. A block address may be a physical or local address distinguishing memory blocks within a nonvolatile memory device.

Although FIG. 29 illustrates a zone block including one memory block from each nonvolatile memory device that the zone block uses, embodiments are note limited thereto. Each of the nonvolatile memory devices NM11, NM12, NM21 and NM22 may include a plurality of memory blocks having the same plurality of respective block addresses. In this case, each zone block may be configured by selecting the plurality of memory blocks having the same respective block addresses from each of the nonvolatile memory devices that the zone block is configured to use.

Although FIG. 29 illustrates the two groups GR1 and GR2 within the storage medium 920, embodiments are not limited thereto. The storage medium 920 may include two or more groups. When the storage medium 920 includes two or more groups, each zone block may be configured to use nonvolatile memory devices from only some of the groups among the whole groups. For example, when the storage medium 920 includes first to fourth groups, one zone block may be configured to use nonvolatile memory devices selected from the first and second groups and another zone block may be configured to use nonvolatile memory devices selected from the third and fourth groups.

In accordance with an embodiment, the controller 910 may perform, when initially writing data into a plurality of empty zone blocks, write operations at the same time (or substantially the same time) on two or more of the zone blocks. The controller 910 may start performing the write operations at the same time by providing respective data at the same time to at least some of the zone blocks. As described in detail with reference to FIG. 30, two or more start write pointers of the zone blocks may indicate different groups from one another.

Figure 30:
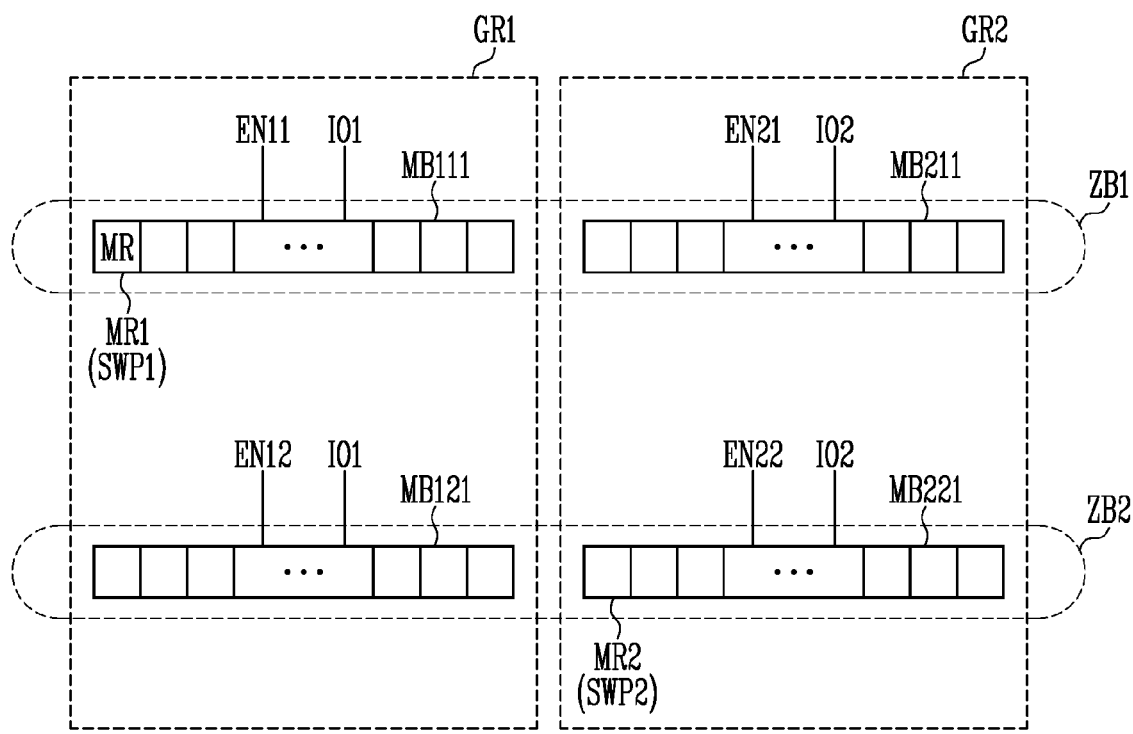
FIG. 30 illustrates start write pointers of zone blocks in accordance with an embodiment.

FIG. 30 is a diagram illustrating first and second start write pointers SWP1 and SWP2 of zone blocks ZB1 and ZB2 in accordance with an embodiment.

Referring to FIG. 30, the first zone block ZB1 may include the memory blocks MB111 and MB211 and the second zone block ZB2 may include the memory blocks MB121 and MB221.

Each memory block may include a plurality of memory regions MR. A memory region MR may be a unit of memory on which a nonvolatile memory device performs a write operation or a read operation at a time, such as a page. However, the memory region MR will not be limited thereto and the nonvolatile memory device may perform a write operation or a read operation on a different unit at a time. In FIG. 30, memory blocks MB111, MB211, MB121, and MB221 respectively correspond to the like numbered memory blocks of the nonvolatile memory devices NM11, NM12, NM21 and NM22 of FIG. 29, over which the first zone block ZB1 and the second zone block ZB2 are configured.

The first start write pointer SWP1 of the first zone block ZB1 may indicate a first memory region MR1 into which data is initially written within the first zone block ZB1. That is, when data is initially written into the first zone block ZB1 that is empty, the controller 910 may perform a write operation on the first memory region MR1.

The second start write pointer SWP2 of the second zone block ZB2 may indicate a second memory region MR2, into which data is initially written within the second zone block ZB2. That is, when data is initially written into the second zone block ZB2 that is empty, the controller 910 may perform a write operation on the second memory region MR2.

The first start write pointer SWP1 and the second start write pointer SWP2 may be set to indicate the first memory region MR1 and the second memory region MR2 within the different groups; here, the first memory region MR1 is in the first group GR1 and the second memory region MR2 is in the second group GR2. In other words, the first start write pointer SWP1 may be set to indicate the first memory region MR1 in a nonvolatile memory device coupled to the first input/output line IO1 and the second start write pointer SWP2 may be set to indicate the memory region MR2 in a nonvolatile memory device coupled to the second input/output line IO2, where the first and second input/output lines IO1 and IO2 are different from each other.

As a result, the initial write operations on the first zone block ZB1 and the second zone block ZB2 that are empty, that is, the write operations on the first memory region MR1 and the second memory region MR2, may be performed at the same time. That is, the controller 910 may start the respective write operations on the first memory region MR1 and the second memory region MR2 at the same time by providing respective data at the same time to the first input/output line IO1 and the second input/output line IO2, which are different from each other. More generally, while the first start write pointer SWP1 of the first zone block ZB1 and the second write pointer SWP2 of the second zone block ZB2 respectively indicate memory regions in different groups, data and command transmissions of respective write operations to the first zone block ZB1 and the second zone block ZB2 may overlap in time. Therefore, as described in detail with reference to FIGS. 31A and 31B, the write performance of the memory system 900 may be improved.

Figure 31A:
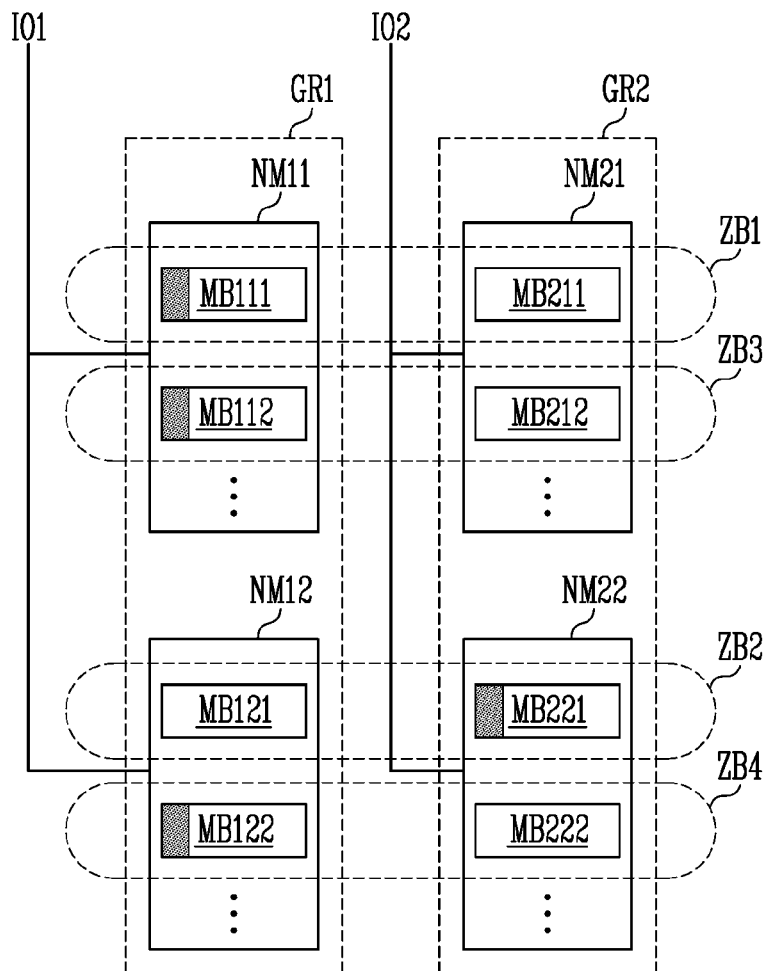
FIGS. 31A and 31B illustrate improvement of write performance in accordance with an embodiment.
Figure 31B:
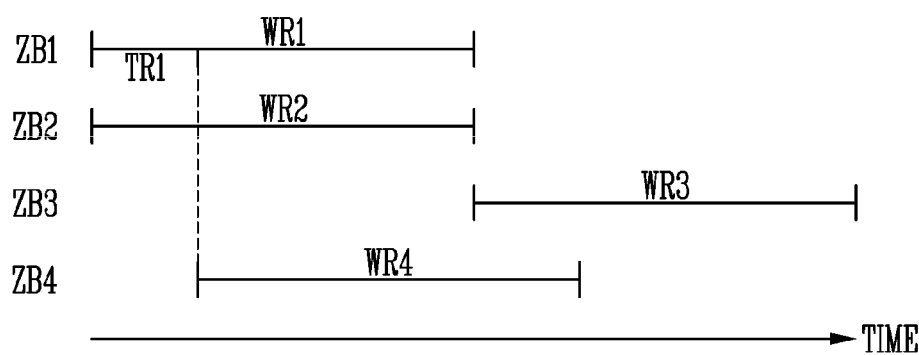

FIGS. 31A and 31B are diagrams for describing improvement of write performance in accordance with an embodiment.

FIG. 31A illustrates the memory regions indicated by the start write pointers of the zone blocks ZB1 to ZB4, respectively. For example, the start write pointers of the zone blocks ZB1, ZB3 and ZB4 may indicate memory regions in the first group GR1 and thus may indicate memory regions MR of the memory blocks MB111, MB112 and MB122, which are coupled to the first input/output line IO1. On the other hand, the start write pointer of the zone block ZB2 may indicate memory regions in the second group GR2 and thus may indicate memory region MR of the memory block MB221, which is coupled to the second input/output line IO2.

FIG. 31B illustrates a situation where write operations WR1 to WR4 on the zone blocks ZB1 to ZB4 progress respectively over time. Any or all of the zone blocks ZB1 to ZB4 may be empty, in which case the corresponding write operations may be initial write operations. Each of the write operations WR1 to WR4 may include data transmission and an internal operation. The data transmission may be an operation including transferring data from the controller 910 to any among the nonvolatile memory devices NM11, NM12, NM21 and NM22. The data may be transferred to a nonvolatile memory device including a memory region indicated by the start write pointer. The internal operation may include an operation of storing, by the nonvolatile memory device, data transferred from the controller 910 into the memory region indicated by the start write pointer.

As illustrated in FIG. 31A, the start write pointers of the zone blocks ZB1 and ZB2 may indicate memory regions in the groups GR1 and GR2, which are different from each other, and thus may indicate memory regions respectively coupled to the first input/output line IO1 and the second input/output line IO2, which are different from each other. Therefore, the write operations WR1 and WR2 respectively on the zone blocks ZB1 and ZB2 may be started at the same time. The controller 910 may start the write operations WR1 and WR2 respectively on the zone blocks ZB1 and ZB2 at the same time by simultaneously providing first data of the first write operation WR1 to the first input/output line IO1 and second data of the second write operation WR2 to the second input/output line IO2. More generally, the controller 910 may begin providing the first data to the first input/output line IO1, and may begin providing the second data to the second input/output line IO2 while the first data is still being provided. Consequently, the write operations WR1 and WR2 respectively on the zone blocks ZB1 and ZB2 may overlap each other.

The start write pointers of the zone blocks ZB1 and ZB3 may indicate memory regions of the same nonvolatile memory device NM11. In this case, between the zone blocks ZB1 and ZB3, after completion of the first write operation WR1 on the first zone block ZB1 (including completion of the internal operation of the first write operation WR1 within the nonvolatile memory device NM11), the controller 910 may start the third write operation WR3 on the zone block ZB3.

The start write pointers of the zone blocks ZB1 and ZB4 may respectively indicate memory regions of the nonvolatile memory devices NMii and NM12, which are different from each other. However, the start write pointers of the zone blocks ZB1 and ZB4 may correspond to the same first group GR1 and thus may be coupled to the same first input/output line 101. Therefore, the write operations WR1 and WR4 respectively on the zone blocks ZB1 and ZB4 may not be started at the same time, that is, the controller 910 may not overlap the provision of the respective write data of the write operations WR1 and WR4. In this case, after completion of data transmission TR1 to the first zone block ZB1 through the first input/output line 101, the controller 910 may start the fourth write operation WR4 on the fourth zone block ZB4. Because the fourth write operation WR4 is not to the same nonvolatile memory device NM11 as the first write operation WR1, the controller 910 does not have to wait for the completion of the internal operation of the first write operation WR1 within the nonvolatile memory device NM11 before starting the fourth write operation WR4.

In summary, the write operations WR1 and WR2 respectively on two (i.e., a total number of the input/output lines IO1 and IO2) of the zone blocks ZB1 and ZB2 may be started at the same time. If the controller 910 is coupled to the storage medium 920 through N number of independent input/output lines, write operations on as many as N number of zone blocks may be started at the same time, or more generally the respective data transfer portions of write operations to up to N number of zone blocks may overlap in time. Therefore, the write performance of the memory system 900 may be improved.

In accordance with an embodiment, when the controller 910 initially starts writing data into empty zone blocks, the controller 910 may determine start write pointers of the zone blocks such that the start write pointers do not all correspond to the same group. For example, in order to start initial write operations on the zone blocks ZB1 and ZB3 at the same time when the start write pointer of the first block ZB1 corresponds to the first group GR1, the controller 910 may determine the start write pointer of the third zone block ZB3 such that the start write pointer of the third zone block ZB3 corresponds to the second group GR2, that is, such that the start write pointer of the third zone block ZB3 indicates a memory region of the memory block MB212 coupled to the input/output line IO2, which is different from the example provided in FIG. 31A. In an embodiment, the controller 910 may utilize start write pointers that are determined according to a number assigned to a zone block.

In an embodiment, a number of memory blocks used to provide storage for each zone block or a storage capacity of each zone block may be fixed even when increasing a number of nonvolatile memory devices coupled to the same input/output line in order to increase the storage capacity of the storage medium 920. That is, the controller 910 may manage zone blocks to have a constant size regardless of the storage capacity of the storage medium 920 and thus the memory system 910 may operate stably.

Figure 32:
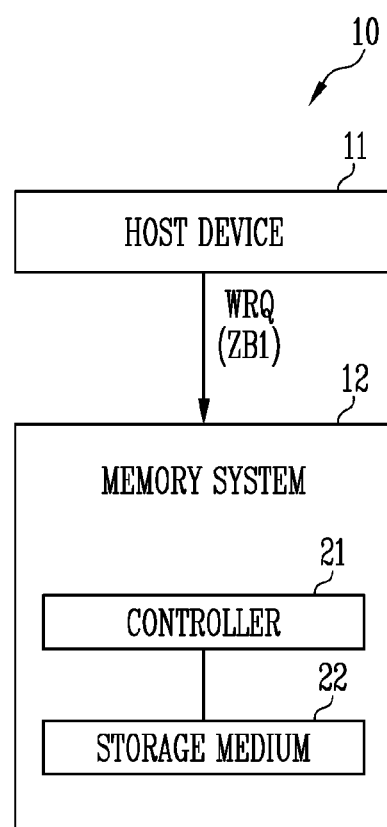
FIG. 32 illustrates a data processing system in accordance with an embodiment.

FIG. 32 is a diagram illustrating a data processing system 10 in accordance with an embodiment.

Referring to FIG. 32, the data processing system 10 may include a host device 11 and a memory system 12.

The host device 11 may provide the memory system 12 with a write request WRQ including zone block information ZBI. The host device 11 may designate a zone block, into which data is to be stored within a storage medium 22, through the zone block information ZBI. The zone block information ZBI may include a number or an address indicating a zone block.

In accordance with an embodiment, the host device 11 may designate a zone block within the storage medium 22 to store sequential data. The host device 11 may generate sequential data by merging random data and may designate a zone block to store such sequential data.

The memory system 12 may include a controller 21 and the storage medium 22. The controller 21 may write data into the zone block, which is designated by the zone block information ZBI within the storage medium 22, according to the write request WRQ. The controller 21 may configure and manage the zone block in substantially the same way as the controller 910 of FIG. 29. The storage medium 22 may be configured and may operate in substantially the same way as the storage medium 920 of FIG. 29. Therefore, a detailed description about the memory system 12 is omitted in the interest of brevity.

Figure 33:
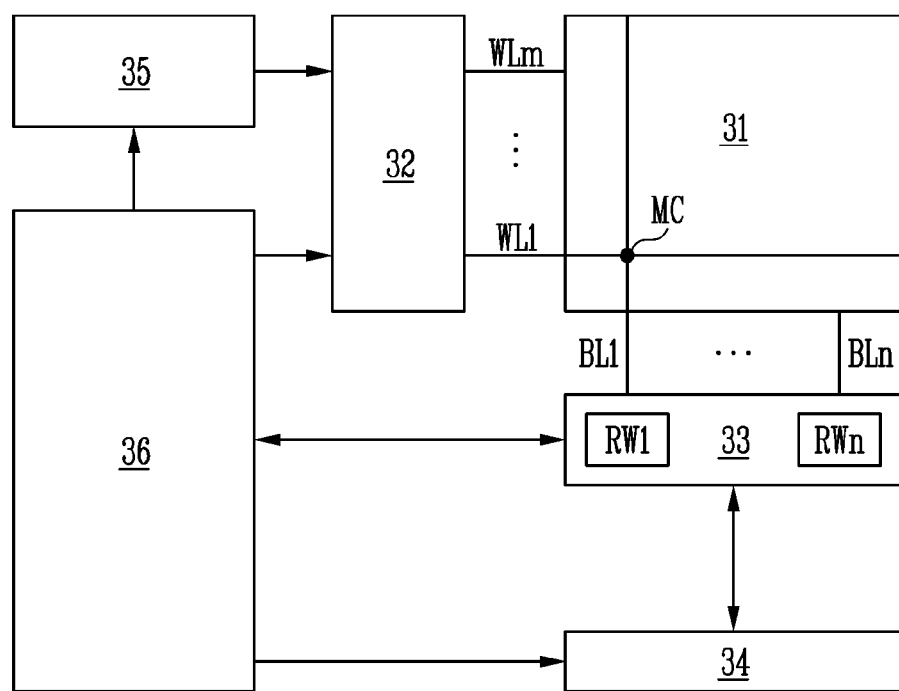
FIG. 33 illustrates a nonvolatile memory device included in a memory system in accordance with an embodiment.

FIG. 33 is a block diagram illustrating a nonvolatile memory device 30 included in a memory system in accordance with an embodiment. Referring to FIG. 33, the nonvolatile memory device 30 may include a memory cell array 31, a row decoder 32, a data read/write block 33, a column decoder 34, a voltage generator 35, and a control logic 36.

The memory cell array 31 may include memory cells MC which are arranged at areas where word lines WL1 to WLm and bit lines BL1 to BLn intersect with each other.

The row decoder 32 may be coupled with the memory cell array 31 through the word lines WL1 to WLm. The row decoder 32 may operate according to control of the control logic 36. The row decoder 32 may decode an address provided from an external device (not shown). The row decoder 32 may select and drive the word lines WL1 to WLm, based on a decoding result. For instance, the row decoder 32 may provide a word line voltage provided from the voltage generator 35, to the word lines WL1 to WLm.

The data read/write block 33 may be coupled with the memory cell array 31 through the bit lines BL1 to BLn. The data read/write block 33 may include read/write circuits RW1 to RWn respectively corresponding to the bit lines BL1 to BLn. The data read/write block 33 may operate according to control of the control logic 36. The data read/write block 33 may operate as a write driver or a sense amplifier according to an operation mode. For example, the data read/write block 33 may operate as a write driver which stores data provided from the external device, in the memory cell array 31 in a write operation. For another example, the data read/write block 33 may operate as a sense amplifier which reads out data from the memory cell array 31 in a read operation.

The column decoder 34 may operate according to control of the control logic 36. The column decoder 34 may decode an address provided from the external device. The column decoder 34 may couple the read/write circuits RW1 to RWn of the data read/write block 33 respectively corresponding to the bit lines BL1 to BLn with data input/output lines or data input/output buffers, based on a decoding result.

The voltage generator 35 may generate voltages to be used in internal operations of the nonvolatile memory device 30. The voltages generated by the voltage generator 35 may be applied to the memory cells of the memory cell array 31. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 36 may control general operations of the nonvolatile memory device 30, based on control signals provided from the external device. For example, the control logic 36 may control operations of the nonvolatile memory device 30 such as read, write and erase operations of the nonvolatile memory device 30.

4. 2-Tier Storage Management Using DRAM in Zoned Storage

Figure 34:
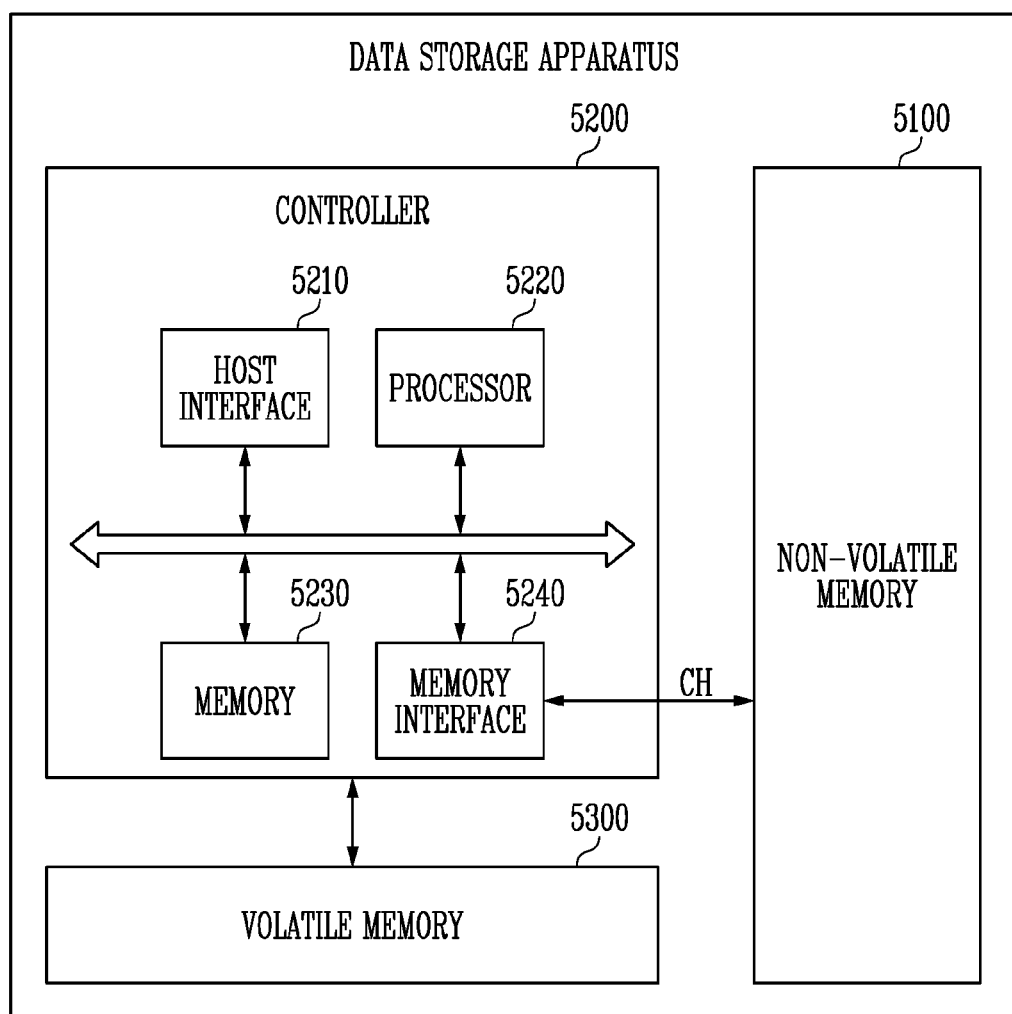
FIG. 34 illustrates a data storage apparatus according to an embodiment.

FIG. 34 is a diagram illustrating a data storage apparatus 10 according to an embodiment.

The data storage apparatus 5000 may store data accessed by a host apparatus (not illustrated), such as a mobile phone, an MP3 player, a laptop computer, a desktop computer, a game machine, TV or an in-vehicle infotainment system. The data storage apparatus 5000 may be called a memory system.

The data storage apparatus 5000 may be fabricated as any one of various types of storage apparatuses depending on an interface protocol electrically coupled to the host apparatus. For example, the data storage apparatus 5000 may be configured as any one of various types of storage apparatuses, such as a multimedia card of a solid state drive (SSD), MMC, eMMC, RS-MMC or micro-MMC form, a secure digital card of an SD, mini-SD or micro-SD form, a storage apparatus of a universal serial bus (USB) storage apparatus, universal flash storage (UFS) apparatus or personal computer memory card international association (PCMCIA) card form, a storage apparatus of a peripheral component interconnection (PCI) card form, a storage apparatus of a PCI-express (PCI-E) card form, a compact flash (CF) card, a smart media card, and a memory stick.

The data storage apparatus 5000 may be fabricated as one of various types of package forms. For example, the data storage apparatus 5000 may be fabricated as any one of various types of package forms, such as a package on package (POP), a system in package (SIP), a system on chip (SOC), a multi-chip package (MCP), a chip on board (COB), a wafer-level fabricated package (WFP) and a wafer-level stack package (WSP).

As illustrated in FIG. 34, the data storage apparatus 50000 may include a non-volatile memory 5100, a controller 5200 and a volatile memory 5300.

The non-volatile memory 5100 may operate as a storage medium of the data storage apparatus 5000. The non-volatile memory 5100 may be configured as one of various types of non-volatile memories, such as a NAND flash memory apparatus, a NOR flash memory apparatus, a ferroelectric random access memory (FRAM) using a ferroelectric capacitor, a magnetic random access memory (MRAM) using a tunneling magneto-resistive (TMR) film, a phase change random access memory (PRAM) using chalcogenide alloys, and a resistive random access memory (ReRAM) using transition metal oxide, depending on the memory cells used, but embodiments are not limited thereto.

Figure 35:
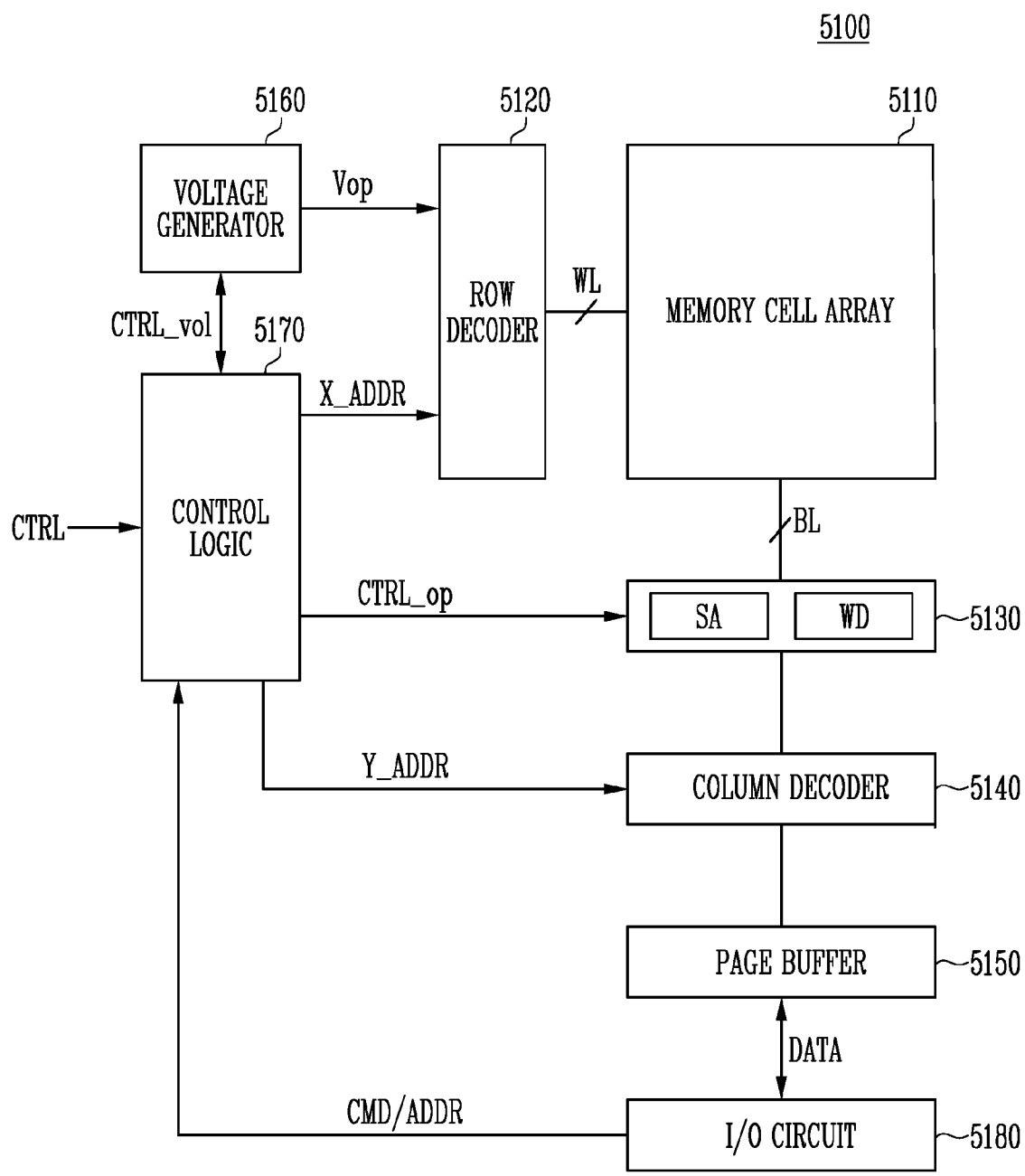
FIG. 35 illustrates a non-volatile memory according to an embodiment.
Figure 36:
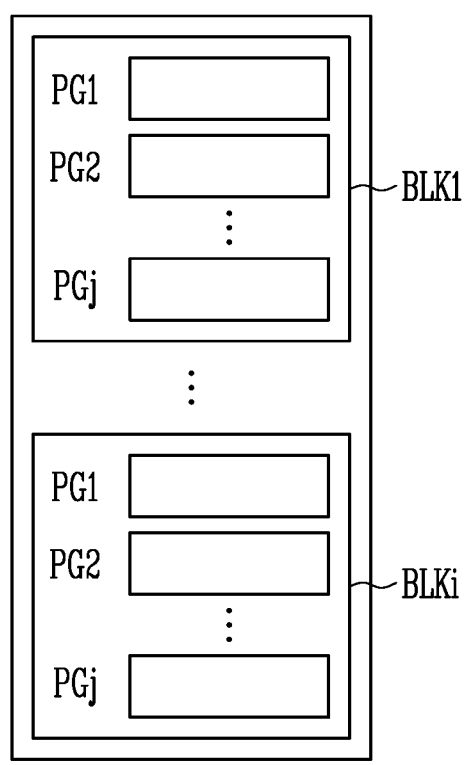
FIG. 36 illustrates a memory cell array according to an embodiment.

FIG. 35 illustrates the non-volatile memory 5100 in FIG. 34. FIG. 36 illustrates a memory cell array 5110 in FIG. 35.

Referring to FIG. 35, the non-volatile memory 5100 may include the memory cell array 5110, a row decoder 5120, a write/read circuit 5130, a column decoder 5140, a page buffer 5150, a voltage generator 5160, control logic 5170, and an input/output (I/O) circuit 5180.

The memory cell array 5110 may include a plurality of memory cells (not illustrated) disposed at respective regions in which a plurality of bit lines BL and a plurality of word lines WL intersect with each other. Referring to FIG. 36, the memory cell array 5110 may include a plurality of memory blocks BLK1 to BLKi. Each of the plurality of memory blocks BLK1 to BLKi may include a plurality of pages PG1 to PGj. In embodiments, a memory block corresponds to the smallest unit of the memory cell array 5110 that can be independently erased, and a page corresponds to the smallest unit of the memory cell array 5110 that can be independently programmed.

Each of the memory cells of the memory cell array 5110 may be a single-level cell (SLC) in which 1-bit data is stored, a multi-level cell (MLC) in which 2-bit data is stored, a triple-level cell (TLC) in which 3-bit data is stored, or a quadruple-level cell (QLC) in which 4-bit data is stored. The memory cell array 5110 may include at least one of an SLC, an MLC, a TLC, a QLC, and combinations thereof. The memory cell array 5110 may include memory cells disposed in a two-dimensional horizontal structure or may include memory cells disposed in a three-dimensional vertical structure.

The row decoder 5120 may be electrically coupled to the memory cell array 5110 through the word lines WL. The row decoder 5120 may operate under the control of the control logic 5170. The row decoder 5120 may decode a row address X_ADDR provided by the control logic 5170, may select at least one of the word lines WL based on a result of the decoding, and may drive the selected word line WL. The row decoder 5120 may provide the selected word line WL with an operating voltage Vop provided by the voltage generator 5160.

The write/read circuit 5130 may be electrically coupled to the memory cell array 5110 through the bit lines BL. The write/read circuit 5130 may include write/read circuits (not illustrated) corresponding to the respective bit lines BL. The write/read circuit 5130 may operate under the control of the control logic 5170. The write/read circuit 5130 may include a write driver WD for writing data in memory cells and a sense amplifier (SA) for amplifying data read from memory cells. The write/read circuit 5130 may provide a current pulse or voltage pulse to memory cells that belong to the memory cells of the memory cell array 5110 and that are selected by the row decoder 5120 and the column decoder 5140, thereby performing write and read operations on the selected memory cells.

The column decoder 5140 may operate under the control of the control logic 5170. The column decoder 5140 may decode a column address Y_ADDR provided by the control logic 5170. The column decoder 5140 may electrically couple write/read circuits of the write/read circuit 5130, corresponding to respective bit lines BL, and the page buffer 5150 based on a result of the decoding.

The page buffer 5150 may be configured to temporarily store data, such as provided by a memory interface 5240 of the controller 5200 and to be written in the memory cell array 5110, or data read from the memory cell array 5110 and to be provided to the memory interface 5240 of the controller 5200. The page buffer 5150 may operate under the control of the control logic 5170.

The voltage generator 5160 may generate various voltages for performing write, read and erase operations on the memory cell array 5110 based on a voltage control signal CTRL_vol provided by the control logic 5170. The voltage generator 5160 may generate driving voltages Vop for driving the plurality of word lines WL and bit lines BL. Furthermore, the voltage generator 5160 may generate at least one reference voltage in order to read data stored in a memory cell MC.

The control logic 5170 may output various types of control signals for writing data DATA in the memory cell array 5110 or reading data DATA from the memory cell array 5110 based on a command CMD_op, address ADDR and control signal CTRL received from the controller 5200. The various types of control signals output by the control logic 5170 may be provided to the row decoder 5120, the write/read circuit 5130, the column decoder 5140, the page buffer 5150 and the voltage generator 5160. Accordingly, the control logic 5170 may generally control various types of operations performed in the non-volatile memory 5100.

Specifically, the control logic 5170 may generate an operation control signal CTRL_op based on a command CMD and a control signal CTRL, and may provide the generated operation control signal CTRL_op to the write/read circuit 5130. The control logic 5170 may provide the row decoder 5120 and the column decoder 5140 with a row address X_ADDR and column address Y_ADDR included in an address ADDR, respectively.

The I/O circuit 5180 may be configured to receive a command CMD, address ADDR and data DATA provided by the controller 5200 or to provide the controller 5200 with data DATA read from the memory cell array 5110. The I/O circuit 5180 may output the command CMD and address ADDR, received from the controller 5200, to the control logic 5170, and may output the data DATA to the page buffer 5150. The I/O circuit 5180 may output, to the controller 5200, data DATA received from the page buffer 5150. The I/O circuit 5180 may operate under the control of the control logic 5170.

The controller 5200 may control an overall operation of the data storage apparatus 10 through the execution of firmware or software loaded on a memory 5230. The controller 5200 may decode and execute instructions or algorithms of a code form, such as firmware or software. The controller 5200 may be implemented in the form of hardware or a combination of hardware and software.

Figure 37:
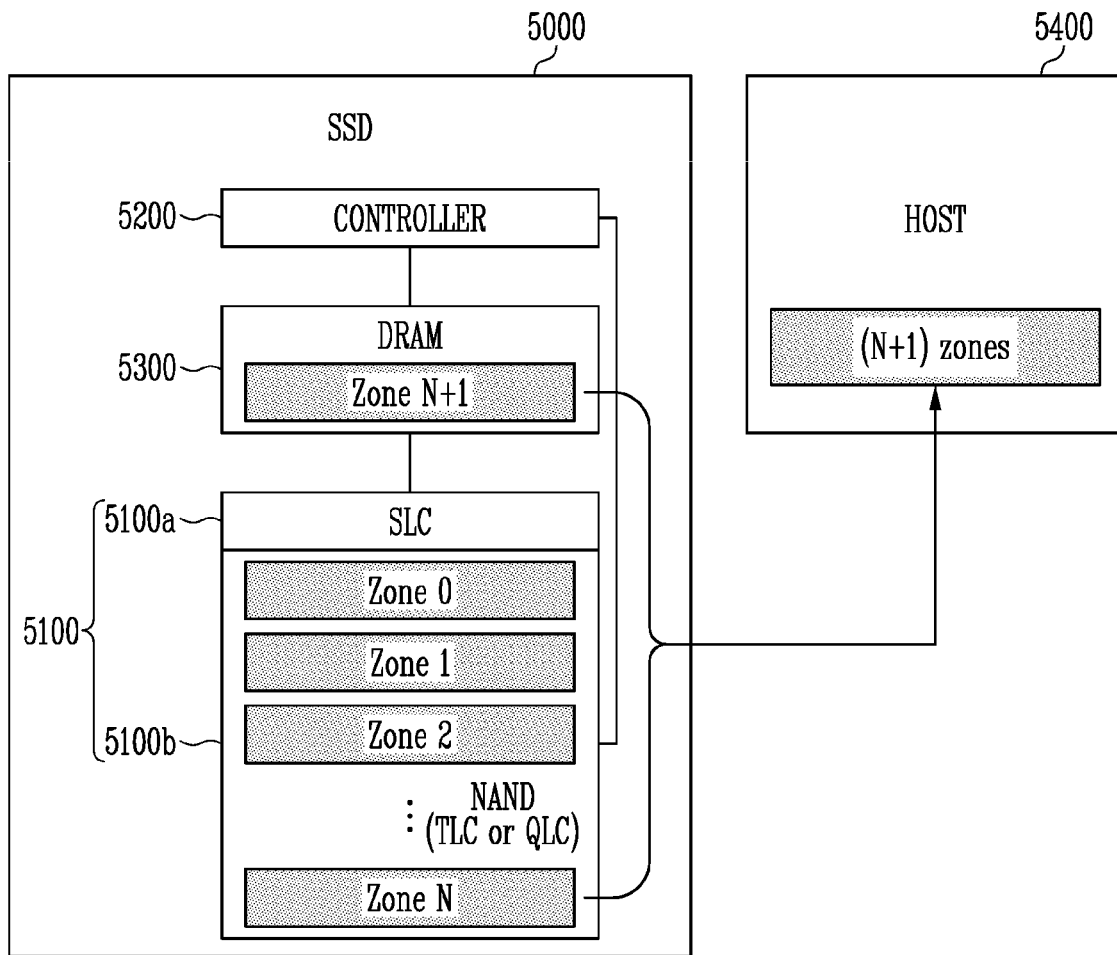
FIG. 37 illustrates a data processing system according to an embodiment.

The controller 5200 may control data to be written to or read from the non-volatile memory 5100 or the volatile memory 5300 in response to a write command or read command transmitted by a host apparatus 5400 (refer to FIG. 37). This will be described in detail later.

The controller 5200 may include a host interface 5210, a processor 5220, the memory 5230 and the memory interface 5240.

The host interface 5210 may provide an interface between a host apparatus and the data storage apparatus 5000 in accordance with a protocol of the host apparatus. For example, the host interface 5210 may communicate with the host apparatus through one of protocols, such as a universal serial bus (USB), a universal flash storage (UFS), a multimedia card (MMC), a parallel advanced technology attachment (PATA), a serial advanced technology attachment (SATA), a small computer system interface (SCSI), a serial attached SCSI (SAS), a peripheral component interconnection (PCI), and a PCI express (PCI-e).

The processor 5220 may be configured with a micro control unit (MCU) and/or a central processing unit (CPU). The processor 5220 may process a request transmitted by the host apparatus. In order to process the request transmitted by the host apparatus, the processor 5220 may execute an instruction or algorithm of a code form, that is, firmware loaded on the memory 5230, and may control internal function blocks, such as the host interface 5210, the memory 5230 and the memory interface 5240, and the non-volatile memory 5100.

The processor 5220 may generate control signals that will control an operation of the non-volatile memory 5100 based on requests transmitted by the host apparatus, and may provide the generated control signals to the non-volatile memory 5100 through the memory interface 5240.

The memory 5230 may be configured as a random access memory, such as a dynamic random access memory (DRAM) or a static random access memory (SRAM). The memory 5230 may store firmware executed by the processor 5220. Furthermore, the memory 5230 may store data used by the firmware, for example, meta data. That is, the memory 5230 may operate as a working memory of the processor 5220.

The memory 5230 may be configured to include a data buffer (DB) (not illustrated) for temporarily storing one or both of write data to be transmitted from the host apparatus to the non-volatile memory 5100 and read data to be transmitted from the non-volatile memory 5100 to the host apparatus. That is, the memory 5230 may operate as a buffer memory.

The memory interface 5240 may control the non-volatile memory 5100 under the control of the processor 5220. The memory interface 5240 may also be called a memory controller. The memory interface 5240 may communicate with the non-volatile memory 5100 using channel signals CH. The channel signals CH may include a command, an address, and an operation control signal for controlling the non-volatile memory 5100. The memory interface 5240 may use the channel signals CH to provide data to the non-volatile memory 5100 or to receive data from the non-volatile memory 5100.

Figure 38:
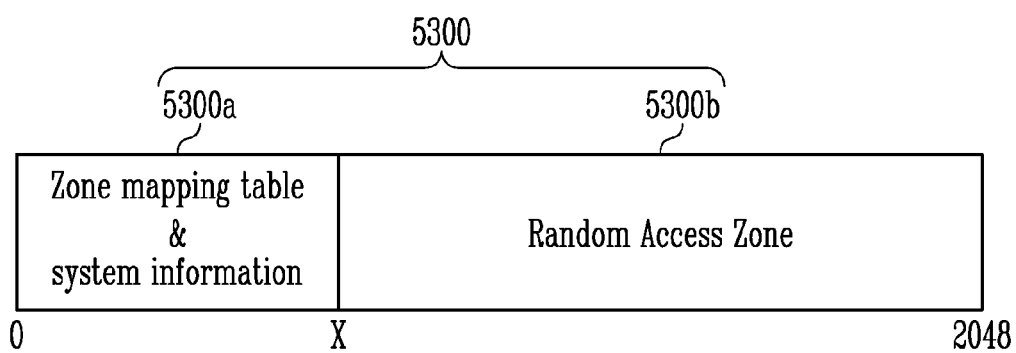
FIG. 38 illustrates a volatile memory according to an embodiment.

As illustrated in FIG. 38, the volatile memory 5300 may include a region 5300a in which a zone mapping table and system information are stored and a random access zone 5300b capable of random write. This will be described in detail later.

FIG. 37 is a diagram illustrating a data processing system according to an embodiment.

Figure 40:
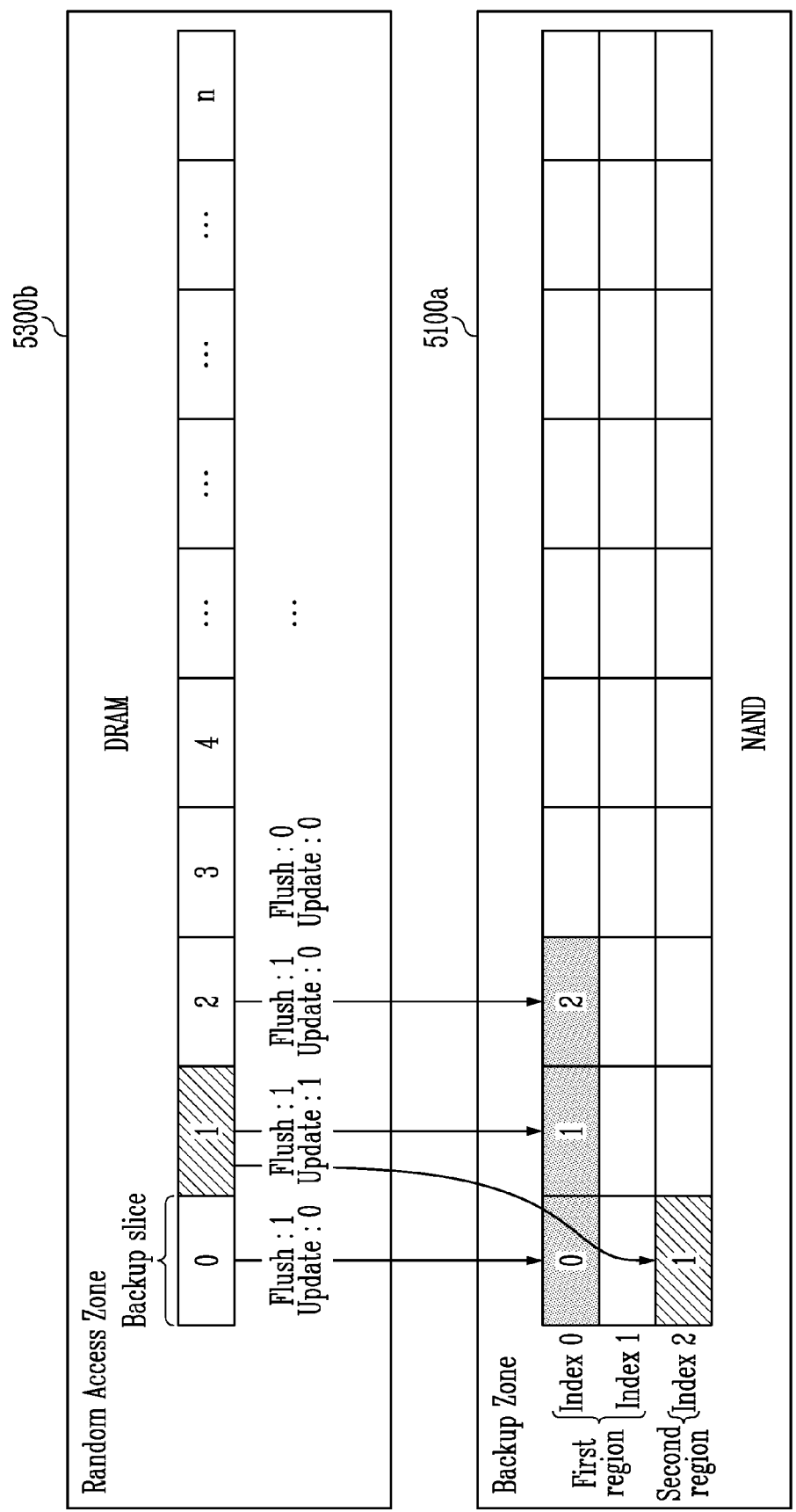
FIG. 40 illustrates a backup process according to an embodiment.
Figure 41:
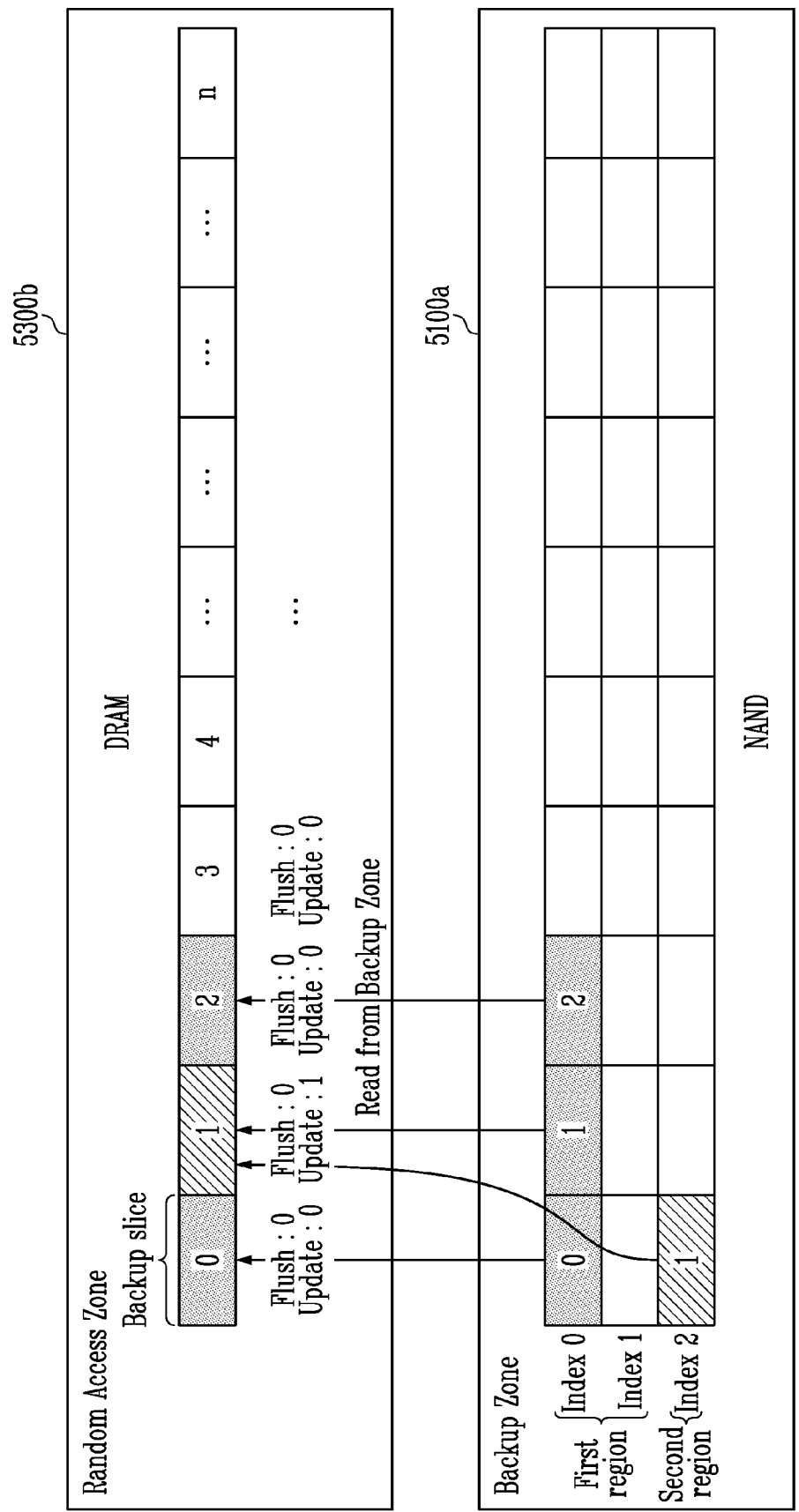
FIG. 41 illustrates a recovery process according to an embodiment.

The data processing system will be described below with reference to FIG. 38 illustrating the configuration of a volatile memory according to an embodiment, FIG. 39 illustrating an example of a zone mapping table according to an embodiment, FIG. 40, illustrating a backup process according to an embodiment, and FIG. 41 illustrating a recovery process according to an embodiment.

Referring to FIG. 37, the data processing system may include the data storage apparatus 5000 (for example, an SSD) and the host apparatus 5400.

The data storage apparatus 5000 may include the non-volatile memory 5100, the controller 5200 and the volatile memory 5300.

The non-volatile memory 5100 may be configured with a set of zones Zone 0 to Zone N having the same size, that is, a NAND flash region. In this case, each of the zones may respectively include one or more physical blocks.

Referring to FIG. 37, the non-volatile memory 5100 may include a backup zone 5100a and a plurality of sequential zones 5100b capable of sequential write.

The backup zone 5100a is a backup space for providing a non-volatile characteristic of the random access zone 5300b provided using the volatile memory 5300 and that is a marginal space outside of a system region of the volatile memory 5300. In an embodiment, the backup zone 5100a may be used in an SLC way. The backup zone 5100a may have a size two times or three times greater than the size of the random access zone 5300b, but embodiments are not limited thereto.

The sequential zone 5100*b* is a user region, and may be used in a TLC or QLC way. In this case, a write operation may be performed on the sequential zone 5100*b* in a sequential write way.

Referring to FIG. 38, the volatile memory 5300 may include the region 5300*a* in which a zone mapping table for managing the physical addresses of zones and system information are stored and the random access zone 5300*b* capable of random write. In this case, the volatile memory 5300 may be implemented as a DRAM, but embodiments are not limited thereto.

A zone according to an embodiment may have a relatively larger size than a page or block, and the zone mapping table may include a start physical block address (Start PBA), a total length and the final write location for each zone. Accordingly, a marginal space may occur in a region of the volatile memory 5300 because the amount of stored mapping data is reduced compared to a conventional technology.

Specifically, as illustrated in FIG. 39, the zone mapping table stored in the volatile memory 5300 may include for each zone a logical block address group, a zone index, a start physical block address (PBA 0), a total length and the final write location. The logical block address group may be defined to mean a plurality of logical block addresses grouped by a given number. The zone index may be defined to mean identification information for identifying a respective zone. The final write location of the zone mapping table may be defined to mean the last write location of the respective zone at the present time. The total length may be defined to mean a total length of physical address.

For example, a logical block address group 0 (LBAG 0) may include Logical Block Address (LBA) 0 to LBA 99. Each of the other logical address groups may include 5100 logical block addresses. Such a logical block address group may be matched with one zone. In contrast, in a conventional technology, the amount of data included in a mapping table is massive because a logical block address and a physical block address are matched in a one-to-one way. In an embodiment, the amount of data included in the mapping table can be reduced because a plurality of logical block addresses are matched with one zone and managed accordingly.

For this reason, in the zone mapping table, the size of mapping data is relatively reduced because the mapping data can be managed in a zone unit without using a mapping process of a 4 KB unit as in a conventional technology. As a result, a marginal space of the volatile memory 5300 can be secured. A region of the volatile memory 5300, secured because the size of a zone mapping table is reduced due to a change in the structure of the zone mapping table, may be used as the random access zone 5300*b* capable of random write.

Each of the non-volatile memory 5100 and the volatile memory 5300 may be configured with a plurality of zones (Zone 0 to Zone N+1). Accordingly, the host apparatus 5400 may recognize, as a logical region, each of the plurality of zones within the volatile memory 5300 and the non-volatile memory 5100. That is, the host apparatus 5400 may recognize the data storage apparatus 5000 as a storage apparatus including a plurality of zones. For example, the host apparatus 5400 may recognize (N+1) zones (refer to FIG. 37).

When a logical address is received along with a write command or read command from the host apparatus 5400, the controller 5200 may identify, such as by using the zone mapping table, whether the logical address belongs to the random access zone 5300*b* or the sequential zone 5100*b*, and then may control an operation, corresponding to the write command or read command of the identified zone, to be performed. The controller 5200 may also receive the size of data when a write command or a read command is received from the host apparatus 5400. The logical address may mean the start logical address of the data to be read or written. If the logical address belongs to the random access zone or the sequential zone, this may mean that a physical address corresponding to the logical address belongs to the random access zone or the sequential zone, respectively.

That is, if the logical address belongs to the sequential zone, the controller 5200 may control an operation, corresponding to the write command or read command, to be performed using the physical address corresponding to the logical address as a start address, wherein the physical address is an address within a sequential zone. If the logical address belongs to the random access zone, the controller 5200 may control an operation, corresponding to the write command or read command, to be performed using the physical address corresponding to the logical address as a start address, wherein the physical address is an address within a random access zone.

Furthermore, the controller 5200 may back up, onto the backup zone 5100*a*, data stored in the random access zone 5300*b* based on a preset criterion. Furthermore, when the state of the controller 5200 switches to an on state after power is off, the controller 5200 may recover the data stored in the backup zone 5100*a* into the random access zone 5300*b*.

The controller 5200 may identify a zone index matched with the start logical address of an operation based on the zone mapping table, and may identify whether the zone index is the random access zone 5300*b* or the sequential zone 5100*b*.

For example, if the start logical block address of an operation is LBA 5, the controller 5200 may identify that LBA 5 belongs to a logical block address group 0 (LBAG 0 in FIG. 39) based on the zone mapping table, and may identify that the logical block address group 0 is matched with a zone index 0 and thus belongs to the sequential zone 5100*b*. In this case, a case where the logical block address group 0 includes LBA 0 to LBA 99 and is matched with the zone index 0 may be described as an example. As described above, LBAs and a zone index matched with each logical block address group may be preset.

The controller 5200 may differently apply a process of identifying a physical address when a write command or read command for the random access zone 5300*b* is received because the random access zone 5300*b* corresponds to a volatile memory and the sequential zone 5100*b* corresponds to a non-volatile memory.

If a logical address received along with a write command from the host apparatus 5400 belongs to the sequential zone 5100*b*, the controller 5200 may identify a zone index matched with the start logical address of a zone based on the zone mapping table, may write data, corresponding to the size of the data received when the write command is received, from a location next to the final write location of the identified zone index, and then may update the final write location in the zone mapping table.

For example, if the start logical address of a zone is in LBA 5, the controller 5200 may identify a logical address group 0 and zone index 0, matched with LBA 5, based on the zone mapping table. If the final write physical address of the zone index 0 is 10, the controller 5200 may write data, corresponding to the size (e.g. 4) of data received when a write command is received, starting from physical address 11 of the zone corresponding to zone index 0. Furthermore, the controller 5200 may update a physical address 14 as the final write location in the zone mapping table.

If a logical address received along with a write command from the host apparatus 5400 belongs to the random access zone 5300b, the controller 5200 may write data, corresponding to the size of the data received from the host apparatus 5400, based on a start physical address of the random access zone 5300b.

For example, if the start logical address of a write operation corresponds to LBA 902, the controller 5200, based on the zone mapping table, may identify a logical block address group (LBAG) 10 to which LBA 902 belongs and a zone index 10, which is preset in this example as being the zone index of a zone in the random access zone 5300b. If the physical addresses of the region 5300a of the volatile memory 5300 in which the zone mapping table and system information are stored are included in physical blocks 0 to 599 (wherein, for example, each block includes 4 KB) and the physical addresses of the random access zone 5300b are in physical blocks 600 to 999, the controller 5200 may write data, corresponding to the size (e.g. 4) of data, at an offset from physical block address 600, that is, the start physical address of the random access zone 5300b. For example, if the start logical address of the write operation corresponds to an address offset of 9000 from the beginning of LBAG 10 (to which LBA 902 belongs), the write operation would be performed using a start physical address that is offset by 9000 from the beginning of physical block 600. In this case, the controller 5200 may write data from the start physical address of the random access zone 5300b because the random access zone 5300b corresponds to a volatile random-access memory.

If a logical address received along with a read command from the host apparatus 5400 belongs to the sequential zone 5100b, the controller 5200 may identify a zone index matched with the logical address based on the zone mapping table, and may read data corresponding to the size of data received from the host apparatus 5400 using a physical address, corresponding to the logical address in a corresponding zone of the identified zone index, as a start address.

If a logical address received along with a read command from the host apparatus 5400 belongs to the random access zone 5300b, the controller 5200 may identify the final physical address by adding the offset relative to the corresponding logical block address group of the logical address, received from the host apparatus 5400, to a start physical address of the random access zone 5300b, and may read data, corresponding to the size of data received from the host apparatus 5400, from the final physical address. For example, if the logical address corresponds to an offset of 8000 from the beginning of LBAG 10, and LBAG 10 is mapped to a zone beginning at the start of the random access zone 5300b, then the start physical address would be an address offset by 8000 from the start of the random access zone 5300b.

Referring to FIG. 40, the random access zone 5300b may include a plurality of slice regions (backup slices) 0 to n. Random access indices 0 to n may be sequentially assigned to the plurality of slice regions, respectively. In this case, the random access index may be defined to mean an index assigned to each of the plurality of slice regions within the random access zone 5300b. The slice region may have a size corresponding to the size of data which may be written at a time (that is, to a page size of the non-volatile memory 5100), but embodiments are not limited thereto.

Furthermore, each of the random indices may be matched with a flush flag (Flush 1 or 0), indicating whether data stored in the corresponding slice of the random access zone 5300b is backed up onto the backup zone 5100a, and an update flag (Update 1 or 0) indicating whether data stored in the corresponding slice of the random access zone 5300b has been updated with new data.

Furthermore, the backup zone 5100a may include a first region(Index 0, Index 1) onto which data written in the random access zone 5300b is backed up in a one-to-one way and a second region(Index 2) onto which the latest data updated in the random access zone 5300b is backed up when power is turned off or interrupted. Each of the first region and the second region may be matched with each virtual backup index. One or more backup indices may be assigned to each backup zone. For example, two backup indices, such as Index 0 and Index 1, may be assigned to the first region, and one backup index, such as Index 2, may be assigned to the second region.

As illustrated in FIG. 40, the first region may be configured to include two or more subregions respectively corresponding to Index 0 and Index 1, where each subregion of the first region has a size equal to or greater than the size of the random access zone 5300b.

The controller 5200 may separately manage, as system information, an indication of at which backup index of each of the first and second regions the latest data is stored; that is, which indices are the latest backup indices. The information on the latest backup index may be stored in the volatile memory 5300 as system information.

For example, if the amount of data written in the random access zone 5300b is a reference value or more, the controller 5200 may back up, onto the backup zone 5100a, the data stored in the random access zone 5300b, and may change a value of a corresponding flush flag for the backed-up random access zone to 1 (i.e., one). When the data was backed up to the subregion corresponding to index 0 of the backup zone 5100a, the controller 5200 may set index 0 as the latest backup index for the first region. When the data was backed up to the subregion corresponding to index 1 of the backup zone 5100a, the controller 5200 may set index 1 as the latest backup index for the first region. Furthermore, in an embodiment, the controller 5200 may erase the subregion corresponding to index 1 after the data was backed up to the subregion corresponding to index 0 and may erase the subregion corresponding to index 0 after the data was backed up to the subregion corresponding to index 1, in order to prepare for the next backup operation. Furthermore, after backing up the data to the first region, the controller 5200 may erase the second region and reset the update flags for the slices, to prepare the second region to accept backup data when, for example, power fails. In such embodiments, the controller 5200 may alternate between backing up the random access zone 5300b to the subregions of index 0 and index 1.

For another example, if the number of write commands received from the host apparatus 5400 is a reference value or more, the controller 5200 may sequentially write, in the backup zone 5100a, data stored in a plurality of slice regions based on random access index numbers, and may change values of flush flags, for the backed-up slice regions, to 1 (i.e., one). In this case, the flush flag having a value of 1 may indicate that data has been backed up onto the backup zone 5100a. The flush flag having a value of 0 may indicate that data has not been backed up onto the backup zone 5100a.

The controller 5200 may apply, as a backup condition, a condition in which data written in response to a request from the host apparatus 5400 reaches a slice size, not the number of write commands, but embodiments are not limited thereto. The backup condition may be changed or added to depending on an operator's needs.

When the backup of data for all the slice regions within the random access zone 5300b is completed, the controller 5200 may reset the values of all the flush flags to 0 (i.e., zero).

After data stored in the plurality of slice regions is written in the backup zone 5100a, if the update of data stored in the random access zone 5300b occurs from the host apparatus 5400, the controller 5200 may change a value of an update flag for a corresponding slice region to 1 (i.e., one). In this case, the update flag 1 may indicate that data has been updated with new data, but has not been backed up since the update. The update flag 0 may indicate that there is no new data has not been backed up onto the backup zone 5100a.

Referring to FIG. 40, the controller 5200 may back up, onto the second region (Index 2), data that is stored in the random access zone 5300b and that has an update flag of 1. After the backup of update data is completed, the controller 5200 may reset the update flag for a corresponding slice region to 0.

In particular, in an embodiment, when a signal for power-off is received, the controller 5200 may write, in the second region (Index 2), data that is stored in the random access zone 5300b and that has a flush flag of 0 (indicating that a backup operation to the first region was only partly completed and did not back up the data) or update flag of 1 (indicating that the data was modified since the last backup to the first region). When the data is written in the second region (Index 2), the controller 5200 may also store a corresponding random access index. In this case, the random access index may be written in a spare region of the first page of the second region. When a plurality of slices are backed up to the second region, a plurality of corresponding random access indices may be stored in the spare region of the first page of the second region, or in another embodiment may be stored in spare regions of the pages used to store the respective slices. The stored random access index (or indices) may be used to identify a location of the backed up data within a random access zone prior to the backup when the data is recovered.

In the case of an abnormal termination, the data storage apparatus 10 may perform a backup operation based on an internal capacity or by external power.

Referring to FIG. 41, when the state of the controller 5200 switches to an on state after power is off, the controller 5200 may calculate physical addresses corresponding to the latest backup index of a first region (either the subregion corresponding to Index 0 or the subregion corresponding to Index 1), and may sequentially read data from the corresponding physical addresses to the random access zone 5300b. Specifically, the controller 5200 may calculate the final physical address whose data needs to be recovered by incorporating the start physical address of a random access zone into a backup index. In an embodiment, the controller 5200 may determine whether the subregion of index 0 or the subregion of index 1 holds the data to be restored by determining which subregion is in an erased state, by using system information stored in the nonvolatile memory, or both.

Furthermore, when the loading of data onto the first region is terminated, the controller 5200 may read the latest data, stored in the backup zone 5100a of the second region (Index 2 in FIG. 41), to the random access zone 5300b.

The controller 5200 may identify a location of the random access zone 5300b to which the latest data will be written based on a corresponding random access index stored in the second region. In this manner, any data not backed up because of either a failure of a backup operation to the first region to complete or because the data was updated after the last backup operation to the first region will be restored from the second region.

Figure 42:
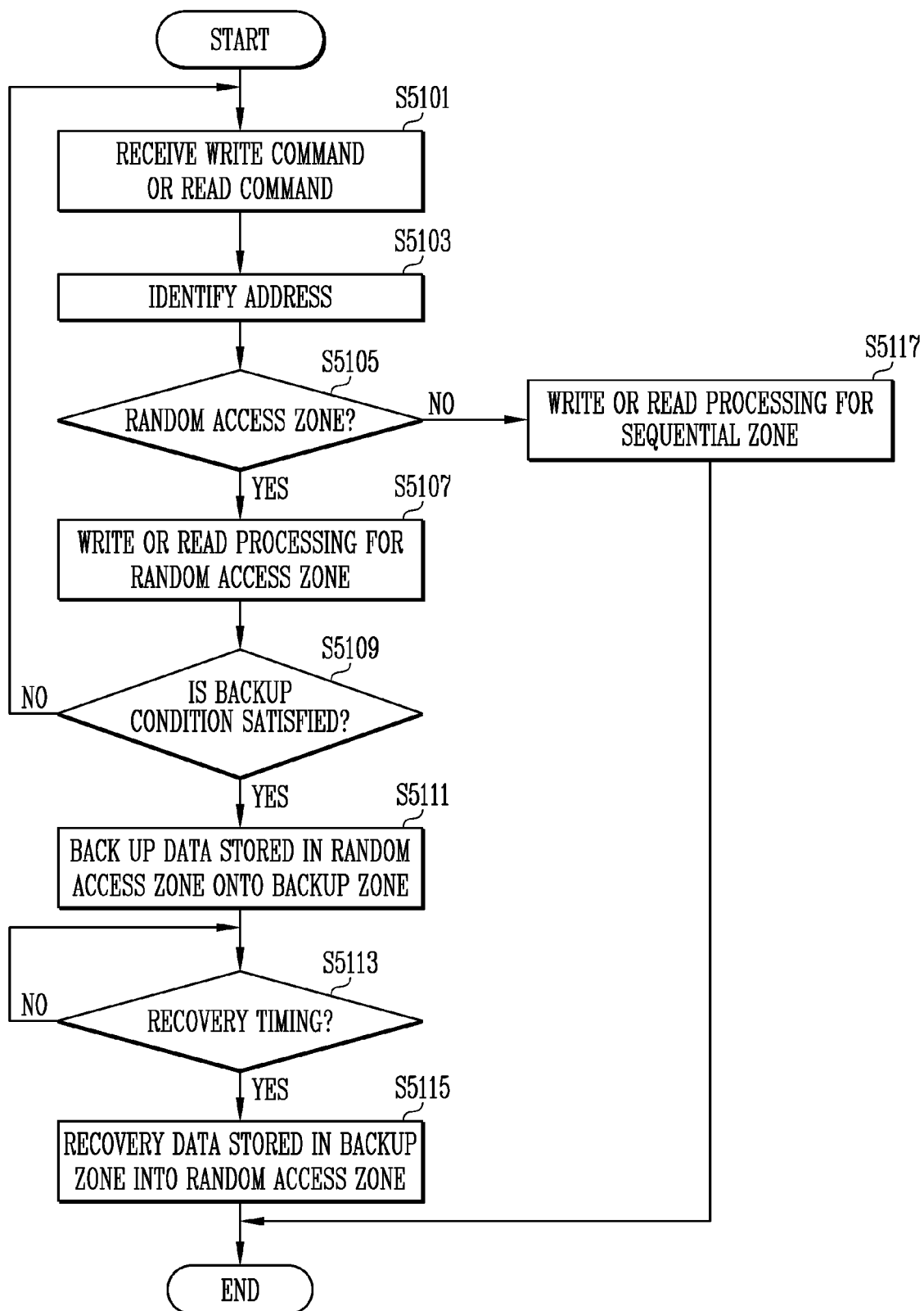
FIG. 42 is a flowchart of an operating process of the data storage apparatus according to an embodiment.

FIG. 42 is a flowchart for describing an operating process of the data storage apparatus 5000 according to an embodiment.

Referring to FIG. 42, the data storage apparatus 5000 may receive a logical address received along with a write command or a read command from the host apparatus 5400 (S5101). The data storage apparatus 5000 may also receive the size of data when receiving the write command or read command from the host apparatus 5400.

Next, the data storage apparatus 5000 may identify whether the logical address belongs to the random access zone 5300b within the volatile memory 5300 or to the sequential zone 5100b within the non-volatile memory 5100 (S5103 and S5105).

The logical address may mean the start logical address of an operation corresponding to the command. If the logical address belongs to the random access zone or the sequential zone, this may respectively mean that a physical address corresponding to the logical address belongs to the random access zone or the sequential zone. That is, if the logical address belongs to the sequential zone, the data storage apparatus 5000 may control an operation, corresponding to the write command or read command, to be performed using the physical address corresponding to the logical address as a start address.

The volatile memory 5300 may include the region 5300a in which a zone mapping table and system information are stored and the random access zone 5300b capable of random write. The non-volatile memory 5100 may include the backup zone 5100a and the plurality of sequential zones 5100b capable of sequential write.

The data storage apparatus 5000 may perform an operation, corresponding to the write command or read command, based on the random access zone 5300b or sequential zone 5100b identified at step S5103 (S5107 and S5117). This will be described in detail later.

Next, the data storage apparatus 5000 may back up data, stored in the random access zone 5300b, onto the backup zone 5100a based on a preset criterion (S5109 and S5111).

The random access zone 5300b may include a plurality of slice regions. Each of the plurality of slice regions is matched with a random access index. Each of the random access indices may be matched with a flush flag, indicating whether data stored in the random access zone 5300b has been backed up onto the backup zone 5100a, and an update flag indicating whether data stored in the random access zone 5300b has been updated with new data.

The backup zone 5100a may include the first region (as shown in FIG. 40) onto which data written in the random access zone 5300b is backed up in a one-to-one way and the second region (as also shown in FIG. 40) onto which the latest data updated in the random access zone 5300b is backed up when power is turned off or otherwise interrupted. Each of the first region and the second region may have a respective latest backup index identifying a subregion that stores the latest backed up data in that region.

For example, at steps S5109 and S5111, if the amount of data written in the random access zone 5300b is a reference value or more, the data storage apparatus 5000 may back up, onto the backup zone 5100a, the data stored in the random access zone 5300b, and may change a value of a corresponding flush flag for the backed-up random access zone 5300b to 1 (i.e., one).

For another example, at steps S5109 and S5111, if the number of write commands received from the host apparatus 5400 is a reference value or more, the data storage apparatus 5000 may sequentially write, in the backup zone 5100a, data stored in the plurality of slice regions based on random access index numbers.

Referring to FIG. 40, the data storage apparatus 5000 may sequentially back up, onto the backup zone 5100a, data stored in slice regions from a random access index 0 to a random access index n.

Thereafter, the data storage apparatus 5000 may change values of flush flags for the backed-up slice regions to 1 (i.e., one).

Next, after the data stored in the plurality of slice regions is written in the backup zone 5100a, if the update of data stored in the random access zone 5300b occurs from the host apparatus 5400, the data storage apparatus 5000 may change a value of an update flag for a corresponding slice region to 1 (i.e., one).

When a signal for power-off is received, the data storage apparatus 10 may write, in the second region (Index 2), data in the random access zone 5300b having a flush flag of 0 (Flush 0) or update flag of 1 (Update 1).

When the data is written in the second region, the data storage apparatus 5000 may also store a corresponding random access index.

Next, when the state of the data storage apparatus 5000 switches to an on state after power is off, the data storage apparatus 5000 may recover the data stored in the backup zone 5100a into the random access zone 5300b (S5113 and S5115). Note that although S5113 and S5115 are shown as following after S5111, embodiments are not limited thereto, and a power interruption and subsequent recovery may occur at any time during the process of FIG. 42.

Specifically, when the state of the data storage apparatus 5000 switches to an on state after power is off, the data storage apparatus 5000 may calculate physical addresses corresponding to the latest backup index of the first region (such as, for example Index 0 or Index 1), and may sequentially read data from the physical addresses to the random access zone 5300b.

In this case, the data storage apparatus 5000 may separately manage, as system information, a latest backup index that belongs to the first region and a latest backup index that belongs to the second region, each indicating where in their region the latest data is stored. The latest backup index may be stored in the volatile memory 5300 as system information. After identifying the latest backup index, the data storage apparatus 5000 may recover the data of the corresponding backup index into the random access zone 5300b at step S5115.

Next, when the loading of data from the first region is completed, the data storage apparatus 5000 may read the latest data, stored in the second region of the backup zone 5100a, to the random access zone 5300b.

Figure 43:
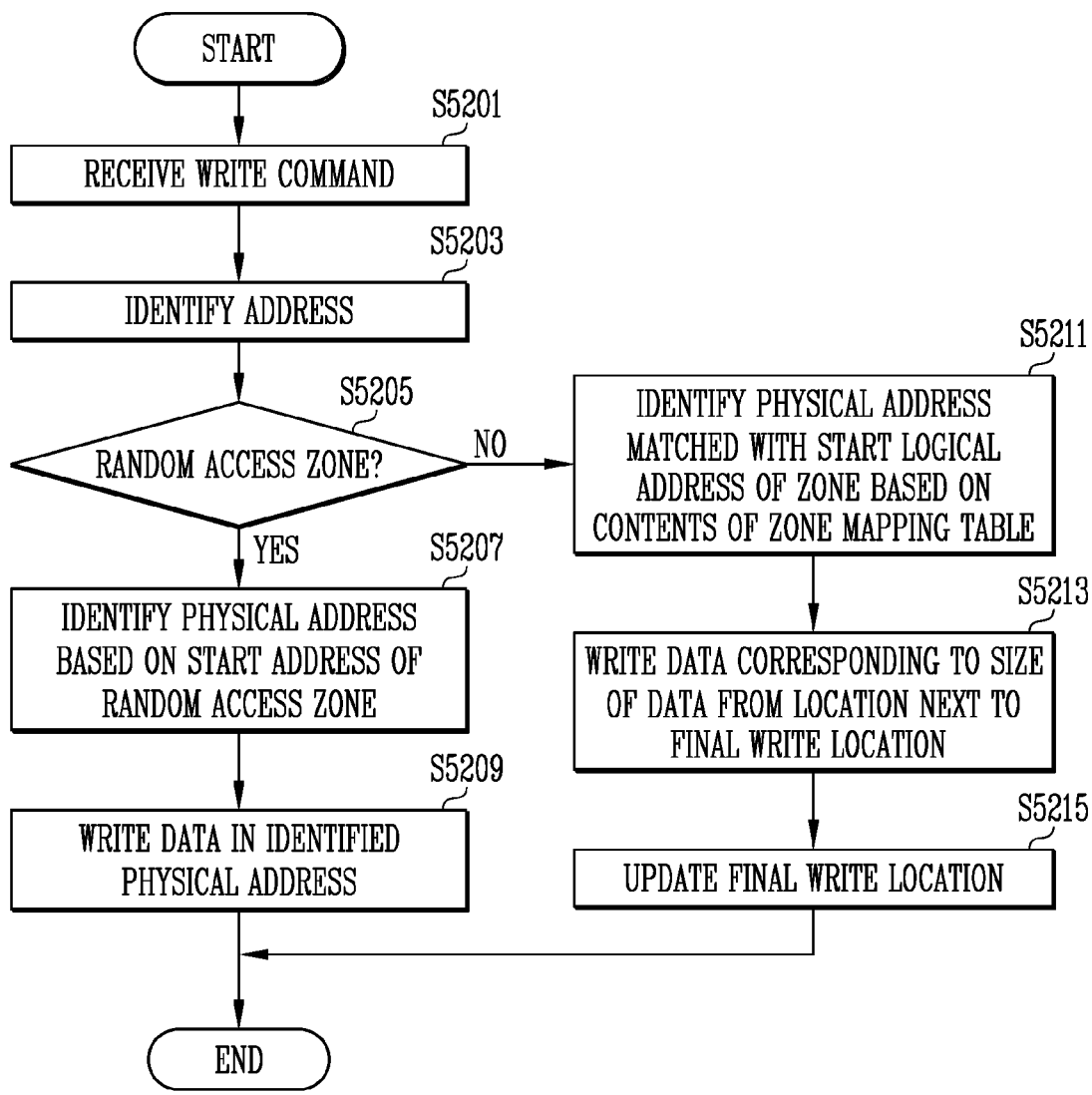
FIG. 43 is a flowchart of a data write process in FIG. 42, according to an embodiment.

FIG. 43 is a detailed flowchart for the data write process such as may be used in the process of FIG. 42.

The data storage apparatus 5000 may receive a logical address along with a write command from the host apparatus 5400 (S5201). The controller 5200 may also receive the size of data when receiving a write command or read command from the host apparatus 5400.

Next, the data storage apparatus 5000 may identify whether the logical address belongs to the random access zone 5300b within the volatile memory or the sequential zone 5100b within the non-volatile memory 5100 (S5203 and S5205).

If, as a result of the identification at step S5205, the logical address belongs to the random access zone 5300b, the data storage apparatus 5000 may write data, corresponding to the size of the data received from the host apparatus 5400, based on a start physical address of the random access zone 5300b (S5207 and S5209).

If, as a result of the identification at step S5205, the logical address belongs to the sequential zone 5100b, the data storage apparatus 5000 may identify a zone index, matched with the logical address received along with the write command from the host apparatus 5400, based on the zone mapping table.

Next, the data storage apparatus 5000 may identify a physical address on which a write operation will be performed by identifying the final write location of the identified zone index (S5211).

Next, the data storage apparatus 5000 may write data, corresponding to the size of the data, from a location next to the final write location of the identified zone index (S5213). In an embodiment, the size of the data may correspond to a page size of the sequential zone 5100b. In another embodiment, the size of the data may be less than a page size of the sequential zone 5100b, and a read-modify-write operation may be used to perform the write of the data.

Next, after performing the write operation, the data storage apparatus 5000 may update the final write location in the zone mapping table (S5215).

Figure 44:
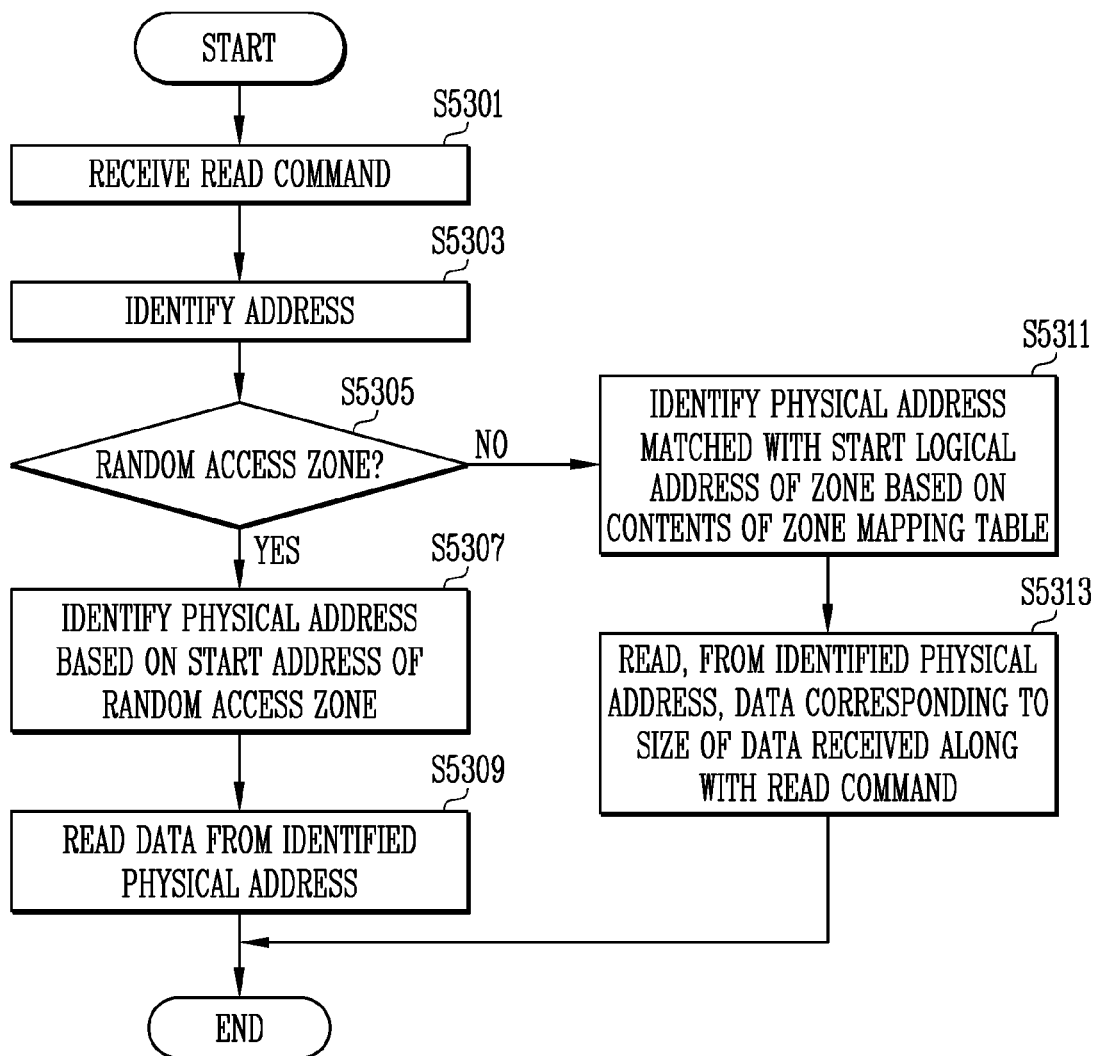
FIG. 44 is a flowchart of a data read process in FIG. 42, according to an embodiment.

FIG. 44 is a detailed flowchart for describing a data read process such as may be used in the process of FIG. 42.

The data storage apparatus 5000 may receive a logical address along with a read command from the host apparatus 5400 (S5301). Next, the data storage apparatus 5000 may identify whether the logical address belongs to the random access zone 5300b within the volatile memory or the sequential zone 5100b within the non-volatile memory (S5303 and S5305).

If, as a result of the identification at step S5305, the logical address belongs to the random access zone 5300b, the data storage apparatus 5000 may identify the final physical address by adding a portion of the logical address, such as the logical address's offset from a start logical address of the corresponding logical block address group, to a start physical address of the random access zone 5300b (S5307).

As illustrated in FIG. 38, in the volatile memory 5300, the region 5300a in which the zone mapping table and system information are stored occupies a part of a memory space and the remaining marginal space is used as the random access zone 5300b. Accordingly, the start physical address of the random access zone 5300b is not 0, but may be a physical address after the region 5300a in which the zone mapping table and system information are stored. As a result, the data storage apparatus 5000 may identify the final physical address from which data will be actually read, by adding all or a portion of the start logical address of a command received from the host apparatus 5400, to the start physical address of the random access zone 5300b.

Next, the data storage apparatus 5000 may read, from the final physical address, data corresponding to the size of the data received when the read command is received (S5309).

If, as a result of the identification at step S5305, the logical address belongs to the sequential zone 5100b, the data storage apparatus 5000 may identify a zone index matched with the logical address based on the zone mapping table. The data storage apparatus 5000 may identify a start physical address corresponding to the logical address at the identified zone index (S5311).

Next, the data storage apparatus 5000 may read data, corresponding to the size of the data requested by the host apparatus 5400, from the start physical address identified at step S5311 (S5313).

Figure 45:
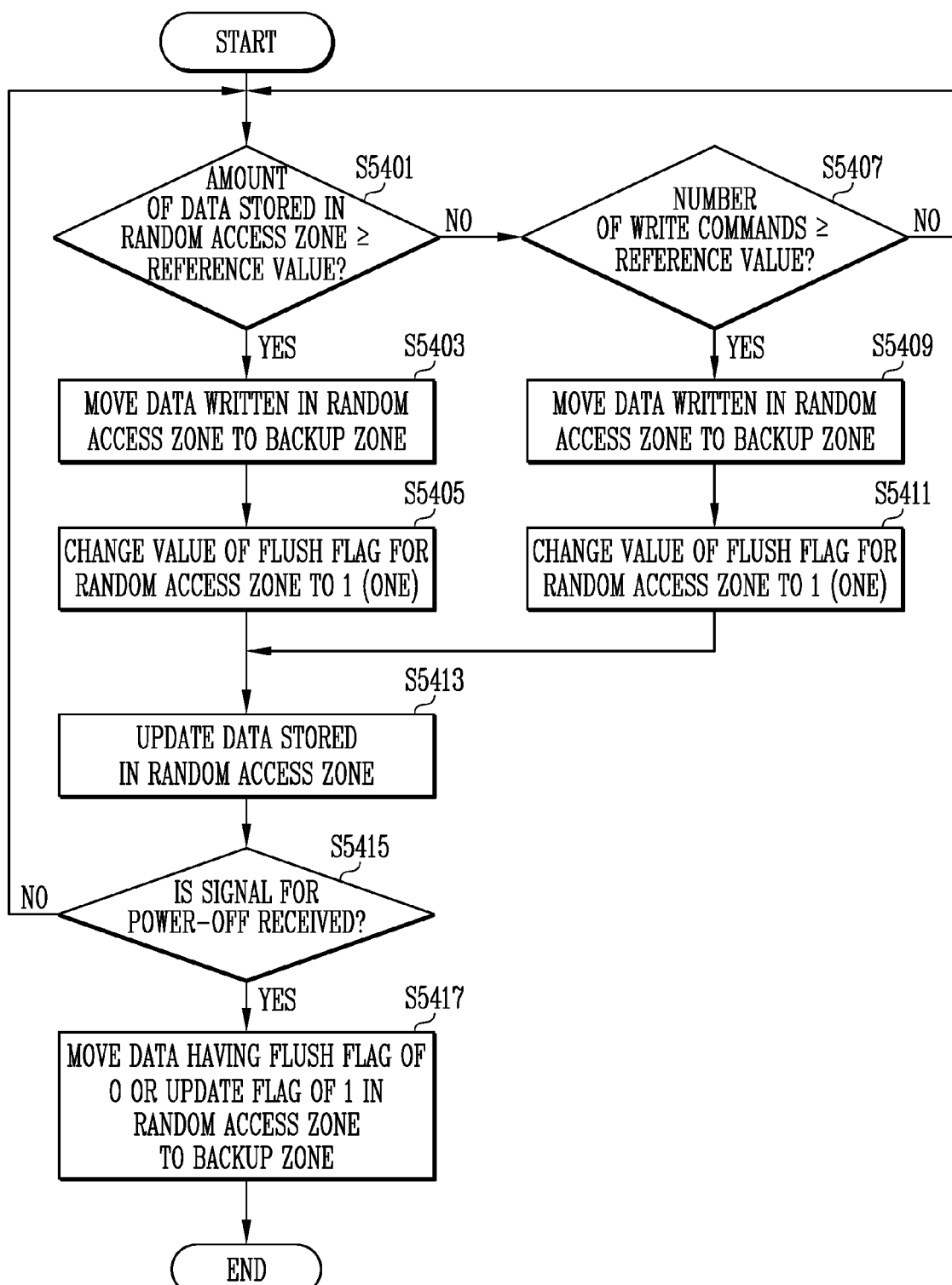
FIG. 45 is a flowchart of an operating process of the data storage apparatus according to another embodiment.

FIG. 45 is a flowchart for describing an operating process of the data storage apparatus according to another embodiment. A case where the data storage apparatus 5000 moves data stored in the random access zone 5300b to the backup zone 5100a will be described as an example.

If a backup condition is satisfied, the data storage apparatus 5000 may back up data stored in the random access zone 5300b onto the backup zone 5100a.

For example, the data storage apparatus 5000 may identify whether the amount of data written in the random access zone 5300b is a reference value or more (S5401).

The random access zone 5300b may include a plurality of slice regions. Each of the plurality of slice regions may be matched with a respective random access index. Each of the random access indices may be matched with a flush flag, indicating whether data stored in the random access zone 5300b has been backed up onto the backup zone 5100a, and an update flag indicating whether data stored in the random access zone 5300b has been updated with new data.

The backup zone 5100a may include the first region (shown in FIG. 40) onto which data written in the random access zone 5300b is backed up in a one-to-one way and the second region (also shown in FIG. 40) onto which the latest data updated in the random access zone 5300b is backed up when power is turned off or interrupted. Each of the first region and the second region may have a respective latest backup index indicating a subregion of the respective region that includes the latest backed up data.

If, as a result of the identification, the amount of the data written in the random access zone 5300b is a reference value or more, the data storage apparatus 5000 may sequentially write, in the backup zone 5100a, data stored in a plurality of slice regions within the random access zone 5300b, based on random access index numbers (S5403).

Next, the data storage apparatus 5000 may change a value of a corresponding flush flag for the backed-up random access zone 5300b to 1 (i.e., one) (S5405).

If, as a result of the identification at step S5401, the amount of the data written in the random access zone 5300b is not the reference value or more, the data storage apparatus 5000 may identify whether the number of write commands received from the host apparatus 5400 is a reference value or more (S5407).

If, as a result of the identification at step S5407, the number of write commands is the reference value or more, the data storage apparatus 5000 may sequentially write, in the backup zone 5100a, data stored in a plurality of slice regions based on random access index numbers (S5409).

Thereafter, the data storage apparatus 5000 may change a value of a corresponding flush flag for the backed-up slice region to 1 (i.e., one) (S5411).

Next, if the update of data stored in the random access zone 5300b occurs from the host apparatus 5400 after the data stored in the plurality of slice regions is written in the first region of the backup zone 5100a, the data storage apparatus 5000 may change a value of a corresponding update flag for a corresponding slice region to 1 (i.e., one) (S5413).

When a signal for power-off is received (S5415), the data storage apparatus 5000 may write, in the second region (Index 2), data having a flush flag of 0 (Flush 0) or update flag of 1 (Update 1) in the second region of the random access zone 5300b (S5417). When the data is written in the second region, the data storage apparatus 5000 may also store a corresponding random access index for each slice written.

Although not illustrated, when the state of the data storage apparatus 5000 switches to an on state after power is off, the data storage apparatus 5000 may recover the data stored in the backup zone 5100a into the random access zone 5300b.

Figure 46:
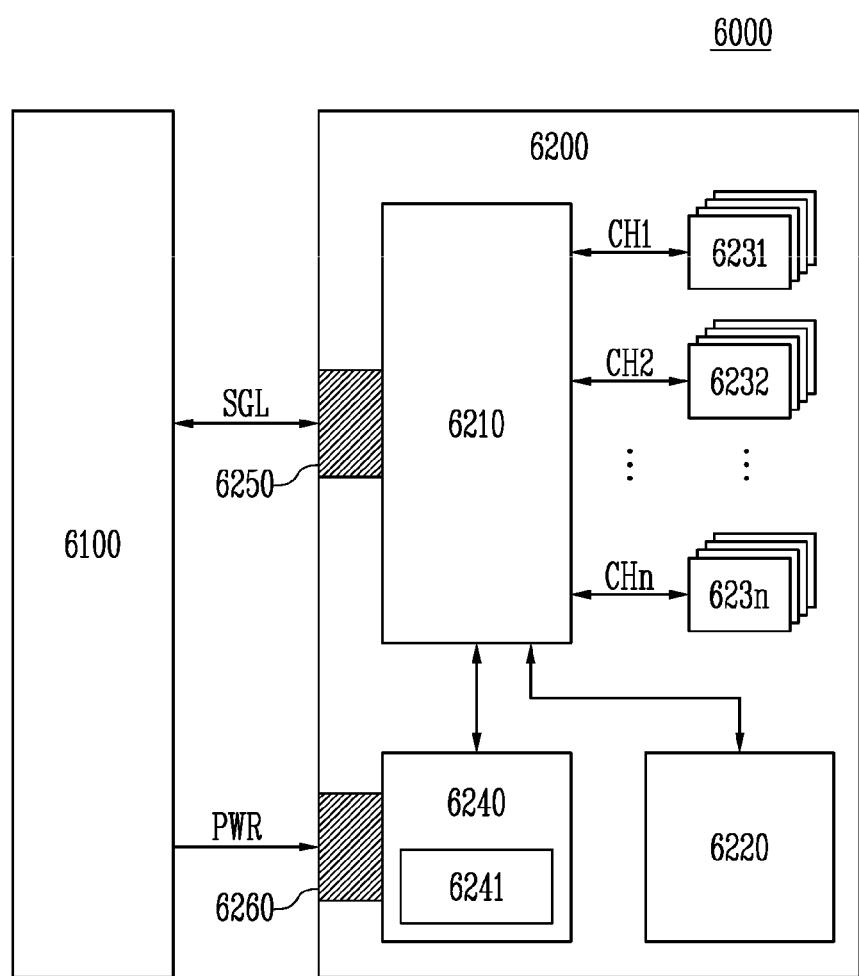
FIG. 46 illustrates a data processing system including a solid state drive (SSD) according to an embodiment.

FIG. 46 is a diagram illustrating a data processing system 6000 including a solid state drive (SSD) according to an embodiment. Referring to FIG. 46, the data processing system 6000 may include a host apparatus 6100 and an solid state drive 6200 (hereinafter referred to as an "SSD").

The SSD 6200 may include a controller 6210, a buffer memory apparatus 6220, non-volatile memories 6231 to 623n, a power supply 6240, a signal connector 6250 and a power connector 6260.

The controller 6210 may control an overall operation of the SSD 6200.

The buffer memory apparatus 6220 may temporarily store data to be stored in the non-volatile memories 6231 to 623n. Furthermore, the buffer memory apparatus 6220 may temporarily store data read from the non-volatile memories 6231 to 623n. The data temporarily stored in the buffer memory apparatus 6220 may be transmitted to the host apparatus 6100 or the non-volatile memories 6231 to 623n under the control of the controller 6210.

The non-volatile memories 6231 to 623n may be used as storage media of the SSD 6200. The non-volatile memories 6231 to 623n may be electrically coupled to the controller 6210 through a plurality of channels CH1 to CHn. One or more non-volatile memories may be electrically coupled to one channel. Non-volatile memories electrically coupled to one channel may be electrically coupled to the same signal bus and data bus.

The power supply 6240 may provide a power supply PWR, received through the power connector 6260, into the SSD 6200. The power supply 6240 may include an auxiliary power supply 6241. If sudden power-off occurs, the auxiliary power supply 6241 may supply power so that the SSD 6200 is terminated normally. The auxiliary power supply 6241 may include high-capacity capacitors capable of being charged with the power supply PWR.

The controller 6210 may exchange signals SGL with the host apparatus 6100 through the signal connector 6250. In this case, the signal SGL may include a command, an address, data, etc. The signal connector 6250 may be configured with various types of connectors based on an interface used between the host apparatus 6100 and the SSD 6200.

Figure 47:
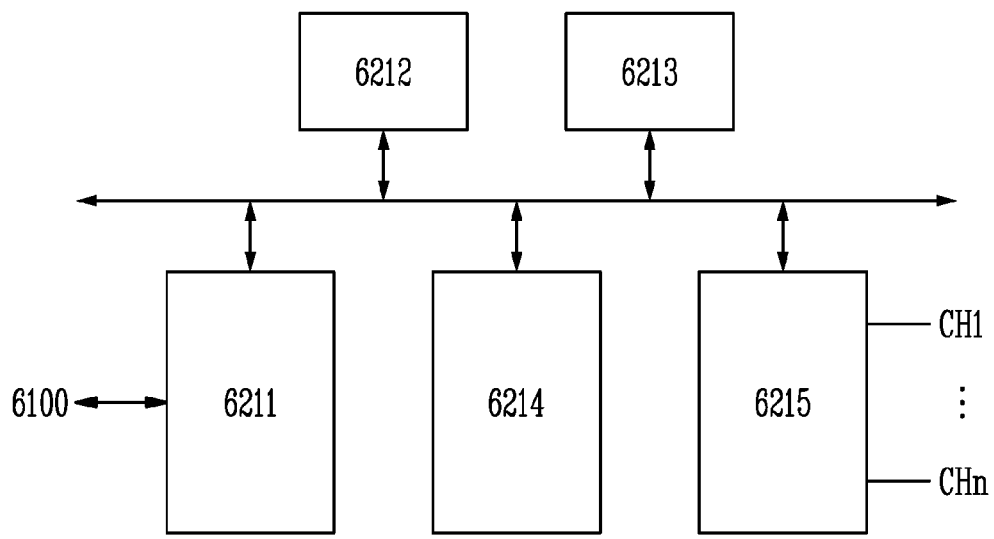
FIG. 47 illustrates a controller in FIG. 46, according to an embodiment.

FIG. 47 is a diagram illustrating the configuration of the controller 6100 in FIG. 46. Referring to FIG. 47, the controller 6210 may include a host interface unit 6211, a control unit 6212, a random access memory 6213, an error correction code (ECC) unit 6214 and a memory interface unit 6215.

The host interface unit 6211 may provide an interface between the host apparatus 6100 and the SSD 6200 based on a protocol of the host apparatus 6100. For example, the host interface unit 6211 may communicate with the host apparatus 6100 through any one of protocols, such as secure digital, a universal serial bus (USB), a multi-media card (MMC), an embedded MMC (eMMC), personal computer memory card international association (PCMCIA), parallel advanced technology attachment (PATA), serial advanced technology attachment (SATA), a small computer system interface (SCSI), a serial attached SCSI (SAS), peripheral component interconnection (PCI), PCI express (PCI-E), and a universal flash storage (UFS). Furthermore, the host interface unit 6211 may perform a disk emulation function for enabling the host apparatus 6100 to recognize the SSD 6200 as a general-purpose data storage apparatus, for example, a hard disk drive (HDD).

The control unit 6212 may analyze and process a signal SGL received from the host apparatus 6100. The control unit 6212 may control operations of internal function blocks based on firmware or software for driving the SSD 6200. The random access memory 6213 may be used as a working memory for driving such firmware or software.

The ECC unit 6214 may generate parity data of data to be transmitted to the non-volatile memories 6231 to 623*n*. The generated parity data may be stored in the non-volatile memories 6231 to 623*n* along with data. The ECC unit 6214 may detect an error of data read from the non-volatile memories 6231 to 623*n* based on the parity data. If the detected error is within a correctable range, the ECC unit 6214 may correct the detected error.

The memory interface unit 6215 may provide the non-volatile memories 6231 to 623*n* with control signals, such as a command and an address, under the control of the control unit 6212. Furthermore, the memory interface unit 6215 may exchange data with the non-volatile memories 6231 to 623*n* under the control of the control unit 6212. For example, the memory interface unit 6215 may provide the non-volatile memories 6231 to 623*n* with data stored in the buffer memory apparatus 6220 or may provide the buffer memory apparatus 6220 with data read from the non-volatile memories 6231 to 623*n*.

Figure 48:
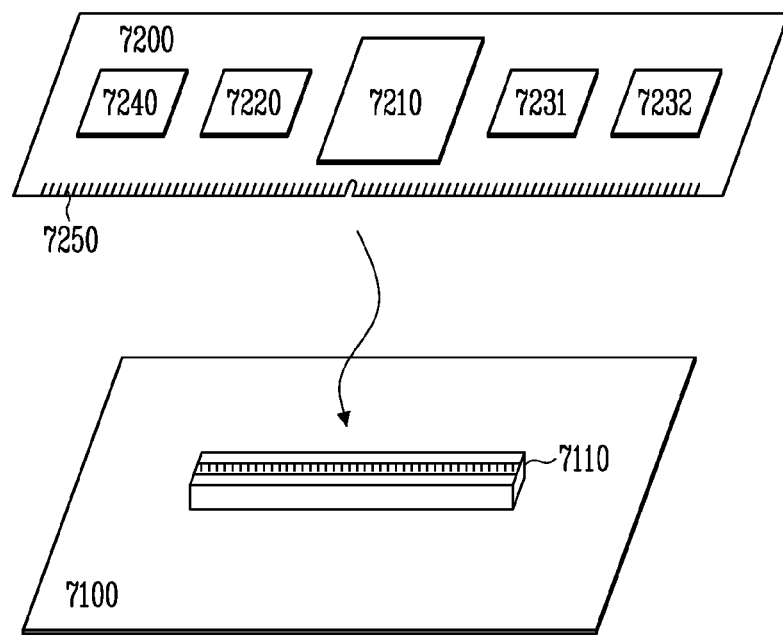
FIG. 48 illustrates a data processing system including a data storage apparatus according to an embodiment.

FIG. 48 is a diagram illustrating a data processing system 7000 including a data storage apparatus according to an embodiment. Referring to FIG. 48, the data processing system 7000 may include a host apparatus 7100 and a data storage apparatus 7200.

The host apparatus 7100 may be configured in a board form, such as a printed circuit board (PCB). Although not illustrated, the host apparatus 7100 may include internal function blocks for performing functions of the host apparatus.

The host apparatus 7100 may include a connection terminal 7110, such as a socket, a slot or a connector. The data storage apparatus 7200 may be mounted on the connection terminal 7110.

The data storage apparatus 7200 may be configured in a board form, such as a PCB. The data storage apparatus 7200 may be called a memory module or a memory card. The data storage apparatus 7200 may include a controller 7210, a buffer memory apparatus 7220, non-volatile memories 7231 and 7232, a power management integrated circuit (PMIC) 7240 and a connection terminal 7250.

The controller 7210 may control an overall operation of the data storage apparatus 7200. The controller 7210 may be configured identically with the controller 6210 of FIG. 48.

The buffer memory apparatus 7220 may temporarily store data to be stored in the non-volatile memories 7231 and 7232. Furthermore, the buffer memory apparatus 7220 may temporarily store data read from the non-volatile memories 7231 and 7232. The data temporarily stored in the buffer memory apparatus 7220 may be transmitted to the host apparatus 7100 or the non-volatile memories 7231 and 7232 under the control of the controller 7210.

The non-volatile memories 7231 and 7232 may be used as storage media of the data storage apparatus 7200.

The PMIC 7240 may provide power, received through the connection terminal 7250, into the data storage apparatus 7200. The PMIC 7240 may manage power of the data storage apparatus 7200 under the control of the controller 7210.

The connection terminal 7250 may be electrically coupled to the connection terminal 7110 of the host apparatus. Signals, such as a command, an address and data, and power may be transmitted between the host apparatus 7100 and the data storage apparatus 7200 through the connection terminal 7250. The connection terminal 7250 may be configured in various forms based on an interface process between the host apparatus 7100 and the data storage apparatus 7200. The connection terminal 7250 may be positioned on any one side of the data storage apparatus 7200.

Figure 49:
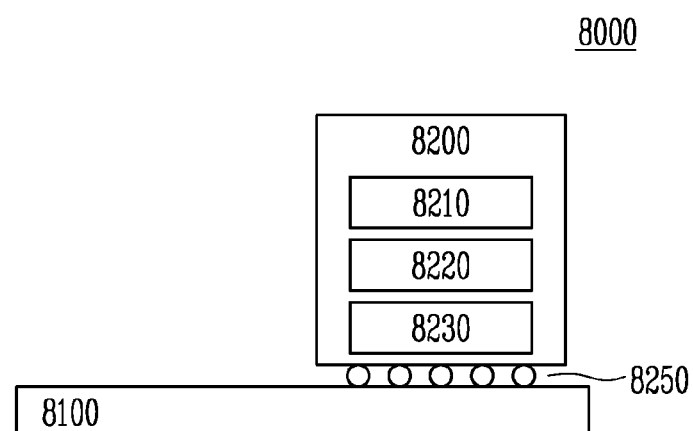
FIG. 49 illustrates a data processing system including a data storage apparatus according to an embodiment.

FIG. 49 is a diagram illustrating a data processing system 8000 including a data storage apparatus according to an embodiment. Referring to FIG. 49, the data processing system 8000 may include a host apparatus 8100 and a data storage apparatus 8200.

The host apparatus 8100 may be configured in a board form, such as a PCB. Although not illustrated, the host apparatus 8100 may include internal function blocks for performing functions of the host apparatus.

The data storage apparatus 8200 may be configured in a flap-type package form. The data storage apparatus 8200 may be mounted on the host apparatus 8100 through solder balls 8250. The data storage apparatus 8200 may include a controller 8210, a buffer memory apparatus 8220 and a non-volatile memory 8230.

The controller 8210 may control an overall operation of the data storage apparatus 8200. The controller 8210 may be configured identically with the controller 7210 of FIG. 48.

The buffer memory apparatus 8220 may temporarily store data to be stored in the non-volatile memory 8230. Furthermore, the buffer memory apparatus 8220 may temporarily store data read from the non-volatile memory 8230. The data temporarily stored in the buffer memory apparatus 8220 may be transmitted to the host apparatus 8100 or the non-volatile memory 8230 under the control of the controller 8210.

The non-volatile memory 8230 may be used as a storage medium of the data storage apparatus 8200.

Figure 50:
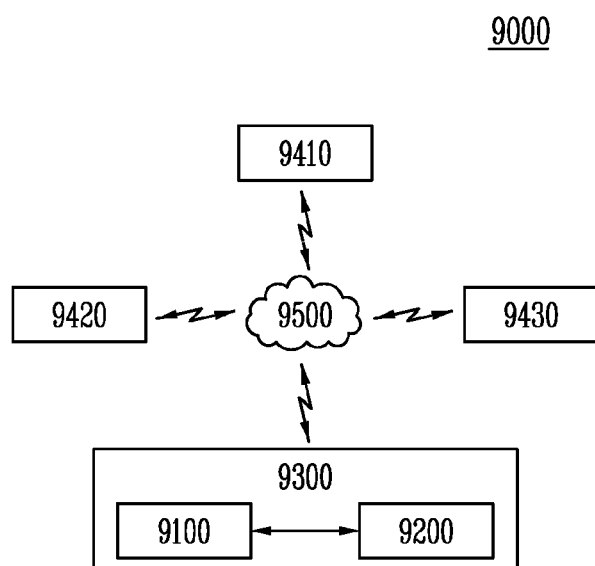
FIG. 50 illustrates a network system including a data storage apparatus according to an embodiment.

FIG. 50 is a diagram illustrating a network system 9000 including a data storage apparatus according to an embodiment. Referring to FIG. 50, the network system 9000 may include a server system 9300 and a plurality of client systems 9410, 9420 and 9430, which are electrically coupled over a network 5500.

The server system 9300 may serve data in response to a request from the plurality of client systems 9410, 9420 and 9430. For example, the server system 9300 may store data provided by the plurality of client systems 9410, 9420 and 5430. For another example, the server system 9300 may provide data to the plurality of client systems 9410, 9420 and 9430.

The server system 9300 may include a host apparatus 9100 and a data storage apparatus 9200. The data storage apparatus 9200 may be configured with the data storage apparatus 5000 of FIG. 34, the SSD 6200 of FIG. 46, the data storage apparatus 7200 of FIG. 48 and the data storage apparatus 8200 of FIG. 49.

Those skilled in the art to which this disclosure pertains should understand that the embodiments are only illustrative from all aspects not being limitative because this disclosure may be implemented in various other forms without departing from the technical spirit or essential characteristics of this disclosure. Accordingly, the scope of this disclosure is defined by the appended claims rather than by the detailed description, and all modifications or variations derived from the meanings and scope of the claims and equivalents thereof should be understood as being included in the scope of this disclosure.

While various embodiments have been described above, it will be understood to those skilled in the art that the embodiments described are by way of example only. Accordingly, the data storage apparatus and method described herein should not be limited based on the described embodiments.

What is claimed is:

1. A storage device including sequential regions and a backup region, the storage device comprising:
 a volatile memory configured to include a region storing a zone mapping table, a random region, and a plurality of allocated buffers, each of the plurality of allocated buffers being configured to temporally store data to be stored in a respective sequential region of the sequential regions, wherein the zone mapping table comprises one or more entries, each entry including a logical block address group, a zone index, a start physical address, a total length, and a final write location;
 a non-volatile memory configured to include memory blocks allocated to the sequential regions and the backup region; and
 a memory controller configured to:
  identify whether a logical address received with a request from a host belongs to the random region or the sequential regions based on the zone mapping table,
  when the logical address belongs to the sequential regions, control an operation corresponding to the request based on the zone mapping table, and
  control the volatile memory and the non-volatile memory to store data stored in the plurality of allocated buffers and the random region into the non-volatile memory, based on power information provided from the host.

2. The storage device of claim 1, wherein the memory controller, in response to a write request from the host, stores data corresponding to the write request in the random region when logical addresses of the data corresponding to the write request are not sequential logical addresses.

3. The storage device of claim 2, wherein the memory controller flushes data stored in the random region in the backup region based on the power information.

4. The storage device of claim 3, wherein the memory controller reads data stored in the backup region and to store read data in the random region in response to a power on of the storage device.

5. The storage device of claim 1, wherein the memory controller comprises:
 a state storage configured to store buffer state information on a state of the plurality of allocated buffers; and
 a buffer allocation manager configured to provide a power information request for requesting the power information to the host, based on the buffer state information.

6. The storage device of claim 5, wherein the buffer state information includes information on a number of the plurality of allocated buffers.

7. The storage device of claim 5, wherein the buffer state information includes information on a size of data stored in the plurality of allocated buffers.

8. The storage device of claim 7, wherein the buffer allocation manager provides the power information request to the host when a number of the plurality of allocated buffers is equal to or greater than a reference value.

9. The storage device of claim 8, wherein the reference value corresponds to a size of data in the volatile memory.

10. The storage device of claim 8, further comprising:
 an auxiliary power device configured to provide auxiliary power to the volatile memory, the non-volatile memory, and the memory controller when a supply of main power provided to the memory controller is abnormally cut off.

11. The storage device of claim 10, wherein the memory controller controls the volatile memory and the non-volatile memory to store the data stored in the plurality of allocated buffers and the random region into the non-volatile memory, based on an amount of the auxiliary power.

12. The storage device of claim 10, wherein the state storage further includes auxiliary power state information on a state of the auxiliary power device, and
 wherein the reference value is determined according to the auxiliary power state information.

13. The storage device of claim 10, further comprising an auxiliary power device manager configured to update auxiliary power state information based on a number of defective power cells or a number of normal power cells included in the auxiliary power device.

14. The storage device of claim 1, wherein the backup region includes memory cells to be programmed as single-level cells.

* * * * *